(12) United States Patent
Lee

(10) Patent No.: US 12,200,209 B2
(45) Date of Patent: *Jan. 14, 2025

(54) IMAGE SIGNAL ENCODING/DECODING METHOD AND DEVICE THEREFOR

(71) Applicant: XRIS CORPORATION, Seongnam-si (KR)

(72) Inventor: Bae Keun Lee, Seongnam-si (KR)

(73) Assignee: XRIS CORPORATION, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,974

(22) Filed: Sep. 29, 2023

(65) Prior Publication Data

US 2024/0040118 A1 Feb. 1, 2024

Related U.S. Application Data

(63) Continuation of application No. 17/873,095, filed on Jul. 25, 2022, now Pat. No. 11,812,018, which is a (Continued)

(30) Foreign Application Priority Data

Jun. 22, 2019 (KR) .................. 10-2019-0074659
Oct. 18, 2019 (KR) .................. 10-2019-0129991

(51) Int. Cl.
*H04N 19/119* (2014.01)
*H04N 19/174* (2014.01)
*H04N 19/46* (2014.01)

(52) U.S. Cl.
CPC ......... *H04N 19/119* (2014.11); *H04N 19/174* (2014.11); *H04N 19/46* (2014.11)

(58) Field of Classification Search
CPC .................................................... H04N 19/436
See application file for complete search history.

(56) References Cited

U.S. PATENT DOCUMENTS 7,039,241 B1  5/2006  Van Hook
9,699,473 B2  7/2017  Park et al.
(Continued)

FOREIGN PATENT DOCUMENTS

CN  109792515 A  5/2019
JP  2016521497 A  7/2016
(Continued)

OTHER PUBLICATIONS

The Office Action issued on Mar. 13, 2024 of the Indian Patent Application No. 202117050142, which corresponds to the above-identified application.

(Continued)

*Primary Examiner* — Jerry T Jean Baptiste
(74) *Attorney, Agent, or Firm* — Goldilocks ZONE IP Law

(57) ABSTRACT

An image decoding method, according to the present invention, may comprise the steps of: splitting a current picture into a plurality of tiles; decoding split information indicating slice type, wherein the split information indicates whether a square-shaped slice is applied; and determining a slice on the basis of tile index difference information if the split information indicates that the square-shaped slice is applied.

11 Claims, 22 Drawing Sheets

Related U.S. Application Data continuation of application No. 17/282,561, filed as application No. PCT/KR2020/007985 on Jun. 19, 2020, now Pat. No. 11,470,313.

(56) References Cited

U.S. PATENT DOCUMENTS

| | | | |
|---|---|---|---|
| 2013/0070848 A1* | 3/2013 | Guo | H04N 19/176 |
| | | | 375/E7.243 |
| 2013/0272375 A1 | 10/2013 | Yu et al. | |
| 2016/0021379 A1 | 1/2016 | Minezawa et al. | |
| 2019/0174136 A1 | 6/2019 | Jun et al. | |

FOREIGN PATENT DOCUMENTS

| | | |
|---|---|---|
| KR | 10-2016-0024364 A | 3/2016 |
| KR | 10-2019-0024212 A | 3/2019 |
| KR | 10-2019-0039790 A | 4/2019 |
| WO | WO2017171438 A1 | 10/2017 |

OTHER PUBLICATIONS

Office Action issued on Nov. 14, 2024 of the Chinease Patent Application No. 202080005985.0, which corresponds to the above-identified application.

* cited by examiner

【FIG. 1】
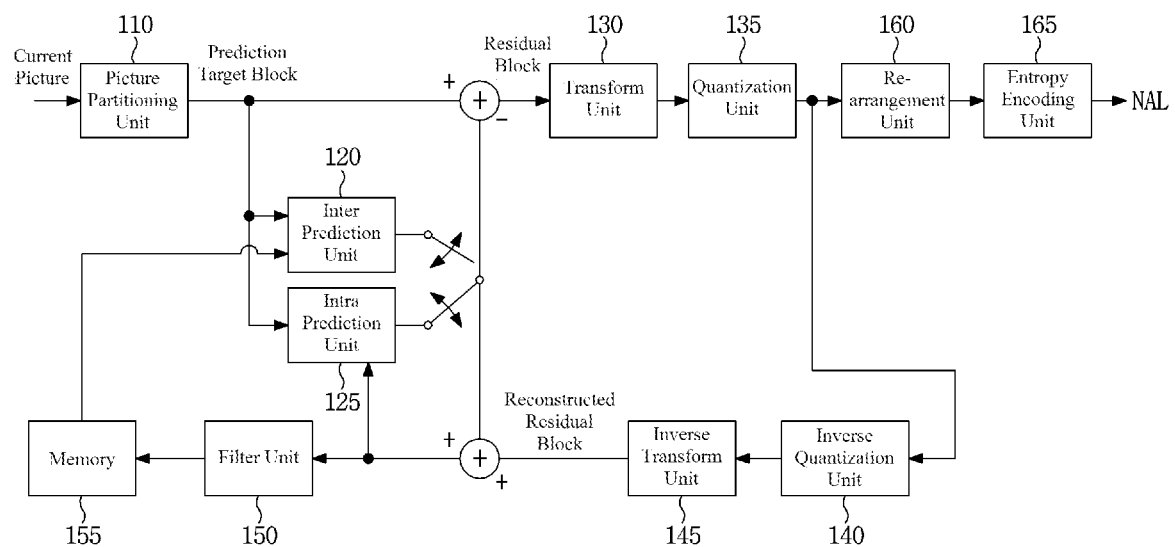
【FIG. 2】
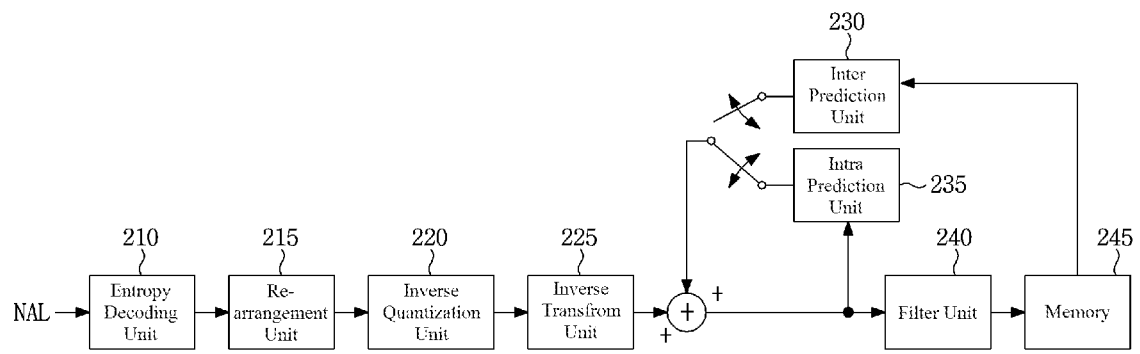

[FIG. 3]
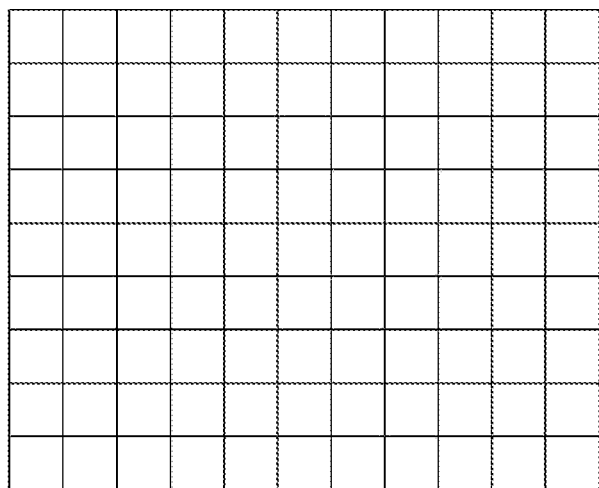
[FIG. 4]
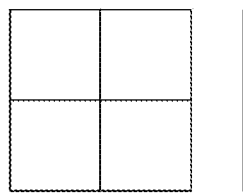 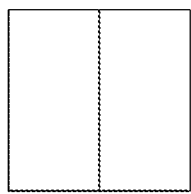 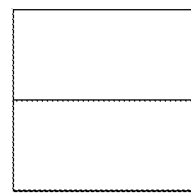 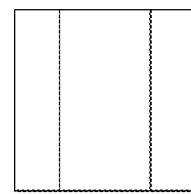 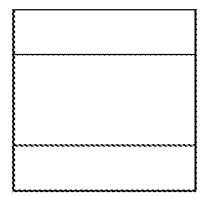
SPLIT_QT　　SPLIT_BT_VER　　SPLIT_BT_HOR　　SPLIT_TT_VER　　SPLIT_TT_HOR

[FIG. 5]
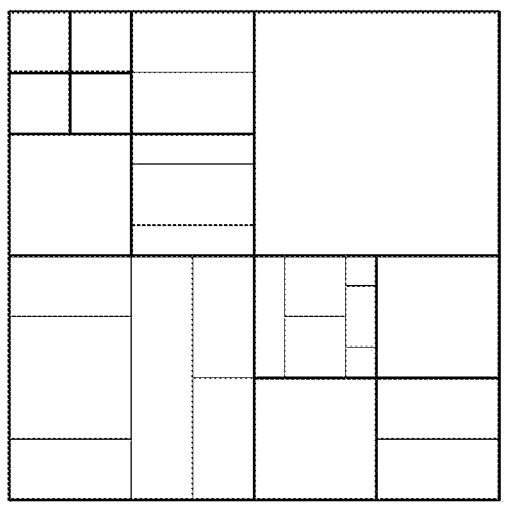
[FIG. 6]
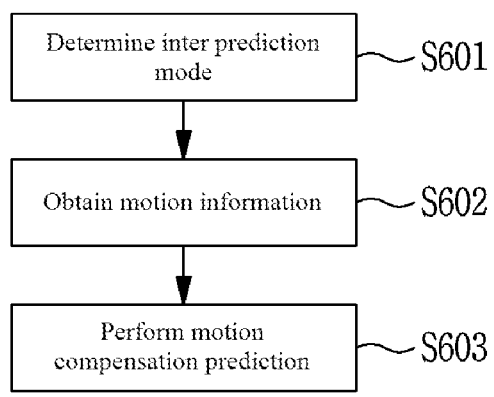

【FIG. 7】
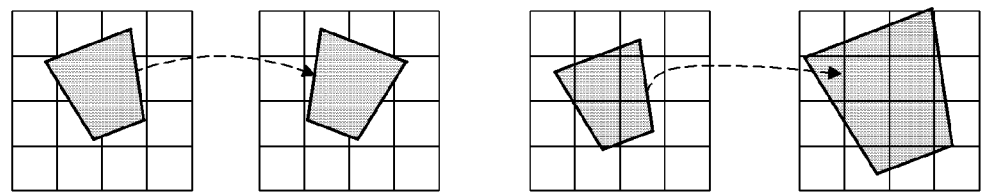
Rotation					Zoom-in
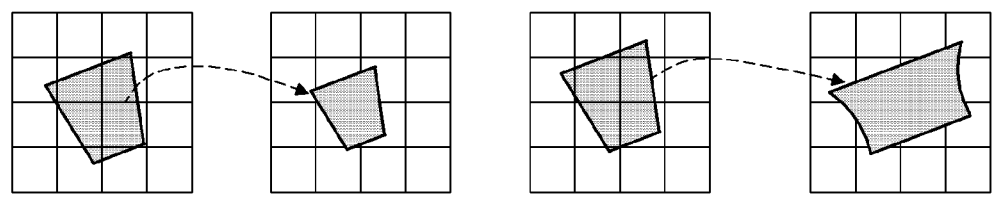
Zoom-out				Affine transform
【FIG. 8】
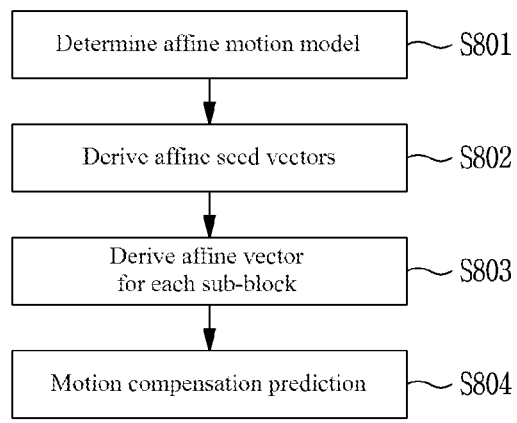

【FIG. 9】
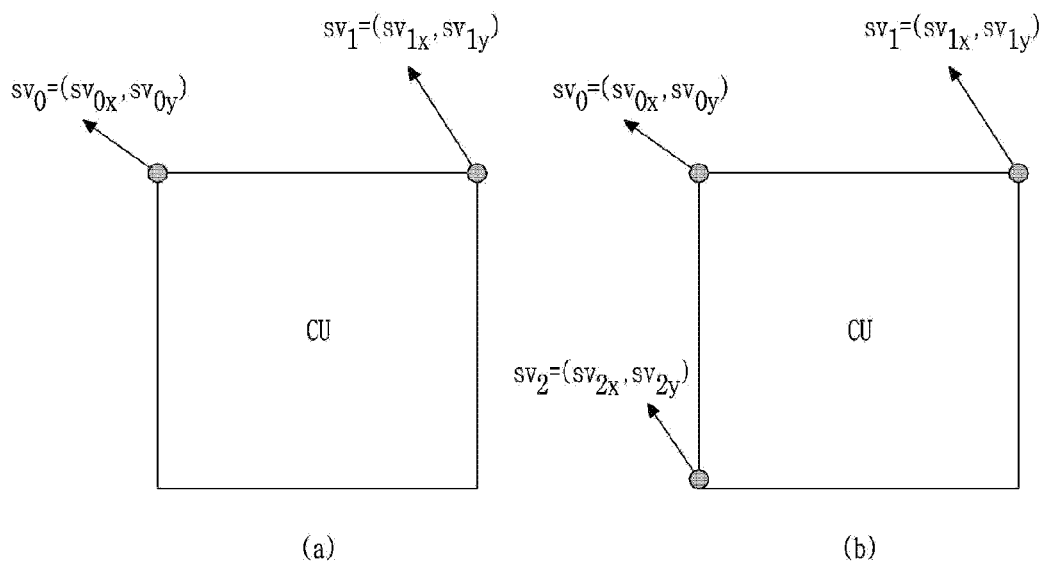
(a)  (b)
【FIG. 10】
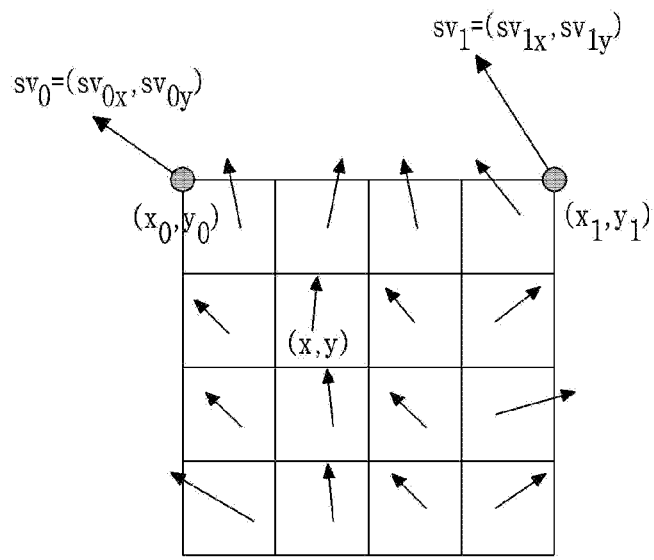

[FIG. 11]
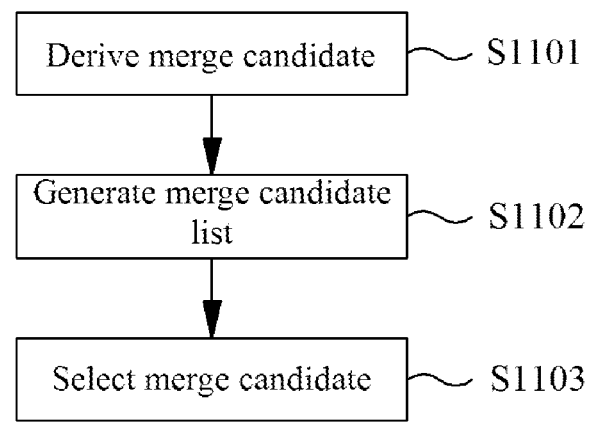

【FIG. 12】
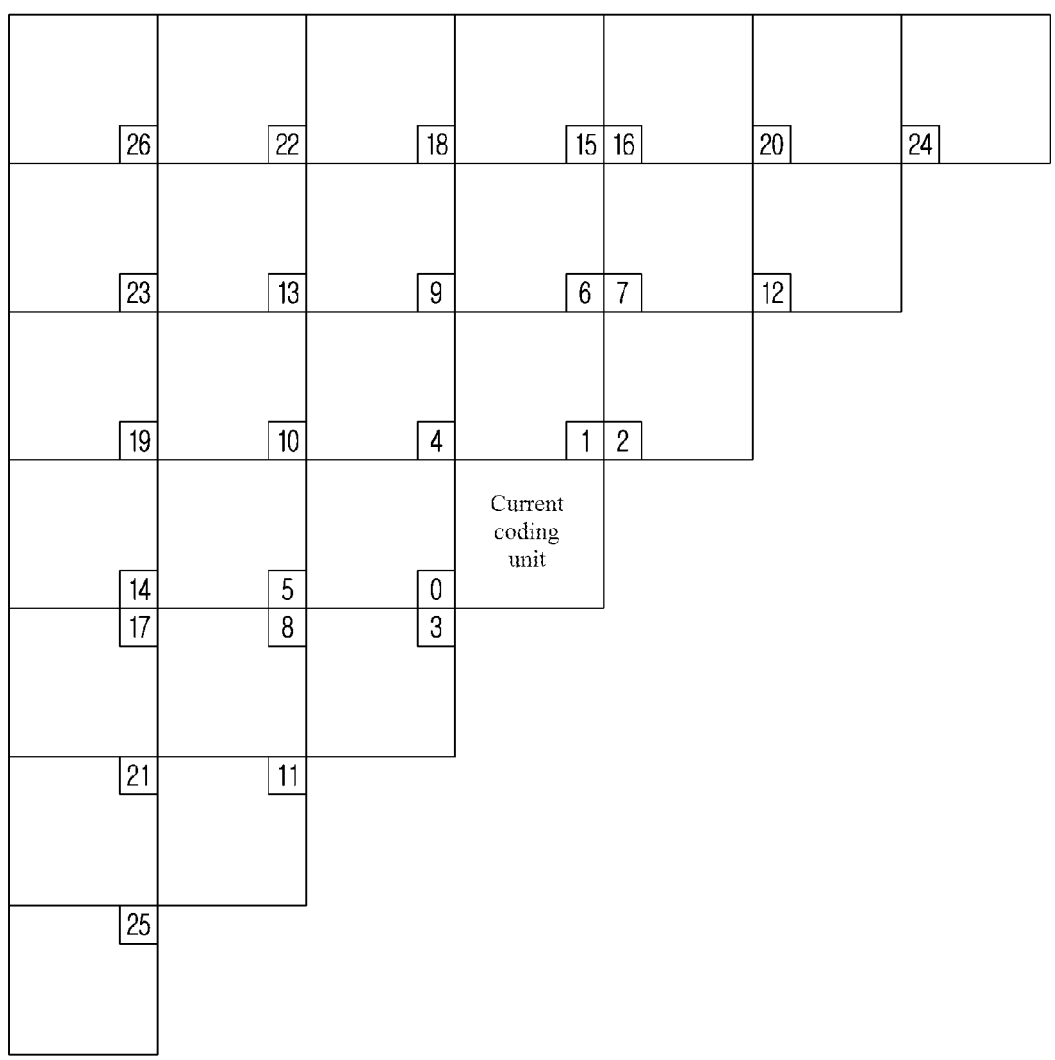

[FIG. 13]
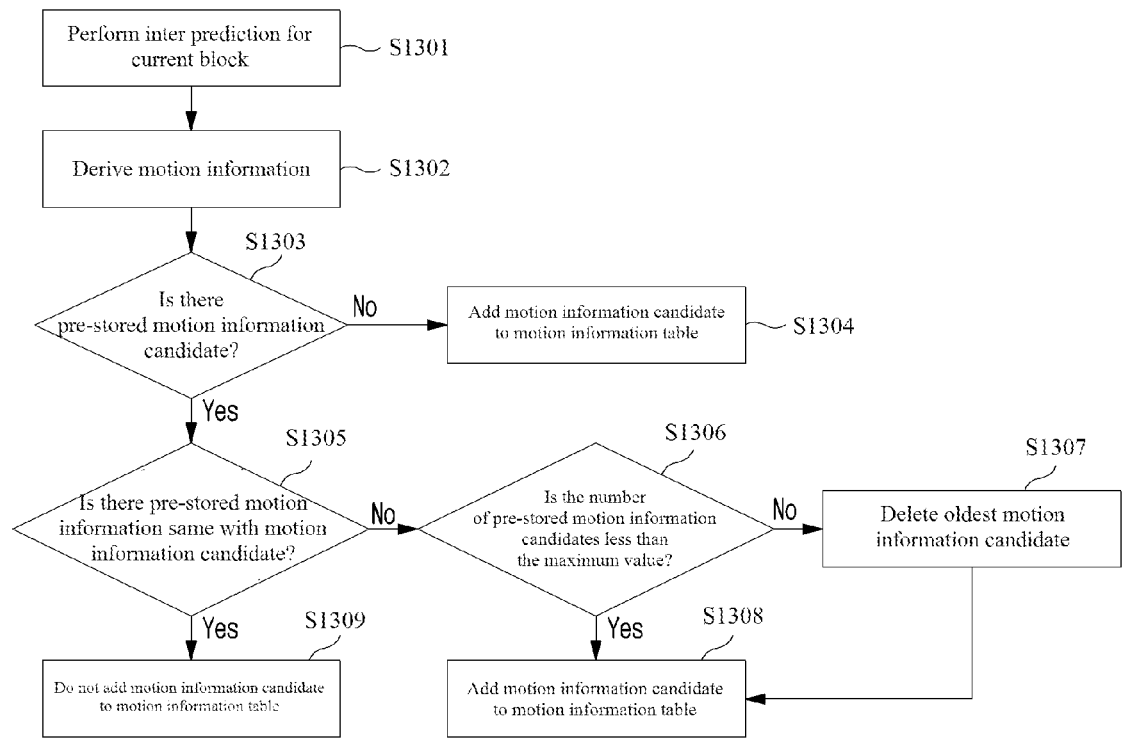
[FIG. 14]
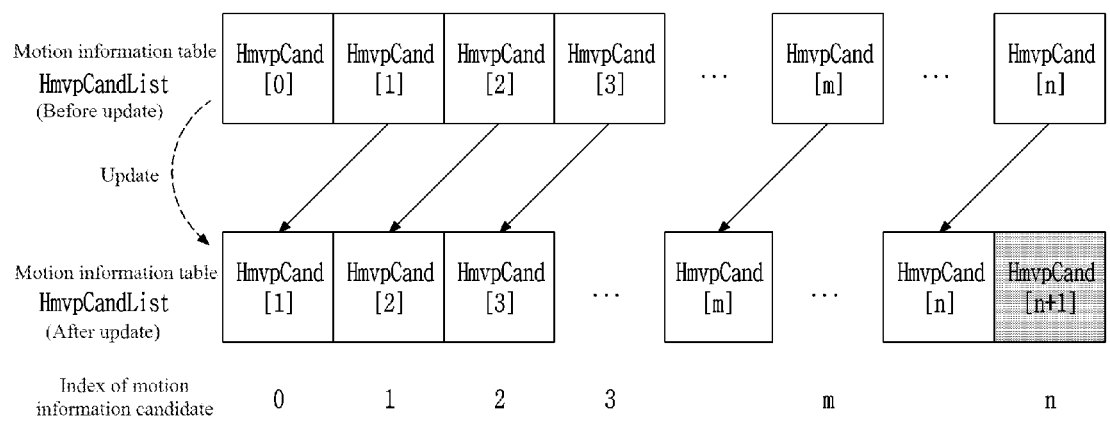

【FIG. 15】
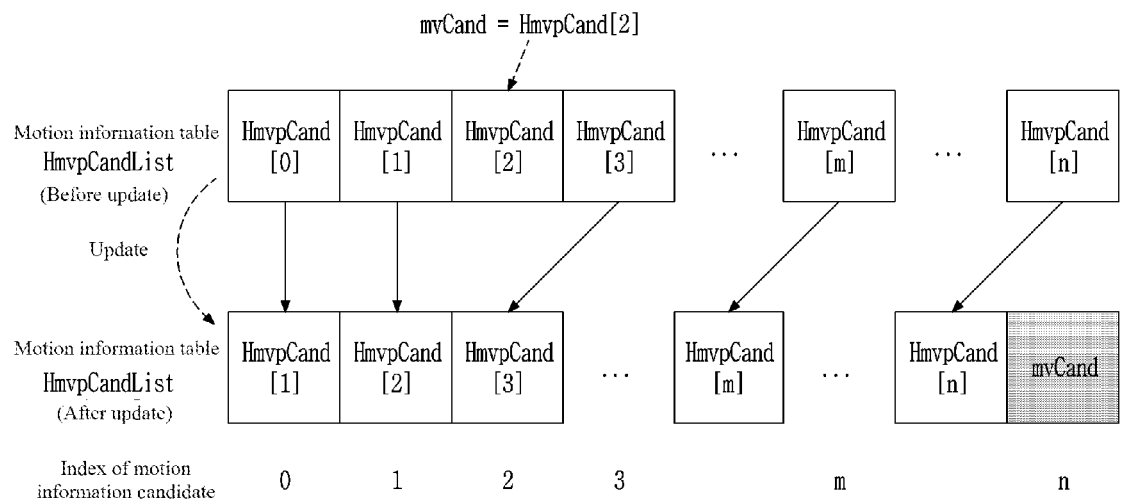
【FIG. 16】
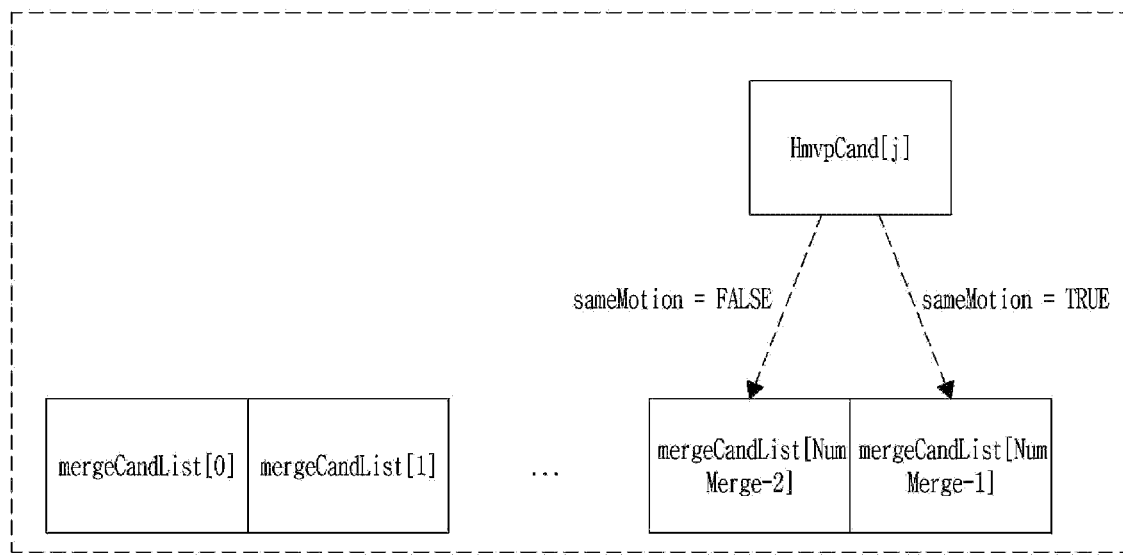

[FIG. 17]
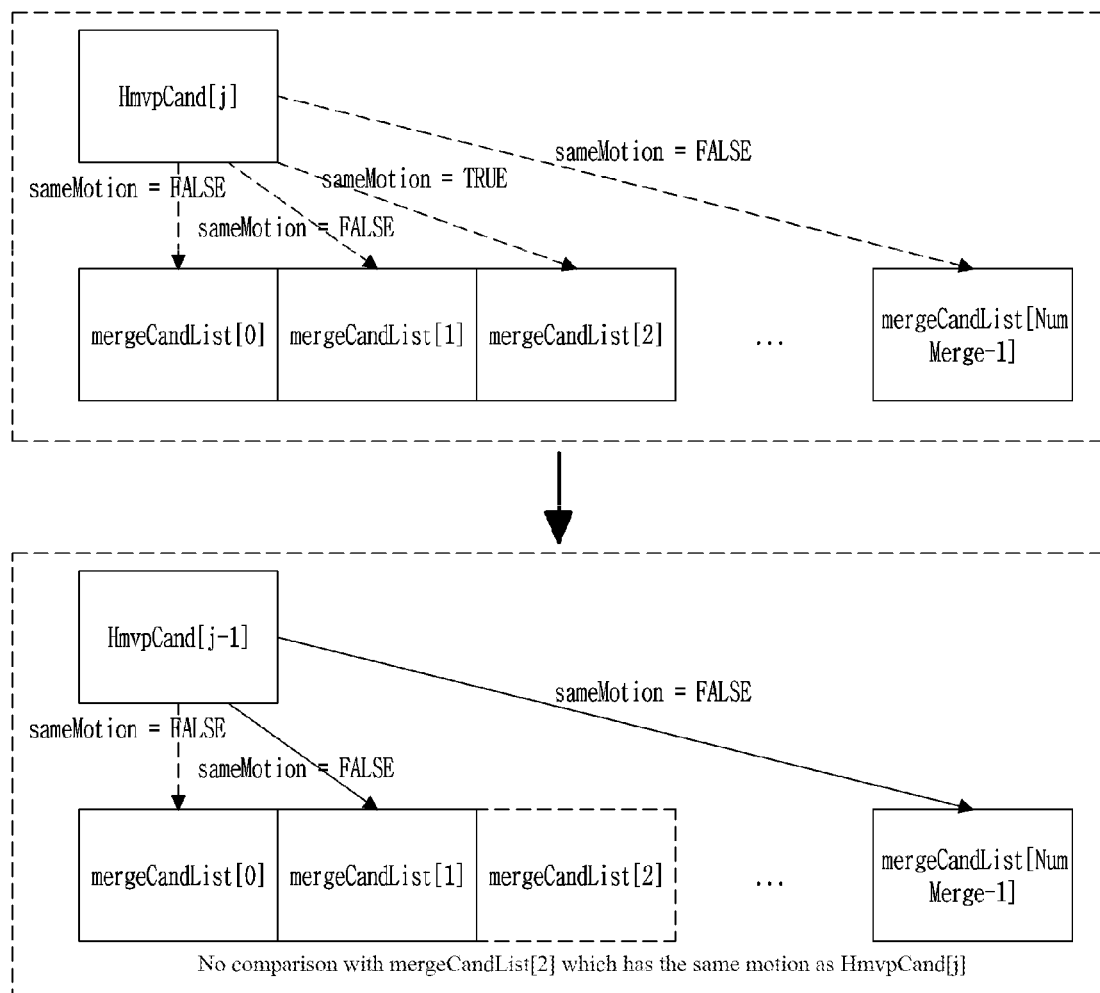

【FIG. 18】
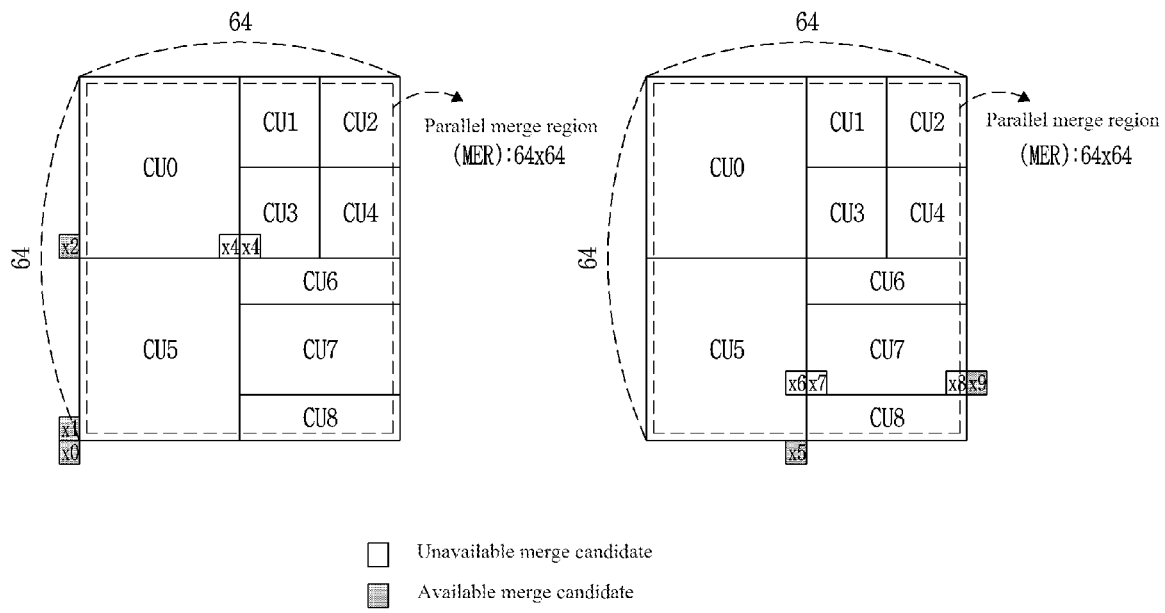
【FIG. 19】
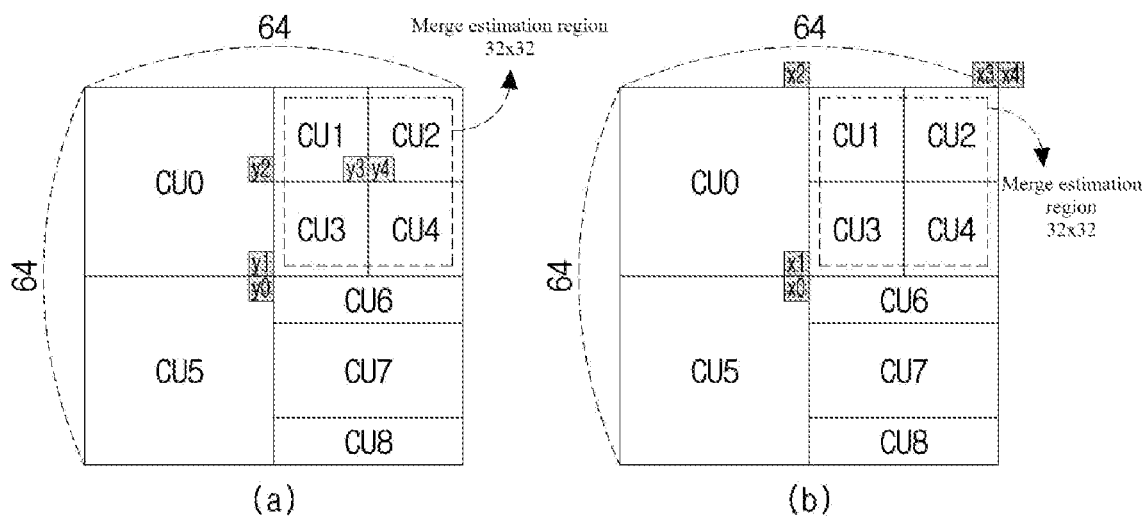
(a)                                (b)

[FIG. 20]
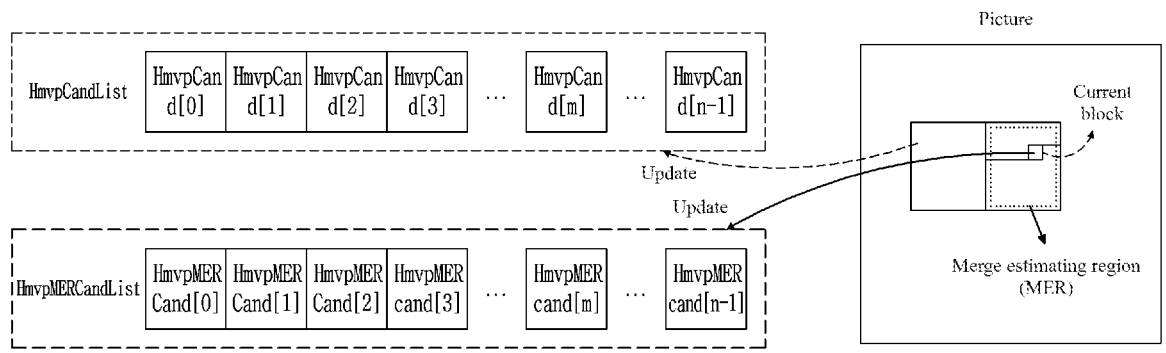
[FIG. 21]
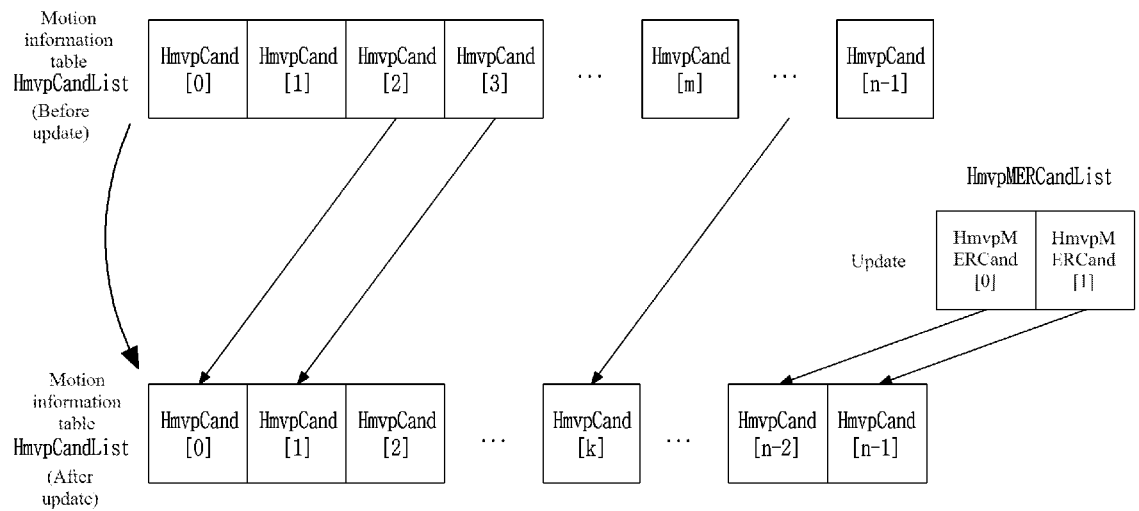
[FIG. 22]
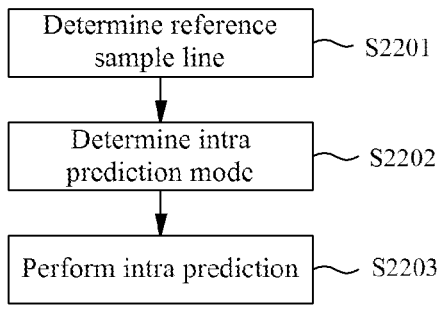

【FIG. 23】
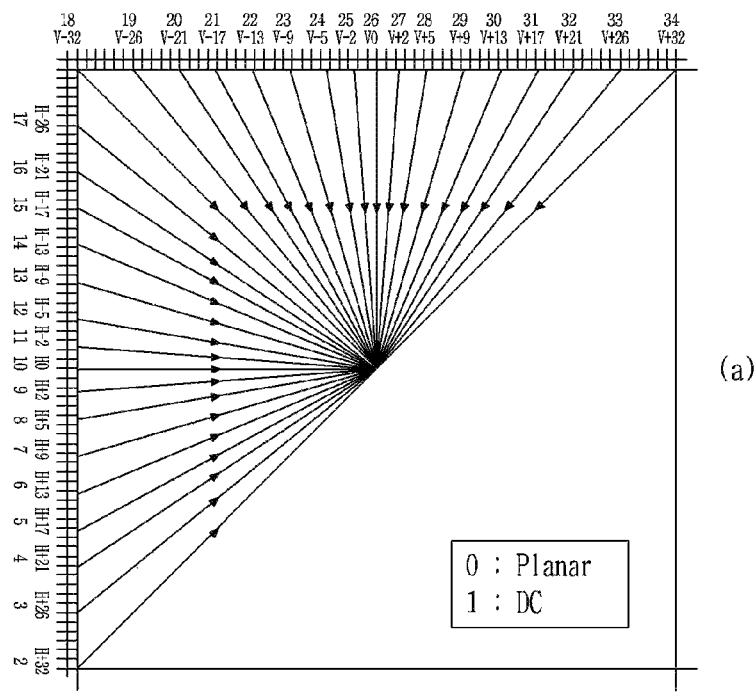
(a)
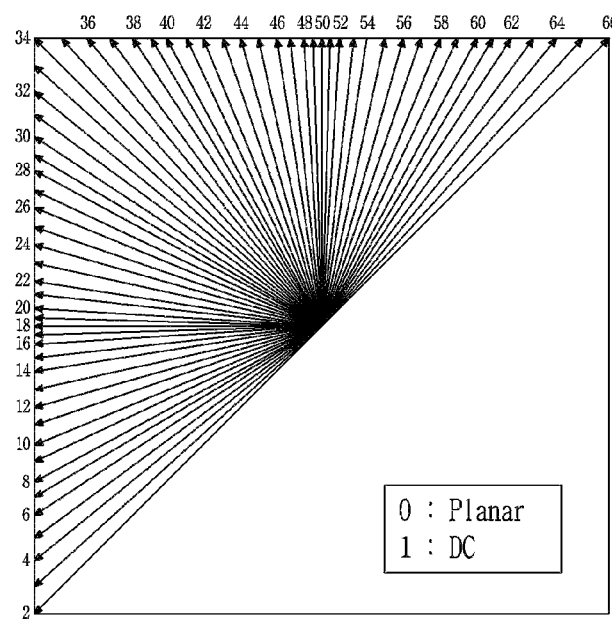
(b)

【FIG. 24】
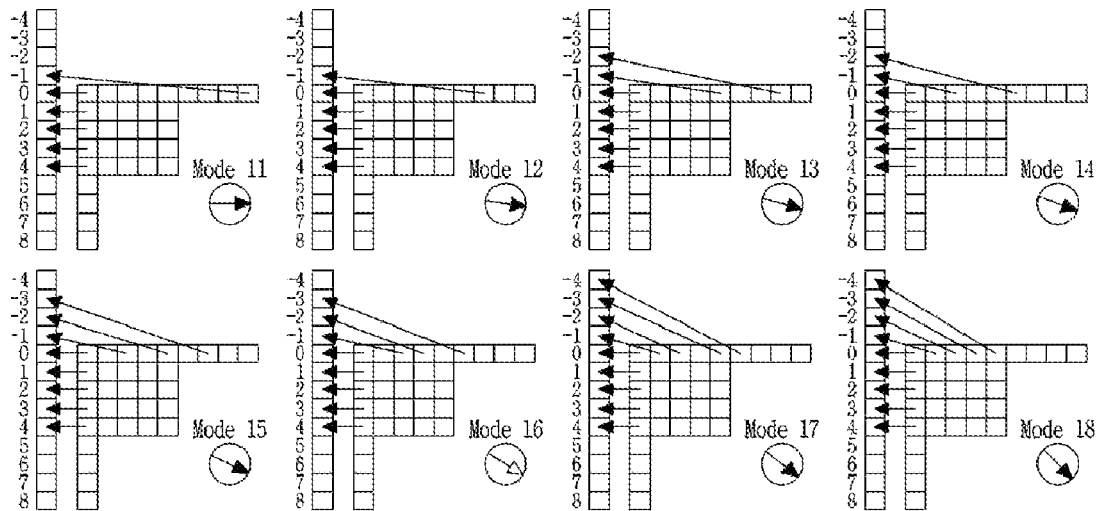
【FIG. 25】
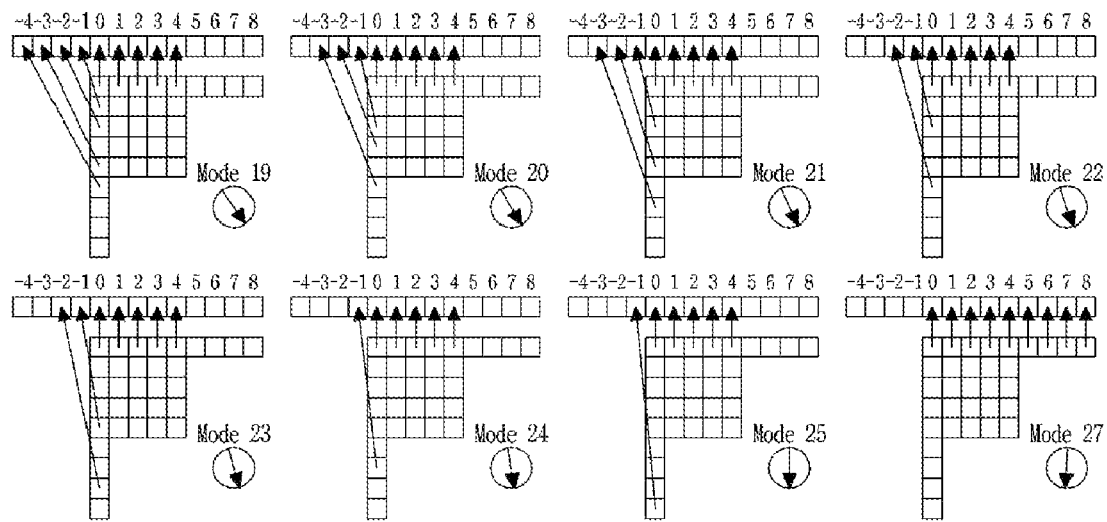

[FIG. 26]
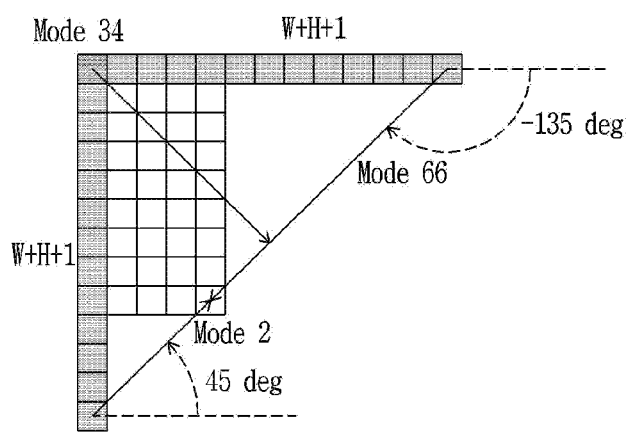
[FIG. 27]
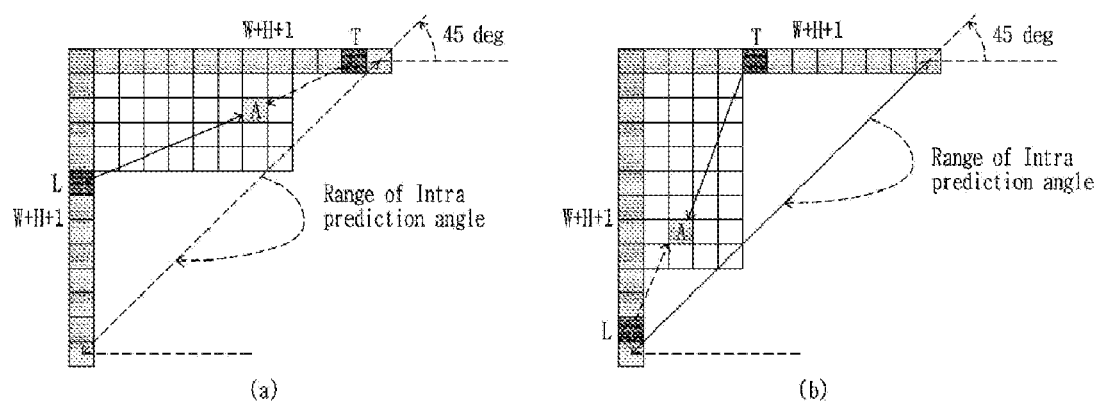

【FIG. 28】
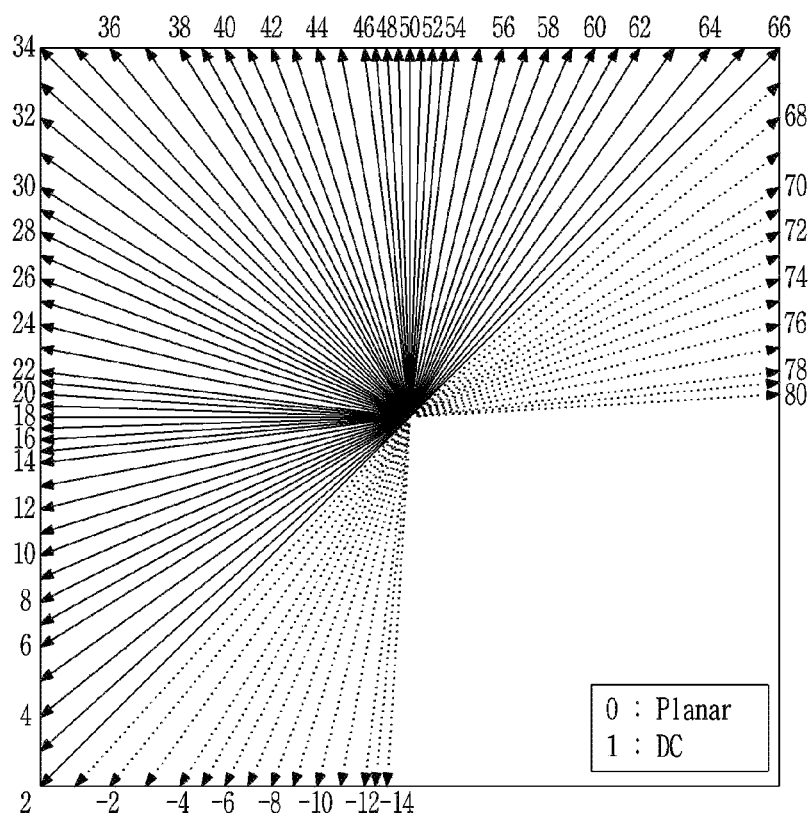
【FIG. 29】
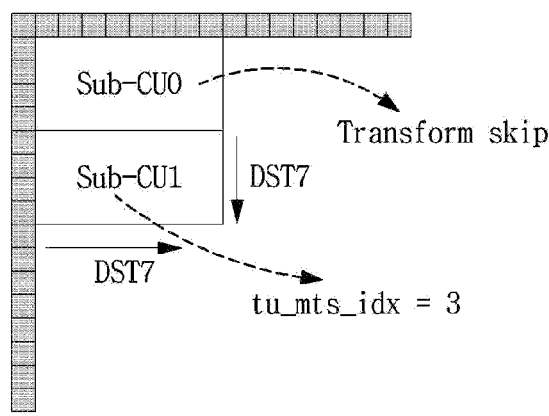

【FIG. 30】
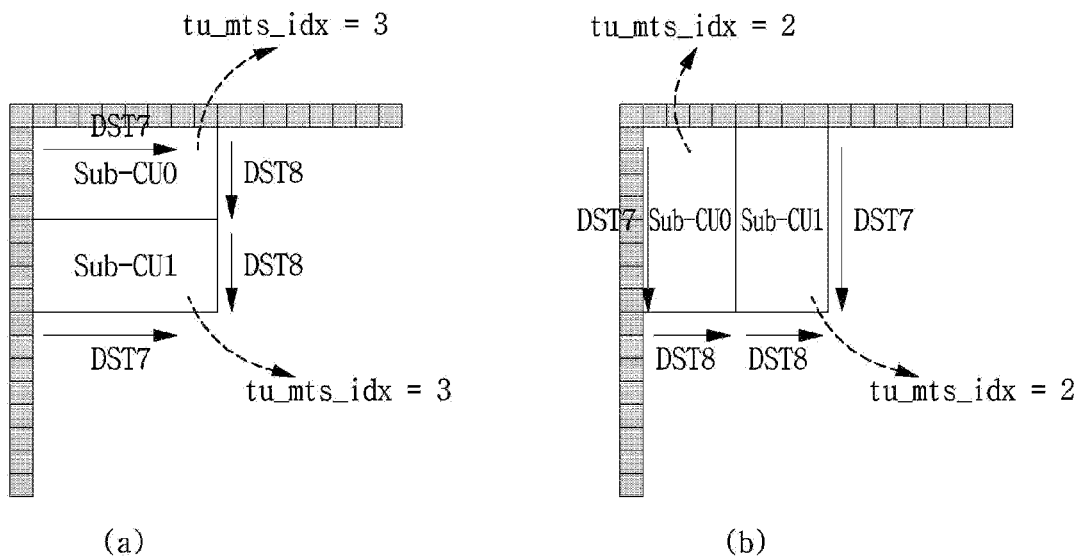
(a)     (b)
【FIG. 31】
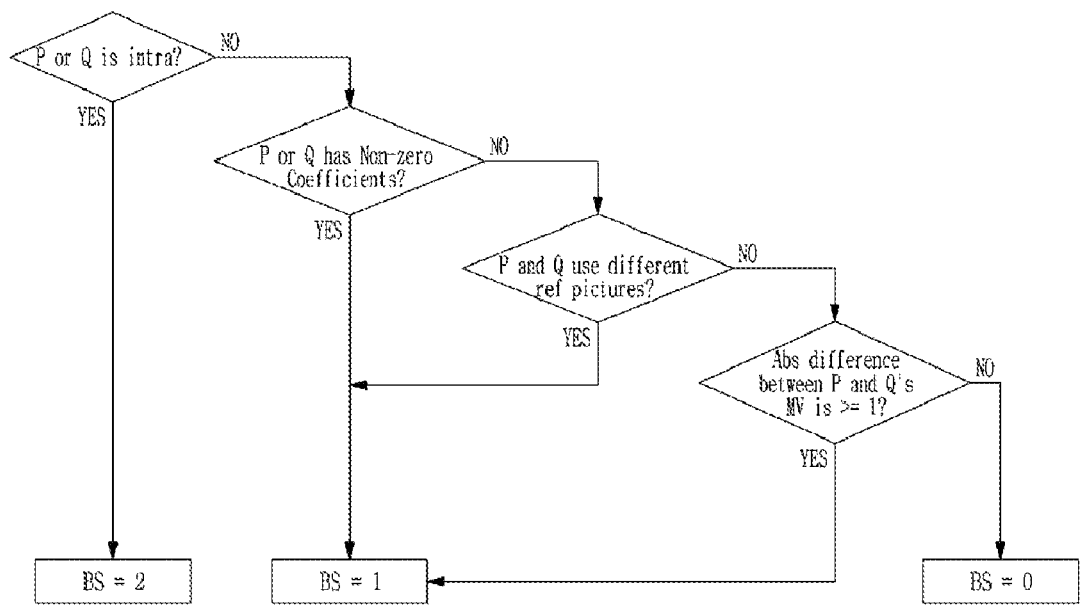

[FIG. 32]
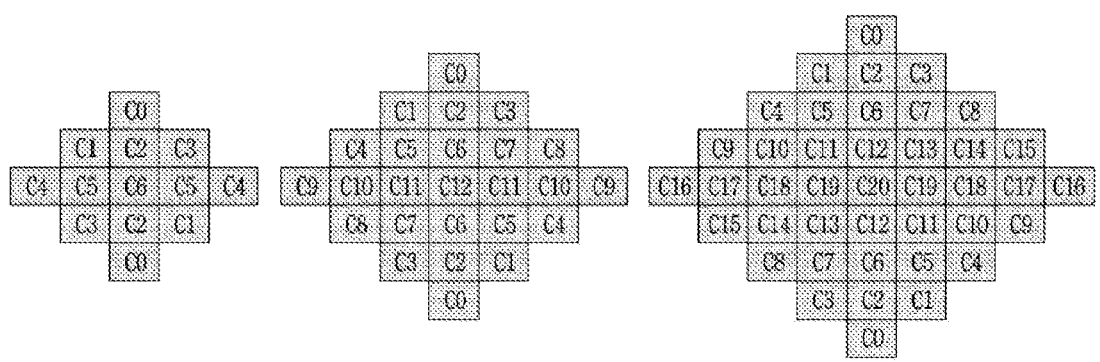
[FIG. 33]
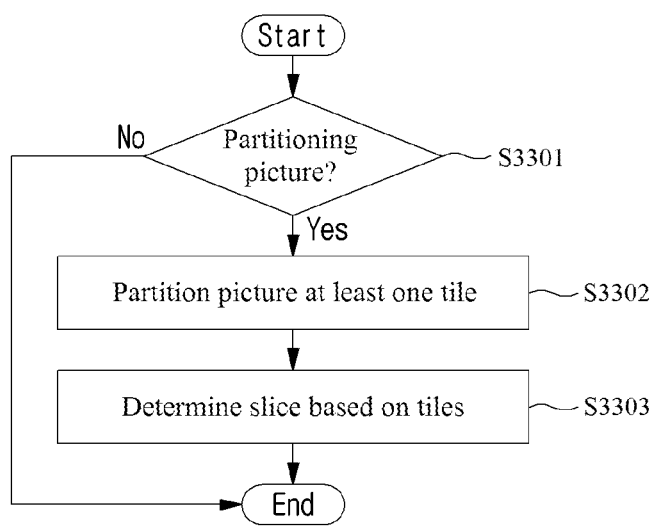

[FIG. 34]
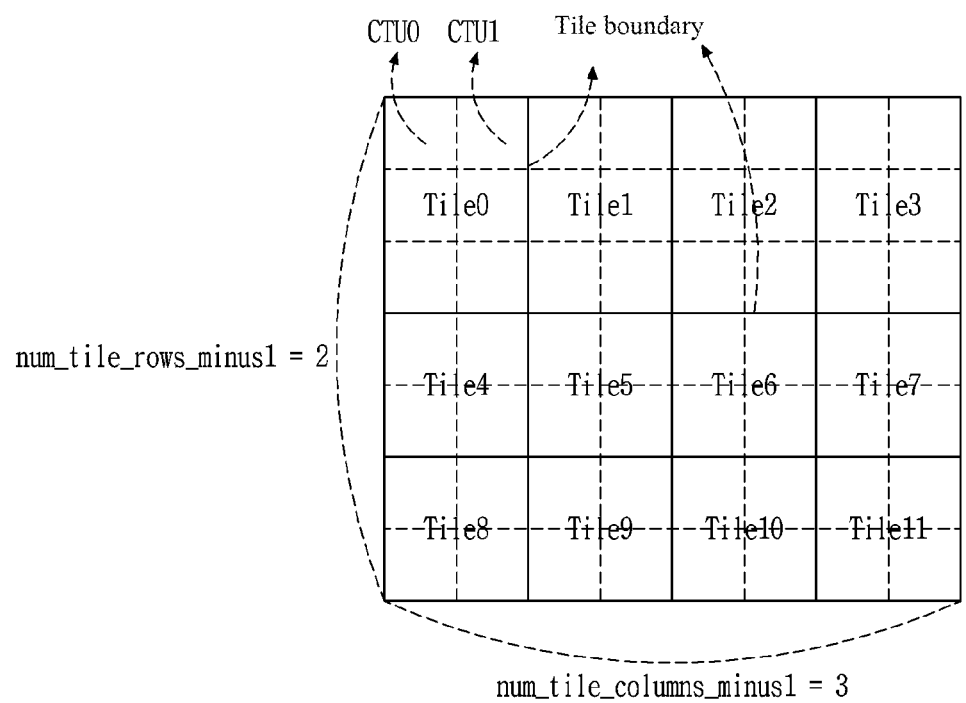

【FIG. 35】
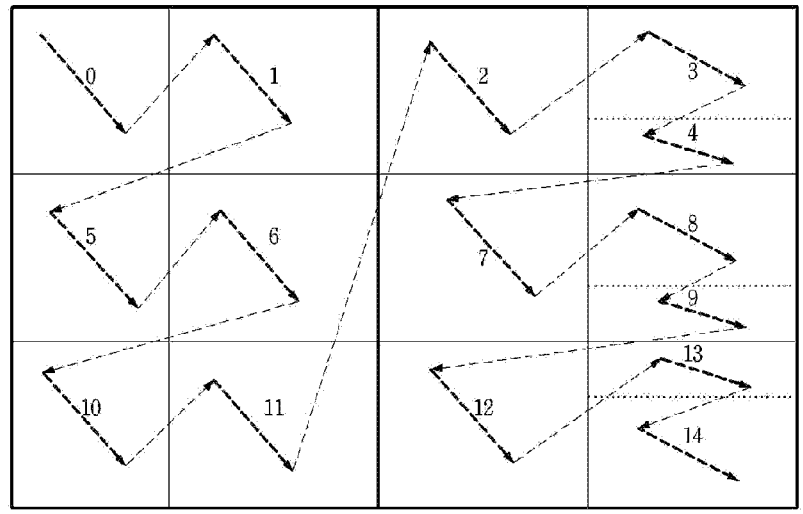

[FIG. 36]
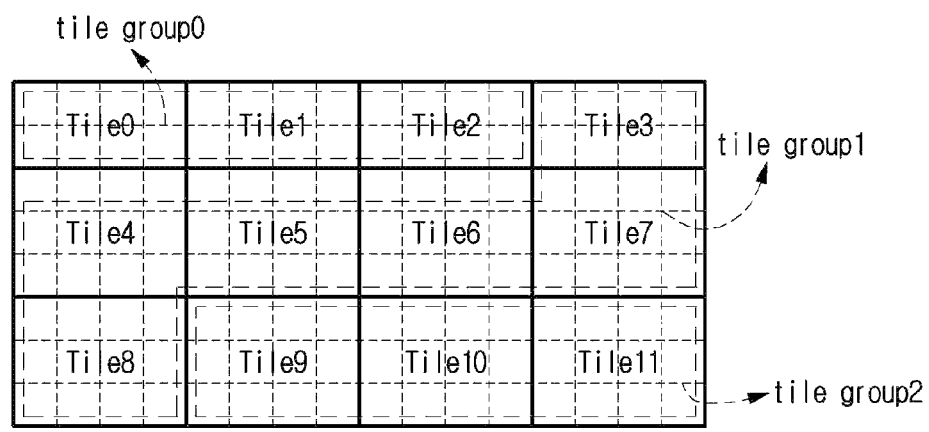
[FIG. 37]
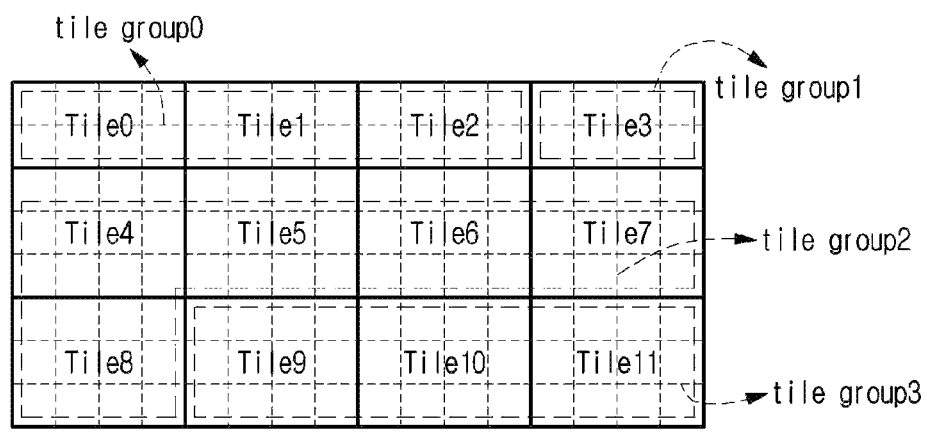

[FIG. 38]
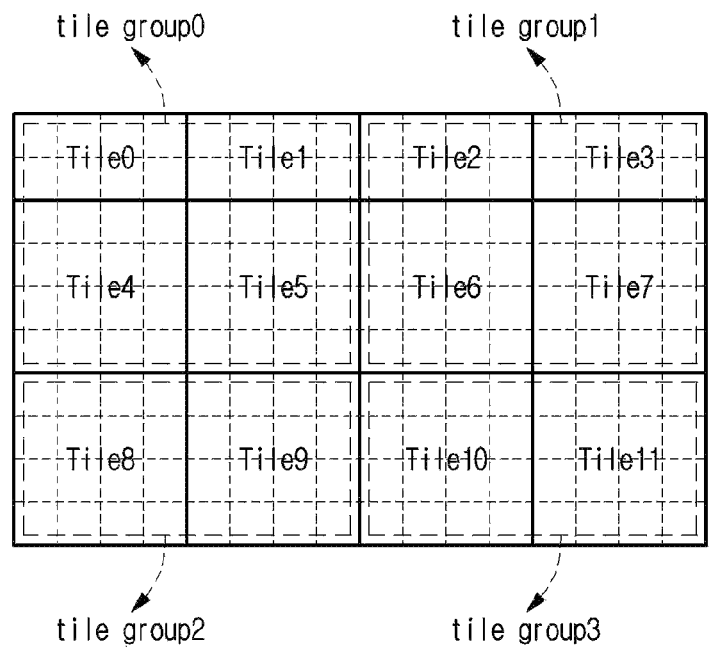

IMAGE SIGNAL ENCODING/DECODING METHOD AND DEVICE THEREFOR

CROSS-REFERENCE TO RELATED APPLICATIONS

This is a continuation of U.S. patent application Ser. No. 17/873,095, filed on Jul. 25, 2022, a continuation of U.S. patent application Ser. No. 17/282,561, filed on Apr. 2, 2021, now U.S. Pat. No. 11,470,313, and a continuation of PCT International Application No. PCT/KR2020/007985, filed on Jun. 19, 2020, which claim foreign priority to Korean Patent Application No. 10-2019-0074659, filed on Jun. 22, 2019 and Korean Patent Application No. 10-2019-0129991, filed on Oct. 18, 2019, which are hereby incorporated by reference in their entireties.

FIELD OF THE DISCLOSURE

The present disclosure relates to a video signal encoding/decoding method and a device therefor.

DESCRIPTION OF THE RELATED ART

As display panels become larger, video service of higher quality is required. The biggest problem with high-definition video service is that an amount of data is greatly increased. In order to solve the above problem, research for improving the video compression rate is being actively conducted. As a representative example, the Joint Collaborative Team on Video Coding (JCT-VC) was formed in 2009 by the Motion Picture Experts Group (MPEG) and the Video Coding Experts Group (VCEG) under the International Telecommunication Union-Telecommunication (ITU-T). The JCT-VC proposed High Efficiency Video Coding (HEVC), a video compression standard that has about twice compression performance of H.264/AVC, and that was approved as standard on Jan. 25, 2013. However, with rapid development of high-definition video services, the performance of HEVC is gradually showing its limitations.

DISCLOSURE

Technical Purpose

A purpose of the present disclosure is to provide a method for partitioning a picture into a plurality of tiles or a plurality of slices in encoding/decoding a video signal, and a device for performing the method.

A purpose of the present disclosure is to provide a method for partitioning a slice based on a tile index in partitioning a picture into a plurality of tiles, and a device for performing the method.

A purpose of the present disclosure is to provide a method for partitioning a slice based on difference information with a previous slice in partitioning a picture into a plurality of slices, and a device for performing the method.

Technical purposes obtainable from the present disclosure are non-limited to the above-mentioned technical purposes, and other unmentioned technical purposes may be clearly understood from the following description by those having ordinary skill in the technical field to which the present disclosure pertains.

Technical Solution

A video signal decoding method according to the present disclosure may include partitioning a current picture into a plurality of tiles, decoding partitioning information representing a slice type, wherein the partitioning information represents whether a rectangular slice is applied or not, and determining a slice based on tile index difference information when the partitioning information represents that the rectangular slice is applied. In this case, the tile index difference information may represent an index difference between a top-left tile included by the slice and a top-left tile of a subsequent slice.

A video signal encoding method according to the present disclosure may include partitioning a current picture into a plurality of tiles, determining whether a rectangular slice is applied, partitioning the current picture into a plurality of rectangular slices when the rectangular slice is applied or not and encoding tile index difference information for at least one of the plurality of slices. In this case, the tile index difference information may represent an index difference between a top-left tile included by a slice and a top-left tile of a subsequent slice.

In a video signal decoding method according to the present disclosure, the method may further include decoding a difference information present flag representing whether the tile index difference information is present. In this case, whether the difference information present flag is to be decoded or not may be determined based on whether the number of slices included in the current picture is equal to or greater than a threshold value.

In a video signal decoding method according to the present disclosure, when the number of slices included in the current picture is equal to or less than a threshold value, decoding of the difference information present flag may be omitted and a value of the difference information present flag may be inferred to 0.

In a video signal decoding method according to the present disclosure, the method may further comprise decoding information representing a size of the slice. The information representing a size of the slice may include width information representing a width of a slice and height information representing a height of a slice and whether height information is decoded for the slice may be determined based on whether the slice is adjacent to a left boundary of the current picture.

In a video signal decoding method according to the present disclosure, when the slice is not adjacent to a left boundary of the current picture, decoding of the height information may be omitted and a height of the slice may be set the same as a height of other slice adjacent to a left boundary of the current picture.

In a video signal decoding method according to the present disclosure, partitioning the current picture into the plurality of tiles may comprise decoding width information representing a width of at least one of a plurality of tile columns included by the current picture and partitioning the current picture into the plurality of tile columns based on the width information. In this case, when decoding of the width information is omitted for a first tile column among the plurality of tile columns, a width of the first tile column may be determined based on width information of a second tile column which is decoded last.

It is to be understood that the foregoing summarized features are exemplary aspects of the following detailed description of the present disclosure without limiting the scope of the present disclosure.

Technical Effect

According to the present disclosure, encoding/decoding efficiency may be improved by partitioning a picture into a plurality of tiles or slices.

According to the present disclosure, encoding/decoding efficiency may be improved by partitioning a slice based on a tile index.

According to the present disclosure, encoding/decoding efficiency may be improved by partitioning a slice based on difference information with a previous slice.

Effects obtainable from the present disclosure may be non-limited by the above-mentioned effect, and other unmentioned effects may be clearly understood from the following description by those having ordinary skill in the technical field to which the present disclosure pertains.

BRIEF DESCRIPTION OF THE DRAWINGS

FIG. 1 is a view showing a block diagram of a video encoding device (encoder) according to an embodiment of the present disclosure;

FIG. 2 is a view showing a block diagram of a video decoding device (decoder) according to an embodiment of the present disclosure;

FIG. 3 is a view showing a basic coding tree unit according to an embodiment of the present disclosure;

FIG. 4 is a view showing various partitioning types of a coding block.

FIG. 5 is a view of an example showing an aspect of partitioning a CTU.

FIG. 6 is a flow diagram of an inter prediction method according to an embodiment of the present disclosure.

FIG. 7 is a diagram illustrating the nonlinear motion of an object.

FIG. 8 is a flow diagram of an inter-prediction method based on an affine motion according to an embodiment of the present disclosure.

FIG. 9 is a diagram illustrating affine seed vectors for each affine motion model.

FIG. 10 is a diagram illustrating affine vectors of sub-blocks in a 4-parameter motion model.

FIG. 11 is a diagram of illustrating candidate blocks used to derive a merge candidate.

FIG. 12 is a diagram to explain the update aspect of a motion information table.

FIG. 13 is a diagram to explain the update aspect of a motion information table.

FIG. 14 is a diagram showing the update aspect of a motion information table.

FIG. 15 is a diagram showing an example in which the index of a saved motion information candidate is renewed.

FIG. 16 is a diagram showing an example in which a redundancy check is performed only for a part of merge candidates.

FIG. 17 is a diagram showing an example in which a redundancy check with a specific merge candidate is omitted.

FIG. 18 is a diagram showing an example in which a candidate block included in the same merge processing region as a current block is set to be unavailable as a merge candidate.

FIG. 19 is a diagram showing an example deriving a merge candidate for a current block when a current block is included in a merge processing region.

FIG. 20 is a diagram showing a temporary motion information table.

FIG. 21 is a diagram showing an example in which a motion information table and a temporary motion information table are unified.

FIG. 22 is a flow diagram of an intra-prediction method according to an embodiment of the present disclosure.

FIG. 23 is a diagram showing intra-prediction modes.

FIG. 24 and FIG. 25 are a diagram showing the example of a one-dimensional array in which reference samples are arranged in a row.

FIG. 26 is a diagram illustrating an angle formed by directional intra-prediction modes with a straight line parallel to an x-axis.

FIG. 27 is a diagram showing an aspect in which a prediction sample is obtained in case that a current block has a non-square shape.

FIG. 28 is a diagram showing wide angle intra-prediction modes.

FIG. 29 is a diagram showing an example in which whether transform skip is performed is determined per sub-block.

FIG. 30 is a diagram showing an example in which sub-blocks use the same transform type.

FIG. 31 is a flow diagram showing a process of determining a blocking strength.

FIG. 32 shows predefined filter candidates.

FIG. 33 is a diagram showing a picture partitioning method according to an embodiment of the present disclosure.

FIG. 34 shows an example in which a picture is partitioned into a plurality of tiles.

FIG. 35 is a diagram for explaining a generation aspect of a brick.

FIGS. 36 and 37 are diagrams showing an example in which a slice is defined based on a raster order.

FIG. 38 is a diagram showing an example in which only a slice in a rectangular shape is allowed.

DETAILED DESCRIPTION OF THE DISCLOSURE

Hereinafter, embodiments of the present disclosure will be described in detail with reference to the accompanying drawings.

Image encoding and decoding is performed on a basis of a block. In an example, for a coding block, a transform block, or a prediction block, encoding/decoding processes such as transform, quantization, prediction, in-loop filtering, reconstruction, etc. may be performed.

Hereinafter, an encoding/decoding target block is referred to as a "current block". In an example, a current block may represent a coding block, a transform block, or a prediction block according to a current process of encoding/decoding.

In addition, the term "unit" used in the present specification represents a basis unit for performing a specific encoding/decoding process, and a "block" may be understood to represent a sample array having a predetermined size. Unless otherwise stated, "block" and "unit" may be used interchangeably. In an example, in examples described later, a coding block and a coding unit may be understood to have the same meaning as each other.

FIG. 1 is view showing a block diagram of an image encoding apparatus (encoder) according to an embodiment of the present disclosure.

Referring to FIG. 1, an image encoding apparatus 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

Components described in FIG. 1 are independently illustrated in order to show different characteristic functions in an image encoding apparatus, and the figure does not mean that each component is constituted by separated hardware or one software unit. That is, each component is just enumerated for convenience of explanation, at least two components of respective components may constitute one component or one component may be partitioned into a plurality of components which may perform their functions. Even an embodiment of integrating respective components and embodiment of dividing a component are also included in the scope of the present disclosure unless they are departing from the spirit of the present disclosure.

Further, some components are not requisite components that perform essential functions of the present disclosure but are optional components for just improving performance. The present disclosure may be implemented with the requisite component for implementing the spirit of the present disclosure other than the component used to just improve the performance and a structure including only the requisite component other than the optional component used to just improve the performance is also included in the scope of the present disclosure.

The picture partitioning unit 110 may partition an input picture into at least one processing unit. In this connection, the processing unit may be a prediction unit (PU), a transform unit (TU), or a coding unit (CU). In the picture partitioning unit 110, a single picture may be partitioned into combinations of a plurality of coding units, prediction units, and transform units, and the picture may be encoded by selecting a combination of the coding units, the prediction units, and the transform units according to a predetermined condition (for example, cost function).

For example, a single picture may be partitioned into a plurality of coding units. In order to partition a picture into coding units, a recursive tree structure such as a quad-tree structure may be used, and a coding unit that is originated from a root such as a single image or largest coding unit may be partitioned into other coding units and may have child nodes as many as the partitioned coding units. A coding unit that is no longer partitioned according to certain restrictions becomes a leaf node. Namely, when it is assumed that only square partitioning is available for a single coding unit, a single coding unit may be partitioned into at most four other coding units.

Hereinafter, in the embodiment of the present disclosure, a coding unit may be used as a unit for encoding or may be used as a unit for decoding.

A prediction unit may be obtained by partitioning a single coding unit into at least one square or rectangle having the same size, or a single coding unit may be partitioned into prediction units in such a manner that one prediction unit may be different from another prediction unit in a shape and/or size.

In generation of a prediction unit based on a coding block to which intra-prediction is being performed, when the coding unit is not the smallest coding unit, intra-prediction may be performed without performing partitioning into a plurality of N×N prediction units.

The prediction units 120 and 125 may include an inter-prediction unit 120 performing inter-prediction and an intra prediction unit 125 performing intra-prediction. Whether to perform inter-prediction or intra-prediction on a prediction unit may be determined, and detailed information (for example, an intra-prediction mode, a motion vector, a reference picture, etc.) according to each prediction method may be determined. In this connection, a processing unit on which prediction is performed may differ with a processing unit for which a prediction method, and detail thereof are determined. For example, a prediction method, a prediction mode, etc. may be determined on the basis of a prediction unit, and prediction may be performed on the basis of a transform unit. A residual value (residual block) between the generated prediction block and an original block may be input to the transform unit 130. In addition, prediction mode information used for prediction, motion vector information, etc. may be encoded using a residual value by the entropy encoding unit 165 and may be transmitted to the decoder. When a specific encoding mode is used, an original block is encoded as it is and transmitted to a decoding unit without generating a prediction block through the prediction unit 120 or 125.

The inter-prediction unit 120 may predict a prediction unit on the basis of information on at least one of a previous picture and a subsequent picture of a current picture, or in some cases, may predict a prediction unit on the basis of information on some encoded regions in the current picture. The inter-prediction unit 120 may include a reference picture interpolation unit, a motion prediction unit, and a motion compensation unit.

The reference picture interpolation unit may receive reference picture information from the memory 155, and generate pixel information of a pixel at an integer or less from the reference picture. In case of a luma pixel, an 8-tap DCT-based interpolation filter having different coefficients may be used so as to generate pixel information on a pixel at an integer or less for a ¼ pixel unit. In case of a chroma signal, a 4-tap DCT-based interpolation filter having different filter coefficients may be used so as to generate pixel information on a pixel at an integer or less for a ⅛ pixel unit.

The motion prediction unit may perform motion prediction based on a reference picture interpolated by the reference picture interpolation unit. As methods for calculating a motion vector, various methods, such as a full search-based block matching algorithm (FBMA), a three step search (TSS) algorithm, a new three-step search (NTS) algorithm, etc. may be used. A motion vector may have a motion vector value in a unit of ½ or ¼ pixel on the basis of the interpolated pixel. The motion prediction unit may predict a current prediction unit by varying a motion prediction method. As motion prediction methods, various methods, such as a skip method, a merge method, an advanced motion vector prediction (AMVP) method, an intra block copy method, etc. may be used.

The intra-prediction unit 125 may generate a prediction unit on the basis of information on a reference pixel around a current block, which is pixel information in a current picture. When a neighboring block of a current prediction unit is a block for which inter-prediction is performed, and thus a reference pixel is a pixel for which inter-prediction is performed, a reference pixel included in the block for which inter-prediction is performed may be replaced by information on a reference pixel of a neighboring block for which intra-prediction is performed. In other words, when a reference pixel is unavailable, at least one reference pixel of available reference pixels may be used in place of unavailable reference pixel information.

A prediction mode in intra-prediction may include a directional prediction mode using reference pixel information according to a prediction direction and a non-directional mode not using directional information when performing prediction. A mode for predicting luma information may be different from a mode for predicting chroma information. In order to predict the chroma information, information on an intra-prediction mode used for predicting the luma information or information on a predicted luma signal may be used.

In performing intra-prediction, when a prediction unit is identical in a size with a transform unit, intra-prediction may be performed on the prediction unit on the basis of pixels positioned at the left, the top-left, and the top of the prediction unit. However, in performing intra-prediction, when a prediction unit is different in a size with a transform unit, intra-prediction may be performed by using a reference pixel based on the transform unit. In addition, intra-prediction using N×N partitioning may be only used for the smallest coding unit.

In an intra-prediction method, a prediction block may be generated after applying an adaptive intra smoothing (AIS) filter to a reference pixel according to a prediction mode. A type of AIS filter applied to a reference pixel may vary. In order to perform an intra-prediction method, an intra prediction mode for a current prediction unit may be predicted from an intra-prediction mode of a prediction unit present around the current prediction unit. In predicting a prediction mode for a current prediction unit by using mode information predicted from a neighboring prediction unit, when an intra prediction mode for the current prediction unit is identical to an intra prediction mode of the neighboring prediction unit, information indicating that the current prediction unit and the neighboring prediction unit have the same prediction mode may be transmitted by using predetermined flag information. When a prediction mode for the current prediction unit is different from prediction modes of the neighboring prediction units, entropy encoding may be performed to encode information on a prediction mode for a current block.

In addition, a residual block may be generated which includes information on a residual value that is a difference value between a prediction unit for which prediction is performed on by the prediction unit 120 or 125, and an original block of the prediction unit. The generated residual block may be input to the transform unit 130.

The transform unit 130 may perform transform on a residual block, which includes information on a residual value between an original block and a prediction unit generated by the prediction unit 120 or 125, by using a transform method such as discrete cosine transform (DCT) or discrete sine transform (DST). In this connection, a DCT transform core includes at least one of DCT2 or DCT8 and a DST transform core includes DST7. Whether to apply DCT, or DST so as to perform transform on a residual block may be determined on the basis of information on an intra-prediction mode of a prediction unit which is used to generate the residual block. It is possible to skip a transform for a residual block. A flag indicating whether or not to skip a transform for a residual block may be encoded. A transform skip may be allowed for a residual block whose a size is smaller than or equal to a threshold value, a residual block of a luma component, or a residual block of a chroma component under 4:4:4 format.

The quantization unit 135 may perform quantization on values transformed into a frequency domain by the transform unit 130. A quantization coefficient may vary according to a block or importance of an image. Values calculated in the quantization unit 135 may be provided to the dequantization unit 140 and the rearrangement unit 160.

The rearrangement unit 160 may perform rearrangement on coefficient values with respect to quantized residual values.

The rearrangement unit 160 may change coefficients in the form of a two-dimensional block into coefficients in the form of a one-dimensional vector through a coefficient scanning method. For example, the rearrangement unit 160 may scan from a DC coefficient to a coefficient in a high frequency domain by using a zigzag scanning method so as to change the coefficients into the form of a one-dimensional vector. According to a size and an intra prediction mode of a transform unit, rather than zigzag scanning, vertical directional scanning where coefficients in the form of a two-dimensional block are scanned in a column direction, or horizontal directional scanning where coefficients in the form of two-dimensional block are scanned in a row direction may be used. In other words, which scanning method among zigzag scanning, vertical directional scanning, and horizontal directional scanning is used may be determined according to a size and an intra prediction mode of a transform unit.

The entropy encoding unit 165 may perform entropy encoding on the basis of values calculated by the rearrangement unit 160. Entropy encoding may use various encoding methods, for example, exponential Golomb coding, context-adaptive variable length coding (CAVLC), or context-adaptive binary arithmetic coding (CABAL).

The entropy encoding unit 165 may encode various types of information, such as information on a residual value coefficient and information on a block type of a coding unit, information on a prediction mode, information on a partitioning unit, information on a prediction unit, information on a partitioning unit, information on a prediction unit and information on a transmission unit, information on a motion vector, information on a reference frame, information on a block interpolation, filtering information, etc. obtained from the rearrangement unit 160 and the prediction units 120 and 125.

The entropy encoding unit 165 may entropy encode coefficients of a coding unit input from the rearrangement unit 160.

The dequantization unit 140 may perform dequantization on values quantized in the quantization unit 135, and the inverse-transform unit 145 may perform inverse-transform on values transformed in the transform unit 130. A residual value generated by the dequantization unit 140 and the inverse-transform unit 145 may be added with a prediction unit predicted by a motion estimation unit, a motion compensation unit, or the intra-prediction unit which are included in the prediction units 120 and 125 so as to generate a reconstructed block.

The filter unit 150 may include at least one of a deblocking filter, an offset correction unit, and an adaptive loop filter (ALF).

The deblocking filter may remove block distortion that occurs due to boundaries between blocks in a reconstructed picture. In order to determine whether or not to perform deblocking, whether or not to apply a deblocking filter to a current block may be determined on the basis of pixels included in several rows and columns included in a block. When a deblocking filter is applied to a block, a strong filter or a weak filter is applied according to required deblocking filtering strength. In addition, in applying a deblocking filter, when performing horizontal directional filtering and vertical directional filtering, horizontal directional filtering and vertical directional filtering may be configured to be processed in parallel.

The offset correction unit may correct an original image by an offset in a unit of a pixel with respect to an image for which deblocking is performed. In order to perform offset correction on a specific picture, a method of applying a offset to a region which is determined after partitioning pixels of the image into the predetermined number of regions, or a method of applying an offset according to edge information of each pixel may be used.

Adaptive loop filtering (ALF) may be performed on the basis of a value obtained by comparing a filtered reconstructed image with an original image. Pixels included in an image may be partitioned into predetermined groups, a filter to be applied to each of the groups may be determined, and filtering may be individually performed on each group. Information on whether or not to apply ALF and may be transmitted for each coding unit (CU) for a luma signal, and a shape and a filter coefficient of an ALF filter to be applied may vary on the basis of each block. Alternatively, an ALF filter having the same shape (fixed shape) may be applied regardless of a feature of a block to which the filter will be applied.

In the memory 155, a reconstructed block or picture calculated through the filter unit 150 may be stored. The stored reconstructed block or picture may be provided to the prediction unit 120 or 125 when performing inter-prediction.

FIG. 2 is view showing a block diagram of an image decoding apparatus (decoder) according to an embodiment of the present disclosure.

Referring to FIG. 2, an image decoding apparatus 200 may include: an entropy decoding unit 210, a rearrangement unit 215, a dequantization unit 220, an inverse-transform unit 225, prediction units 230 and 235, a filter unit 240, and a memory 245.

When an image bitstream is input from the encoder, the input bitstream may be decoded according to an inverse process of the image encoding apparatus.

The entropy decoding unit 210 may perform entropy decoding according to the inverse process of the entropy encoding by the entropy encoding unit of the image encoder. For example, in association with the methods performed by the image encoder apparatus, various methods, such as exponential Golomb coding, context-adaptive variable length coding (CAVLC), or context-adaptive binary arithmetic coding (CABAC) may be applied.

The entropy decoding unit 210 may decode information on intra-prediction and inter-prediction performed by the encoder.

The rearrangement unit 215 may perform rearrangement on the bitstream entropy decoded by the entropy decoding unit 210 on the basis of the rearrangement method used in the encoder. Coefficients represented in the form of a one-dimensional vector may be reconstructed and rearranged into coefficients in the form of a two-dimensional block. The rearrangement unit 215 may perform rearrangement through a method of receiving information related to coefficient scanning performed in the encoder and of inversely scanning on the basis of the scanning order performed in the encoder.

The dequantization unit 220 may perform dequantization on the basis of a quantization parameter received from the encoder and coefficient values of the rearranged block.

The inverse-transform unit 225 may perform, an inverse transform, that is inverse DCT or inverse DST, against to a transform, that is DCT or DST, performed on the quantization result by the transform unit in the image encoder. In this connection, a DCT transform core may include at least one of DCT2 or DCT8, and a DST transform core may include DST7. Alternatively, when the transform is skipped in the image encoder, the inverse-transform also not be performed in the inverse-transform unit 225. Inverse transform may be performed on the basis of a transmission unit determined by the image encoder. The inverse transform unit 225 of the image decoder may selectively perform a transform method (for example, DCT, or DST) according to multiple pieces of information, such as a prediction method, a size of a current block, a prediction direction, etc.

The prediction unit 230 or 235 may generate a prediction block on the basis of information related to a prediction block received from the entropy decoding unit 210 and information on a previously decoded block or picture received from the memory 245.

As described above, as the operation of the image encoder, in performing intra-prediction, when a prediction unit is identical in size with a transform unit, intra-prediction may be performed on the prediction unit on the basis of pixels positioned at the left, the top-left, and the top of the prediction unit. However, in performing intra-prediction, when a prediction unit is different in size with a transform unit, intra-prediction may be performed by using a reference pixel based on the transform unit. In addition, intra-prediction using N×N partitioning may be only used for the smallest coding unit.

The prediction units 230 and 235 may include a PU determination module, an inter-prediction unit, and an intra-prediction unit. The PU determination unit may receive various types of information, such as information on a prediction unit, information on a prediction mode of an intra-prediction method, information on a motion prediction of an inter-prediction method, etc. which are input from the entropy decoding unit 210, divide a prediction unit in a current coding unit, and determine whether inter-prediction or intra-prediction is performed on the prediction unit. By using information required in inter-prediction of a current prediction unit received from the image encoder, the inter-prediction unit 230 may perform inter-prediction on the current prediction unit on the basis of information on at least one of a previous picture and a subsequent picture of a current picture including the current prediction unit. Alternatively, inter-prediction may be performed on the basis of information on some pre-reconstructed regions in a current picture including the current prediction unit.

In order to perform inter-prediction, which method among a skip mode, a merge mode, an AMVP mode, or an intra block copy mode is used as a motion prediction method for a prediction unit included in a coding unit may be determined on the basis of the coding unit.

The intra prediction unit 235 may generate a prediction block on the basis of information on a pixel within a current picture. When a prediction unit is a prediction unit for which intra-prediction has been performed, intra-prediction may be performed on the basis of information on an intra-prediction mode of a prediction unit received from the image encoder. The intra prediction unit 235 may include an adaptive intra smoothing (AIS) filter, a reference pixel interpolation module, or a DC filter. The AIS filter may perform filtering on a reference pixel of a current block, and whether to apply the filter may be determined according to a prediction mode for a current prediction unit. A prediction mode of the prediction unit and information on an AIS filter which are received from the image encoder may be used when performing AIS filtering on a reference pixel of a current block. When a prediction mode for the current block is a mode to which AIS filtering is not applied, the AIS filter may not be applied.

When a prediction mode of a prediction unit is a prediction mode for which intra-prediction is performed on the basis of a pixel value obtained by interpolating reference pixels, the reference pixel interpolation unit may interpolate the reference pixels so as to generate a reference pixel having a unit of an integer or less. When a prediction mode for a current prediction unit is a prediction mode where a prediction block is generated without interpolating reference pixels, the reference pixels may not be interpolated. The DC filter may generate a prediction block through filtering when a prediction mode for a current block is a DC mode.

A reconstructed block or picture may be provided to the filter unit 240. The filter unit 240 may include a deblocking filter, an offset correction module, and an ALF.

Information on whether or not a deblocking filter has been applied to a corresponding block or picture and information on whether a strong filter or a weak filter is applied when the deblocking filter is applied may be received from the image encoder. The deblocking filter of the image decoder may receive information on a deblocking filter from the image encoder, and the image decoder may perform deblocking filtering on a corresponding block.

The offset correction unit may perform offset correction on a reconstructed image on the basis of a type of offset correction, information on an offset value, etc. applied to an image when performing encoding.

The ALF may be applied to a coding unit on the basis of information on whether or not to apply ALF, information on an ALF coefficient, etc. received from the encoder. The above ALF information may be provided by being included in a particular parameter set.

In the memory 245, a reconstructed picture or block may be stored so as to be used as a reference picture or reference block, and the reconstructed picture may be provided to an output unit.

FIG. 3 is a view showing a basic coding tree unit according to an embodiment of the present disclosure.

The largest coding block may be defined as a coding tree block. A single picture may be partitioned into a plurality of coding tree units (CTU). A CTU may be a coding unit of the largest size, and may be referred to as the largest coding unit (LCU). FIG. 3 is a view showing an example where a single picture is partitioned into a plurality of CTUs.

A size of a CTU may be defined in a picture level or sequence level. For the same, information representing a size of a CTU may be signaled through a picture parameter set or sequence parameter set.

In an example, a size of a CTU for the entire picture within a sequence may be set to 128×128. Alternatively, any one of 128×128 or 256×256 may be determined as a size of a CTU in a picture level. In an example, a CTU may be set to have a size of 128×128 in a first picture, and a size of 256×256 in a second picture.

Coding blocks may be generated by partitioning a CTU. A coding block represents a basic unit for performing encoding/decoding. In an example, prediction or transform may be performed for each coding block, or a prediction encoding mode may be determined for each coding block. In this connection, the prediction encoding mode represents a method of generating a prediction image. In an example, a prediction encoding mode may include intra-prediction, inter-prediction, current picture referencing (CPR), intra block copy (IBC) or combined prediction. For a coding block, a prediction block of the coding block may be generated by using a prediction encoding mode of at least one of intra-prediction, inter-prediction, current picture referencing, or combined prediction.

Information representing a prediction encoding mode for a current block may be signaled in a bitstream. In an example, the information may be a 1-bit flag representing whether a prediction encoding mode is an intra mode or an inter mode. When a prediction encoding mode for a current block is determined as an inter mode, current picture referencing or combined prediction may be available.

Current picture referencing is setting a current picture as a reference picture and obtaining a prediction block of a current block from a region that has been already encoded/decoded within a current picture. In this connection, the current picture means a picture including the current block. Information representing whether or not current picture referencing is applied to a current block may be signaled in a bitstream. In an example, the information may be a 1-bit flag. When the flag is TRUE, a prediction encoding mode for a current block may be determined as current picture referencing, and when the flag is FALSE, a prediction encoding mode for a current block may be determined as inter-prediction.

Alternatively, a prediction encoding mode for a current block may be determined on the basis of a reference picture index. In an example, when a reference picture index indicates a current picture, a prediction encoding mode for a current block may be determined as current picture referencing. When a reference picture index indicates a picture other than a current picture, a prediction encoding mode for a current block may be determined as inter-prediction. In other words, current picture referencing is a prediction method using information on a region that has been already encoded/decoded within a current picture, and inter-prediction is a prediction method using information on another picture that has been already encoded/decoded.

Combined prediction represents a combined encoding mode combining at least two of intra-prediction, inter-prediction, and current picture referencing. In an example, when combined prediction is applied, a first prediction block may be generated on the basis of any one of intra-prediction, inter-prediction or current picture referencing, and a second prediction block may be generated on the basis of another. When a first prediction block and a second prediction block are generated, a final prediction block may be generated by calculating an average or weighted sum of the first prediction block and the second prediction block. Information representing whether or not to apply combined prediction to a current block may be signaled in a bitstream. The information may be a 1-bit flag.

FIG. 4 is a view showing various partitioning types a coding block.

A coding block may be partitioned into a plurality of coding blocks on the basis of quad-tree partitioning, binary-tree partitioning or ternary tree partitioning. The partitioned coding block may be partitioned again into a plurality of coding blocks on the basis of quad-tree partitioning, binary-tree partitioning or ternary tree partitioning.

Quad-tree partitioning represents a method of partitioning a current block into four blocks. As a result of quad-tree partitioning, a current block may be partitioned into four square partitions (refer to "SPLIT_QT" of FIG. 4(*a*)).

Binary-tree partitioning represents a method of partitioning a current block into two blocks. Partitioning a current block into two blocks along a vertical direction (that is, using a vertical line across the current block) may be referred to vertical directional binary-tree partitioning, and partitioning a current block into two blocks along a horizontal direction (that is, using a horizontal line across the current block) may be referred to as horizontal directional binary-tree partitioning. As a result of binary-tree partitioning, a current block may be partitioned into two non-square partitions. "SPLIT_BT_VER" of FIG. 4(*b*) is a view showing a result of vertical directional binary-tree partitioning, and "SPLIT_BT_HOR" of FIG. 4(*c*) is a view showing a result of horizontal directional binary-tree partitioning.

Ternary-tree partitioning represents a method of partitioning a current block into three blocks. Partitioning a current block into three blocks along a vertical direction (that is, using two vertical lines across the current block) may be referred to vertical directional ternary-tree partitioning, and partitioning a current block into three blocks along a horizontal direction (that is, using two horizontal lines across the current block) may be referred to as horizontal directional ternary-tree partitioning. As a result of ternary-tree partitioning, a current block may be partitioned into three non-square partitions. In this connection, a width/height of a partition positioned at the center of a current block may be twice than a width/height of other partitions. "SPLIT_TT_VER" of FIG. 4(d) is a view showing a result of vertical directional ternary-tree partitioning, and "SPLIT_TT_HOR" of FIG. 4(e) is a view showing a result of horizontal directional ternary-tree partitioning.

The number of partitioning times of a CTU may be defined as a partitioning depth. The maximum partitioning depth of a CTU may be determined in a sequence or picture level. Accordingly, the maximum partitioning depth of a CTU may vary on the basis of a sequence or picture.

Alternatively, the maximum partitioning depth may be independently determined for each partitioning method. In an example, the maximum partitioning depth where quad-tree partitioning is allowed may differ from the maximum partitioning depth where binary-tree partitioning and/or ternary-tree partitioning is allowed.

The encoder may signal information representing at least one of a partitioning type and a partitioning depth of a current block in a bitstream. The decoder may determine a partitioning type and a partitioning depth of a CTU on the basis of the information obtained by parsing a bitstream.

FIG. 5 is a view of an example showing an aspect of partitioning a CTU.

Partitioning a coding block by using quad-tree partitioning, binary-tree partitioning and/or ternary-tree partitioning may be referred to as multi-tree partitioning.

Coding blocks generated by partitioning a coding block by applying multi-tree partitioning may be referred to child coding blocks. When a partitioning depth of a coding block is k, a partitioning depth of child coding blocks is set to k+1.

To the contrary, for coding blocks having a partitioning depth of k+1, a coding block having a partitioning depth of k may be referred to as a parent coding block.

A partitioning type of a current coding block may be determined on the basis of at least one of a partitioning type of a parent coding block and a partitioning type of a neighboring coding block. In this connection, the neighboring coding block may be a block adjacent to a current coding block, and include at least one of an top neighboring block, a left neighboring block, or a neighboring block adjacent to the top-left corner of the current coding block. In this connection, the partitioning type may include whether or not to apply quad-tree partitioning, whether or not to apply binary-tree partitioning, a direction of binary-tree partitioning, whether or not to apply ternary-tree partitioning, or a direction of ternary-tree partitioning.

In order to determine a partitioning type of a coding block, information representing whether or not a coding block is partitioned may be signaled in a bitstream. The information is a 1-bit flag of "split_cu_flag", and when the flag is TRUE, it may represent that a coding block is partitioned by a multi tree partitioning method.

When split_cu_flag is TRUE, information representing whether or not a coding block is partitioned by quad-tree partitioning may be signaled in a bitstream. The information is a 1-bit flag of split_qt_flag, and when the flag is TRUE, a coding block may be partitioned into four blocks.

In an example, in an example shown in FIG. 5, a CTU is partitioned by quad-tree partitioning, and thus four coding blocks having a partitioning depth of 1 are generated. In addition, it is shown that quad-tree partitioning is applied again to the first coding block and the fourth coding block among four coding blocks generated by quad-tree partitioning. As a result, four coding blocks having a partitioning depth of 2 may be generated.

In addition, by applying again quad-tree partitioning to a coding block having a partitioning depth of 2, a coding block having a partitioning depth of 3 may be generated.

When quad-tree partitioning is not applied to a coding block, whether to perform binary-tree partitioning or ternary-tree partitioning for the coding block may be determined according to at least one of a size of the coding block, whether or not the coding block is positioned at a picture boundary, the maximum partitioning depth, or a partitioning type of a neighboring block. When it is determined to perform binary-tree partitioning or ternary-tree partitioning for the coding block, information representing a partitioning direction may be signaled in a bitstream. The information may be a 1-bit flag of mtt_split_cu_vertical_flag. Whether a partitioning direction is a vertical direction or a horizontal direction may be determined on the basis of the flag. Additionally, information representing which one of binary-tree partitioning or ternary-tree partitioning is applied to the coding block may be signaled in a bitstream. The information may be a 1-bit flag of mtt_split_cu_binary_flag. Whether binary-tree partitioning is applied to the coding block or ternary-tree partitioning is applied to the coding block may be determined on the basis of the flag.

In an example, in an example shown in FIG. 5, vertical directional binary-tree partitioning is applied to a coding block having a partitioning depth of 1, vertical directional ternary-tree partitioning is applied to a left coding block among coding blocks generated by the partitioning, and vertical directional binary-tree partitioning is applied to a right coding block.

Inter-prediction is a prediction encoding mode predicting a current block by using information on a previous picture. In an example, a block (hereinafter, collocated block) at the same position with a current block within a previous picture may be set as a prediction block of the current block. Hereinafter, a prediction block generated on the basis of a collocated block of the current block may be referred to as a collocated prediction block.

To the contrary, when an object present in a previous picture has moved to another position in a current picture, a current block may be effectively predicted by using motions of the object. For example, when a motion direction and a size of the object is determined by comparing a previous picture with a current picture, a prediction block (or prediction image) of the current block may be generated according to motion information of the objects. Hereinafter, a prediction block generated by using motion information may be referred to as a motion prediction block.

A residual block may be generated by subtracting a prediction block from a current block. In this connection, in case where an object moves, energy of a residual block may be reduced by using a motion prediction block rather than using a collocated prediction block, and thus compression performance of the residual block may be improved.

As above, generating a prediction block by using motion information may be referred to as motion estimation prediction. In the most inter-prediction, a prediction block may be generated on the basis of motion compensation prediction.

Motion information may include at least one of a motion vector, a reference picture index, a prediction direction, and a bidirectional weighting factor index. A motion vector represents a motion direction of an object and a magnitude. A reference picture index specifies a reference picture of a current block among reference pictures included in a reference picture list. A prediction direction indicates any one of uni-directional L0 prediction, uni-directional L1 prediction, or bi-directional prediction (L0 prediction and L1 prediction). At least one of L0 directional motion information and L1 directional motion information may be used according to a prediction direction of a current block. A bidirectional weighting factor index specifies a weighting factor applied to an L0 prediction block and a weighting factor applied to an L1 prediction block.

FIG. 6 is a flow diagram of an inter-prediction method according to the embodiment of the present disclosure.

In reference to FIG. 6, an inter-prediction method includes determining an inter-prediction mode for a current block (S601), obtaining motion information of the current block according to the determined inter-prediction mode (S602), and performing motion compensation prediction for a current block on the basis of the obtained motion information (S603).

In this connection, the inter-prediction mode may represent various methods for determining motion information of a current block, and include an inter-prediction mode using translation motion information, an inter-prediction mode using affine motion information. In an example, an inter-prediction mode using translation motion information may include a merge mode and a motion vector prediction mode, and an inter-prediction mode using affine motion information may include an affine merge mode and an affine motion vector prediction mode. Motion information on a current block may be determined on the basis of a neighboring block neighboring the current block or information obtained by parsing a bitstream. Motion information of a current block may be derived from motion information of another block. In this connection, another block may be a block encoded/decoded by inter prediction previous to the current block. Setting motion information of a current block to be the same as motion information of another block may be defined as a merge mode. Also, setting a motion vector of another block as a prediction value of a motion vector of the current block may be defined as a motion vector prediction mode.

Hereinafter, an inter-prediction method using affine motion information is described in detail.

FIG. 7 is a diagram illustrating a non-linear motion of an object.

In a video, a non-linear motion of an object may occur. In an example, as in an example shown in FIG. 7, a non-linear motion of an object may occur such as camera zoom-in, zoom-out, rotation or affine transform, etc. For the nonlinear motion of the object, a translation motion vector may not effectively express the motion of the object. Accordingly, for a region in which the non-linear motion of the object is occur, encoding efficiency may be improved by using affine motion, instead of translation motion.

FIG. 8 is a flow diagram of an inter-prediction method based on an affine motion according to an embodiment of the present disclosure.

Whether an inter-prediction method based on an affine motion is applied to a current block may be determined based on information parsed from a bitstream. Concretely, based on at least one of a flag indicating whether an affine merge mode is applied to a current block or a flag indicating whether an affine motion vector prediction mode is applied to a current block, whether an inter-prediction method based on an affine motion is applied to a current block will be determined.

When an inter-prediction method based on an affine motion is applied to a current block, an affine motion model for the current block may be determined S801. An affine motion model may be determined as at least one of a 6-parameter affine motion model or a 4-parameter affine motion model. The 6-parameter affine motion model expresses an affine motion by using 6 parameters and the 4-parameter affine motion model expresses an affine motion by using 4 parameters.

Equation 1 expresses an affine motion by using 6 parameters. An affine motion represents translation motion for a predetermined region determined by affine seed vectors.

$$v_x = ax - by + e$$
$$v_y = cx + dy + j \qquad \text{[Equation 1]}$$

In case of expressing an affine motion by using 6 parameters, complicated motion may be expressed, but encoding efficiency may be reduced as more bits are needed to encode each parameter. Accordingly, an affine motion may be expressed by using 4 parameters. Equation 2 expresses an affine motion by using 4 parameters.

$$v_x = ax - by + e$$
$$v_y = bx + ay + j \qquad \text{[Equation 2]}$$

Information for determining an affine motion model of a current block may be encoded and signaled in a bitstream. In an example, the information may be a 1-bit flag, 'affine_type_flag'. If the value of the flag is 0, it may represent that a 4-parameter affine motion model is applied and if the value of the flag is 1, it may represent that a 6-parameter affine motion model is applied. The flag may be encoded in a unit of a slice, a tile, or a block (e.g. a coding block or a coding tree unit). When a flag is signaled at a slice level, an affine motion model determined at the slice level may be applied to all blocks belonging to the slice.

Alternatively, based on an affine inter-prediction mode of a current block, an affine motion model of the current block may be determined. In an example, when an affine merge mode is applied, an affine motion model of a current block may be determined as a 4-parameter motion model. On the other hand, when an affine motion vector prediction mode is applied, information for determining an affine motion model of a current block may be encoded and signaled in a bitstream. In an example, when an affine motion vector prediction mode is applied to a current block, an affine motion model of the current block may be determined based on a 1-bit flag, 'affine_type_flag'.

Next, affine seed vectors of a current block may be derived S802. When a 4-parameter affine motion model is selected, motion vectors at two control points for a current block may be derived. On the other hand, when a 6-parameter affine motion model is selected, motion vectors at three control points for a current block may be derived. A motion vector at a control point may be referred to as an affine seed vector. A control point may include at least one of a left-top corner, a right-top corner or a left-bottom corner of a current block.

FIG. 9 is a diagram illustrating affine seed vectors for each affine motion model.

In a 4-parameter affine motion model, affine seed vectors for two among a left-top corner, a right-top corner or a left-bottom corner may be derived. In an example, as in an example shown in FIG. 9(a), when a 4-parameter affine motion model is selected, an affine vector may be derived by using an affine seed vector sv0 for a left-top corner of a current block (e.g. a left-top sample (x1, y1)) and an affine seed vector sv1 for a right-top corner of the current block (e.g. a right-top sample (x1, y1)). It is possible to use an affine seed vector for a left-bottom corner instead of the affine seed vector for the left-top corner or use an affine seed vector for a left-bottom corner instead of the affine seed vector for the right-top corner.

In a 6-parameter affine motion model, affine seed vectors for a left-top corner, a right-top corner and a left-bottom corner may be derived. In an example, as in an example shown in the FIG. 9(b), when a 6-parameter affine motion model is selected, an affine vector may be derived by using an affine seed vector sv0 for a left-top corner of a current block (e.g. a left-top sample (x1, y1)), an affine seed vector sv1 for a right-top corner of the current block (e.g. a right-top sample (x1, y1)) and an affine seed vector sv2 for a left-top corner of the current block (e.g. a left-top sample (x2, y2)).

In an embodiment described later, under a 4-parameter affine motion model, affine seed vectors at a left-top control point and a right-top control point are referred to as a first affine seed vector and a second affine seed vector, respectively. In embodiments described later which use the first affine seed vector and the second affine seed vector, at least one of the first affine seed vector and the second affine seed vector may be replaced with an affine seed vector at a left-bottom control point (a third affine seed vector) or an affine seed vector at a right-bottom control point (a fourth affine seed vector).

In addition, under a 6-parameter affine motion model, affine seed vectors at a left-top control point, a right-top control point and a left-bottom control point are referred to as a first affine seed vector, a second affine seed vector and a third affine seed vector, respectively. In embodiments described later which use the first affine seed vector, the second affine seed vector and the third affine seed vector, at least one of the first affine seed vector, the second affine seed vector and the third affine seed vector may be replaced with an affine seed vector at a right-bottom control point (a fourth affine seed vector).

An affine vector may be derived per sub-block by using affine seed vectors S803. In this connection, the affine vector represents a translation motion vector derived based on the affine seed vectors. An affine vector of a sub-block can be referred to as an affine sub-block motion vector or a sub-block motion vector.

FIG. 10 is a diagram illustrating affine vectors of sub-blocks under a 4-parameter motion model.

An affine vector of a sub-block may be derived based on a position of a control point, a position of the sub-block and an affine seed vector. In an example, Equation 3 represents an example of deriving an affine sub-block motion vector.

[Equation 3]

$$v_x = \frac{(sv_{1x} - sv_{0x})}{(x_1 - x_0)}(x - x_0) - \frac{(sv_{1y} - sv_{0y})}{(x_1 - x_0)}(y - y_0) + sv_{0x}$$

-continued
$$v_y = \frac{(sv_{1y} - sv_{0y})}{(x_1 - x_0)}(x - x_0) - \frac{(sv_{1x} - sv_{0x})}{(x_1 - x_0)}(y - y_0) + sv_{0y}$$

In the Equation 3, (x, y) represents a position of a sub-block. In this connection, the position of the sub-block represents a position of a base sample included in the sub-block. The base sample may be a sample positioned at a left-top corner of the sub-block or a sample that at least one of an x-axis or y-axis coordinate is at a central position. (x0, y0) represents a position of a first control point and (sv0x, sv0y) represents a first affine seed vector. In addition, (x1, y1) represents a position of a second control point and (sv1x, sv1y) represents a second affine seed vector.

When the first control point and the second control point correspond to a left-top corner and a right-top corner of a current block, respectively, x1-x0 may be set as a value identical to a width of the current block.

After that, motion compensation prediction for each sub-block may be performed by using an affine vector of each sub-block S804. As a result of performing motion compensation prediction, a prediction block for each sub-block may be generated. The prediction blocks of sub-blocks may be set as a prediction block of a current block.

An affine seed vector of a current block may be derived based on an affine seed vector of a neighboring block neighboring the current block. When an inter-prediction mode of a current block is an affine merge mode, an affine seed vector of a merge candidate included in a merge candidate list may be determined as an affine seed vector of the current block. In addition, when the inter-prediction mode of the current block is the affine merge mode, motion information including at least one of the reference picture index, a specific directional prediction flag or a bidirectional weight of the current block may be also set the same as the merge candidate.

Next, an inter-prediction method using translation motion information will be described in detail.

Motion information of a current block may be derived from motion information of another block. In this connection, another block may be a block encoded/decoded by inter prediction previous to the current block. Setting motion information of a current block to be the same as motion information of another block may be defined as a merge mode. Also, setting a motion vector of another block as a prediction value of a motion vector of the current block may be defined as a motion vector prediction mode.

FIG. 11 is a flow diagram of a process deriving the motion information of a current block under a merge mode.

The merge candidate of a current block may be derived S1101. The merge candidate of a current block may be derived from a block encoded/decoded by inter-prediction prior to a current block.

FIG. 12 is a diagram illustrating candidate blocks used to derive a merge candidate.

The candidate blocks may include at least one of neighboring blocks including a sample adjacent to a current block or non-neighboring blocks including a sample non-adjacent to a current block. Hereinafter, samples determining candidate blocks are defined as base samples. In addition, a base sample adjacent to a current block is referred to as a neighboring base sample and a base sample non-adjacent to a current block is referred to as a non-neighboring base sample.

A neighboring base sample may be included in a neighboring column of a leftmost column of a current block or a neighboring row of an uppermost row of a current block. In an example, when the coordinate of a left-top sample of a current block is (0,0), at least one of a block including a base sample at a position of (−1, H−1), (W−1, −1), (W, −1), (−1, H) or (—1, 1) may be used as a candidate block. In reference to a diagram, the neighboring blocks of index 0 to 4 may be used as candidate blocks.

A non-neighboring base sample represents a sample that at least one of an x-axis distance or a y-axis distance with a base sample adjacent to a current block has a predefined value. In an example, at least one of a block including a base sample that an x-axis distance with a left base sample is a predefined value, a block including a non-neighboring sample that a y-axis distance with a top base sample is a predefined value or a block including a non-neighboring sample that a x-axis distance and a y-axis distance with a left-top base sample are a predefined value may be used as a candidate block. A predefined value may be a natural number such as 4, 8, 12, 16, etc. In reference to a diagram, at least one of blocks in an index 5 to 26 may be used as a candidate block.

A sample not positioned on the same vertical line, horizontal line or diagonal line as a neighboring base sample may be set as a non-neighboring base sample.

The motion information of a merge candidate may be set the same as the motion information of a candidate block. In an example, at least one of a motion vector, a reference picture index, a prediction direction or a bidirectional weight index of a candidate block may be set as the motion information of a merge candidate.

A merge candidate list including a merge candidate may be generated S1102.

The index of merge candidates in a merge candidate list may be assigned according to the predetermined order. In an example, an index may be assigned in the order of a merge candidate derived from a left neighboring block, a merge candidate derived from a top neighboring block, a merge candidate derived from a right-top neighboring block, a merge candidate derived from a left-bottom neighboring block, a merge candidate derived from a left-top neighboring block and a merge candidate derived from a temporal neighboring block.

When a plurality of merge candidates are included in a merge candidate, at least one of a plurality of merge candidates may be selected S1103. Concretely, information for specifying any one of a plurality of merge candidates may be signaled in a bitstream. In an example, information, merge_idx, representing an index of any one of merge candidates included in a merge candidate list may be signaled in a bitstream.

When the number of merge candidates included in a merge candidate list is less than the threshold, a motion information candidate included in a motion information table may be added to a merge candidate list as a merge candidate. In this connection, the threshold may be the maximum number of merge candidates which may be included in a merge candidate list or a value in which an offset is subtracted from the maximum number of merge candidates. An offset may be a natural number such as 1 or 2, etc.

A motion information table includes a motion information candidate derived from a block encoded/decoded based on inter-prediction in a current picture. In an example, the motion information of a motion information candidate included in a motion information table may be set the same as the motion information of a block encoded/decoded based on inter-prediction. In this connection, motion information may include at least one of a motion vector, a reference picture index, a prediction direction or a bidirectional weight index.

A motion information candidate included in a motion information table also can be referred to as a inter region merge candidate or a prediction region merge candidate.

The maximum number of a motion information candidate which may be included in a motion information table may be predefined in an encoder and a decoder. In an example, the maximum number of a motion information candidate which may be included in a motion information table may be 1, 2, 3, 4, 5, 6, 7, 8 or more (e.g. 16).

Alternatively, information representing the maximum number of a motion information candidate which may be included in a motion information table may be signaled in a bitstream. The information may be signaled in a sequence, a picture or a slice level. The information may represent the maximum number of a motion information candidate which may be included in a motion information table. Alternatively, the information may represent difference between the maximum number of a motion information candidate which may be included in a motion information table and the maximum number of a merge candidate which may be included in a merge candidate list.

Alternatively, the maximum number of a motion information candidate which may be included in a motion information table may be determined according to a picture size, a slice size or a coding tree unit size.

A motion information table may be initialized in a unit of a picture, a slice, a tile, a brick, a coding tree unit or a coding tree unit line (a row or a column). In an example, when a slice is initialized, a motion information table is also initialized thus a motion information table may not include any motion information candidate.

Alternatively, information representing whether a motion information table will be initialized may be signaled in a bitstream. The information may be signaled in a slice, a tile, a brick or a block level. Until the information indicates the initialization of a motion information table, a pre-configured motion information table may be used.

Alternatively, information on an initial motion information candidate may be signaled in a picture parameter set or a slice header. Although a slice is initialized, a motion information table may include an initial motion information candidate. Accordingly, an initial motion information candidate may be used for a block which is the first encoding/decoding target in a slice.

Alternatively, a motion information candidate included in the motion information table of a previous coding tree unit may be set as an initial motion information candidate. In an example, a motion information candidate with the smallest index or with the largest index among motion information candidates included in the motion information table of a previous coding tree unit may be set as an initial motion information candidate.

Blocks are encoded/decoded in the order of encoding/decoding, and blocks encoded/decoded based on inter-prediction may be sequentially set as a motion information candidate in the order of encoding/decoding.

FIG. 13 is a diagram to explain the update aspect of a motion information table.

For a current block, when inter-prediction is performed S1301, a motion information candidate may be derived based on a current block S1302. The motion information of a motion information candidate may be set the same as that of a current block.

When a motion information table is empty S1303, a motion information candidate derived based on a current block may be added to a motion information table S1304.

When a motion information table already includes a motion information candidate S1303, a redundancy check for the motion information of a current block (or, a motion information candidate derived based on it) may be performed S1305. A redundancy check is to determine whether the motion information of a pre-stored motion information candidate in a motion information table is the same as the motion information of a current block. A redundancy check may be performed for all pre-stored motion information candidates in a motion information table. Alternatively, a redundancy check may be performed for motion information candidates with an index over or below the threshold among pre-stored motion information candidates in a motion information table. Alternatively, a redundancy check may be performed for the predefined number of motion information candidates. In an example, 2 motion information candidates with smallest indexes or with largest indexes may be determined as targets for a redundancy check.

When a motion information candidate with the same motion information as a current block is not included, a motion information candidate derived based on a current block may be added to a motion information table S1308. Whether motion information candidates are identical may be determined based on whether the motion information (e.g. a motion vector/a reference picture index, etc.) of motion information candidates is identical.

In this connection, when the maximum number of motion information candidates are already stored in a motion information table S1306, the oldest motion information candidate may be deleted S1307 and a motion information candidate derived based on a current block may be added to a motion information table S1308. In this connection, the oldest motion information candidate may be a motion information candidate with the largest or the smallest index.

Motion information candidates may be identified by respective index. When a motion information candidate derived from a current block is added to a motion information table, the smallest index (e.g. 0) may be assigned to the motion information candidate and indexes of pre-stored motion information candidates may be increased by 1. In this connection, When the maximum number of motion information candidates are already stored in a motion information table, a motion information candidate with the largest index is removed.

Alternatively, when a motion information candidate derived from a current block is added to a motion information table, the largest index may be assigned to the motion information candidate. In an example, when the number of pre-stored motion information candidates in a motion information table is less than the maximum value, an index with the same value as the number of pre-stored motion information candidates may be assigned to the motion information candidate. Alternatively, when the number of pre-stored motion information candidates in a motion information table is equal to the maximum value, an index subtracting 1 from the maximum value may be assigned to the motion information candidate. Alternatively, a motion information candidate with the smallest index is removed and the indexes of residual pre-stored motion information candidates are decreased by 1.

FIG. 14 is a diagram showing the update aspect of a motion information table.

It is assumed that as a motion information candidate derived from a current block is added to a motion information table, the largest index is assigned to the motion information candidate. In addition, it is assumed that the maximum number of a motion information candidate is already stored in a motion information table.

When a motion information candidate HmvpCand[n+1] derived from a current block is added to a motion information table HmvpCandList, a motion information candidate HmvpCand[0] with the smallest index among pre-stored motion information candidates may be deleted and indexes of residual motion information candidates may be decreased by 1. In addition, the index of a motion information candidate HmvpCand[n+1] derived from a current block may be set to the maximum value (for an example shown in FIG. 14, n).

When a motion information candidate identical to a motion information candidate derived based on a current block is prestored S1305, a motion information candidate derived based on a current block may not be added to a motion information table S1309.

Alternatively, while a motion information candidate derived based on a current block is added to a motion information table, a pre-stored motion information candidate identical to the motion information candidate may be removed. In this case, it causes the same effect as when the index of a pre-stored motion information candidate is newly updated.

FIG. 15 is a diagram showing an example in which the index of a pre-stored motion information candidate is updated.

When the index of a pre-stored motion information candidate identical to a motion information candidate mvCand derived from a current block is hIdx, the pre-stored motion information candidate may be removed and the index of motion information candidates with an index larger than hIdx may be decreased by 1. In an example, an example shown in FIG. 15 showed that HmvpCand[2] identical to mvCand is deleted in a motion information table HvmpCandList and an index from HmvpCand[3] to HmvpCand[n] is decreased by 1.

And, a motion information candidate mvCand derived based on a current block may be added to the end of a motion information table.

Alternatively, an index assigned to a pre-stored motion information candidate identical to a motion information candidate derived based on a current block may be updated. For example, the index of a pre-stored motion information candidate may be changed to the minimum value or the maximum value.

The motion information of blocks included in a predetermined region may be set not to be added to a motion information table. In an example, a motion information candidate derived based on the motion information of a block included in a merge processing region may not be added to a motion information table. Since the encoding/decoding order for blocks included in a merge processing region is not defined, it is improper to use motion information of any one of them for the inter-prediction of another of them. Accordingly, motion information candidates derived based on blocks included in a merge processing region may not be added to a motion information table.

Alternatively, the motion information of a block smaller than a preset size may be set not to be added to a motion information table. In an example, a motion information candidate derived based on the motion information of a coding block whose width or height is smaller than 4 or 8 or the motion information of a 4×4 sized coding block may not be added to a motion information table.

Based on the inter-prediction mode of a current block, it may be determined whether a current block will be used as a motion information candidate. In an example, a block encoded/decoded based on an affine motion model may be set to be unavailable as a motion information candidate. Accordingly, although a current block is encoded/decoded by inter-prediction, a motion information table may not be updated based on a current block when the inter-prediction mode of a current block is an affine prediction mode.

A motion information candidate may be set to include additional information except for motion information. In an example, at least one of the size, shape or partition information of a block may be additionally stored in a motion information candidate. When the merge candidate list of a current block is configured, only motion information candidate whose size, shape or partition information is identical or similar to a current block among motion information candidates may be used or a motion information candidate whose size, shape or partition information is identical or similar to a current block may be added to a merge candidate list in advance.

When the number of a merge candidate included in the merge candidate list of a current block is less than the threshold, a motion information candidate included in a motion information table may be added to a merge candidate list as a merge candidate. The additional process is performed in the order reflecting sorted order of indexes of motion information candidates in ascending or descending order. In an example, a motion information candidate with the largest index may be first added to the merge candidate list of a current block.

When a motion information candidate included in a motion information table is added to a merge candidate list, a redundancy check between a motion information candidate and pre-stored merge candidates in the merge candidate list may be performed. As a result of a redundancy check, a motion information candidate with the same motion information as a pre-stored merge candidate may not be added to the merge candidate list.

A redundancy check may be performed only for a part of motion information candidates included in a motion information table. In an example, a redundancy check may be performed only for a motion information candidate with an index over or below the threshold. Alternatively, a redundancy check may be performed only for N motion information candidates with the largest index or the smallest index.

Alternatively, a redundancy check may be performed only for a part of pre-stored merge candidates in a merge candidate list. In an example, a redundancy check may be performed only for a merge candidate whose index is over or below the threshold or a merge candidate derived from a block at a specific position. In this connection, a specific position may include at least one of the left neighboring block, the top neighboring block, the right-top neighboring block or the left-bottom neighboring block of a current block.

FIG. 16 is a diagram showing an example in which a redundancy check is performed only for a part of merge candidates.

When a motion information candidate HmvpCand[j] is added to a merge candidate list, a redundancy check with 2 merge candidates with the largest index, mergeCandList [NumMerge-2] and mergeCandList[NumMerge-1], may be performed for a motion information candidate. In this connection, NumMerge may show the number of an available spatial merge candidate and a temporal merge candidate.

Unlike a shown example, when a motion information candidate HmvpCand[j] is added to a merge candidate list, a redundancy check with 2 merge candidates with the smallest index may be performed for a motion information candidate. For example, it may be checked whether merge-CandList[0] and mergeCandList[1] are identical to Hmvp-Cand[j].

Alternatively, a redundancy check may be performed only for a merge candidate derived from a specific position. In an example, a redundancy check may be performed for at least one of a merge candidate derived from a neighboring block positioned at the left of a current block or at the top of a current block. When there is no merge candidate derived from a specific position in a merge candidate list, a motion information candidate may be added to a merge candidate list without a redundancy check.

When a motion information candidate HmvpCand[j] is added to a merge candidate list, a redundancy check with 2 merge candidates with the largest index, mergeCandList [NumMerge-2] and mergeCandList[NumMerge-1], may be performed for a motion information candidate. In this connection, NumMerge may show the number of an available spatial merge candidate and a temporal merge candidate.

A redundancy check with a merge candidate may be performed only for a part of motion information candidates. In an example, a redundancy check may be performed only for N motion information candidates with a large or a small index among motion information candidates included in a motion information table. In an example, a redundancy check may be performed only for motion information candidates with an index that the number and difference of motion information candidates included in a motion information table are below the threshold. When the threshold is 2, a redundancy check may be performed only for 3 motion information candidates with the largest index value among motion information candidates included in a motion information table. A redundancy check may be omitted for motion information candidates except for the above 3 motion information candidates. When a redundancy check is omitted, a motion information candidate may be added to a merge candidate list regardless of whether the same motion information as a merge candidate is exist or not.

Conversely, a redundancy check is set to be performed only for motion information candidates with an index that the number and difference of motion information candidates included in a motion information table are over the threshold.

The number of a motion information candidate that a redundancy check is performed may be redefined in an encoder and a decoder. In an example, the threshold may be an integer such as 0, 1 or 2.

Alternatively, the threshold may be determined based on at least one of the number of a merge candidate included in a merge candidate list or the number of motion information candidates included in a motion information table.

When a merge candidate identical to the first motion information candidate is found, a redundancy check with the merge candidate identical to the first motion information candidate may be omitted in a redundancy check for the second motion information candidate.

FIG. 17 is a diagram showing an example in which a redundancy check with a specific merge candidate is omitted.

When a motion information candidate HmvpCand[i] whose index is i is added to a merge candidate list, a redundancy check between the motion information candidate and pre-stored merge candidates in a merge candidate list is performed. In this connection, when a merge candidate mergeCandlist[j] identical to a motion information candidate HmvpCand[i] is found, a redundancy check between a motion information candidate HmvpCand[i−1] whose index is i−1 and merge candidates may be performed without adding the motion information candidate HmvpCand[i] to a merge candidate list. In this connection, a redundancy check between the motion information candidate HmvpCand[i−1] and the merge candidate mergeCandList[j] may be omitted.

In an example, in an example shown in FIG. 17, it was determined that HmvpCand[i] and mergeCandList[2] are identical. Accordingly, a redundancy check for HmvpCand[i−1] may be performed without adding HmvpCand[i] to a merge candidate list. In this connection, a redundancy check between HmvpCand[i−1] and mergeCandList[2] may be omitted.

When the number of a merge candidate included in the merge candidate list of a current block is less than the threshold, at least one of a pairwise merge candidate or a zero merge candidate may be additionally included except for a motion information candidate. A pairwise merge candidate means a merge candidate having a value obtained from averaging the motion vectors of more than 2 merge candidates as a motion vector and a zero merge candidate means a merge candidate whose motion vector is 0.

For the merge candidate list of a current block, a merge candidate may be added in the following order.

Spatial merge candidate—Temporal merge candidate—Motion information candidate—(Affine motion information candidate)—Pairwise merge candidate—Zero merge candidate A spatial merge candidate means a merge candidate derived from at least one of a neighboring block or a non-neighboring block and a temporal merge candidate means a merge candidate derived from a previous reference picture. An affine motion information candidate represents a motion information candidate derived from a block encoded/decoded by an affine motion model.

A motion information table may also be used in a motion vector prediction mode. In an example, when the number of a motion vector prediction candidate included in the motion vector prediction candidate list of a current block is less than the threshold, a motion information candidate included in a motion information table may be set as a motion vector prediction candidate for a current block. Concretely, the motion vector of a motion information candidate may be set as a motion vector prediction candidate.

If any one of motion vector prediction candidates included in the motion vector prediction candidate list of a current block is selected, a selected candidate may be set as a motion vector predictor of a current block. Then, after the motion vector residual value of a current block is decoded, the motion vector of a current block may be obtained by adding up the motion vector predictor and the motion vector residual value.

The motion vector prediction candidate list of a current block may be configured in the following order.

Spatial motion vector prediction candidate—Temporal motion vector prediction candidate—Motion information candidate—(Affine motion information candidate)—Zero motion vector prediction candidate A spatial motion vector prediction candidate means a motion vector prediction candidate derived from at least one of a neighboring block or a non-neighboring block and a temporal motion vector prediction candidate means a motion vector prediction candidate derived from a previous reference picture. An affine motion information candidate represents a motion information candidate derived from a block encoded/decoded by an affine motion model. A zero motion vector prediction candidate represents a candidate that the value of a motion vector is 0.

A merge processing region larger than a coding block may be defined. Coding blocks included in a merge processing region may be processed in parallel without being sequentially encoded/decoded. In this connection, not being sequentially encoded/decoded means the order of encoding/decoding is not defined. Accordingly, the encoding/decoding process of blocks included in a merge processing region may be independently processed. Alternatively, blocks included in a merge processing region may share merge candidates. In this connection, the merge candidates may be derived based on a merge processing region.

According to the above-mentioned feature, a merge processing region may be referred to as a parallel processing region, a shared merge region (SMR) or a merge estimation region (MER).

A merge candidate of a current block may be derived based on a coding block. But, when a current block is included in a merge processing region larger than the current block, a candidate block included in the same merge processing region as the current block may be set to be unavailable as a merge candidate.

FIG. 18 is a diagram showing an example in which a candidate block included in the same merge processing region as a current block is set to be unavailable as a merge candidate.

In an example shown in FIG. 18(*a*), in the decoding/decoding of CU5, blocks including base samples adjacent to CU5 may be set as candidate blocks. In this connection, candidate blocks X3 and X4 included in the same merge processing region as CU5 may be set to be unavailable as a merge candidate of CU5. But, candidate blocks X0, X1 and X2 not included in the same merge processing region as CU5 may be set to be available as a merge candidate.

In an example shown in FIG. 18(*b*), in the decoding/decoding of CU8, blocks including base samples adjacent to CU8 may be set as candidate blocks. In this connection, candidate blocks X6, X7 and X8 included in the same merge processing region as CU8 may be set to be unavailable as a merge candidate. But, candidate blocks X5 and X9 not included in the same merge processing region as CU8 may be set to be available as a merge candidate.

Alternatively, when a current block is included in a merge processing region, a neighboring block adjacent to a current block and to a merge processing region may be set as a candidate block.

FIG. 19 is a diagram showing an example which derives a merge candidate for a current block when a current block is included in a merge processing region.

As in an example shown in FIG. 19(*a*), neighboring blocks adjacent to a current block may be set as candidate blocks for deriving the merge candidate of the current block. In this connection, a candidate block included in the same merge processing region as the current block may be set to be unavailable as a merge candidate. In an example, in deriving a merge candidate for a coding block CU3, a top neighboring block y3 and a right-top neighboring block y4 included in the same merge processing region as the coding block CU3 may be set to be unavailable as a merge candidate of the coding block CU3.

By scanning neighboring blocks adjacent to a current block in the predefined order, a merge candidate may be derived. In an example, the predefined order may be the order of y1, y3, y4, y0 and y2.

When the number of merge candidates which may be derived from neighboring blocks adjacent to a current block is less than a value that an offset is subtracted from the maximum number of merge candidates or the maximum number, a merge candidate for the current block may be derived by using neighboring blocks adjacent to a merge processing region like an example shown in FIG. 19(b). In an example, neighboring blocks adjacent to a merge processing region including a coding block CU3 may be set as candidate blocks for the coding block CU3. In this connection, neighboring blocks adjacent to a merge processing region may include at least one of a left neighboring block x1, a top neighboring block x3, a left-bottom neighboring block x0, a right-top neighboring block x4 or a left-top neighboring block x2.

By scanning neighboring blocks adjacent to a merge processing region in the predefined order, a merge candidate may be derived. In an example, the predefined order may be the order of x1, x3, x4, x0 and x2.

In summary, a merge candidate on the coding block CU3 including in a merge processing region may be derived by scanning candidate blocks in the following scanning order.

(y1, y3, y4, y0, y2, x1, x3, x4, x0, x2)

But, the scanning order of the above-illustrated candidate blocks only shows the example of the present disclosure and candidate blocks may be scanned in the order different from the above example. Alternatively, the scanning order may be adaptively determined based on at least one of a size or a shape of a current block or a merge processing region.

A merge processing region may be square or non-square. Information for determining a merge processing region may be signaled in a bitstream. The information may include at least one of information representing the shape of a merge processing region or information representing the size of a merge processing region. When a merge processing region is non-square, at least one of information representing the size of a merge processing region, information representing the width or height of a merge processing region or information representing a ratio between the width and height of a merge processing region may be signaled in a bitstream.

The size of a merge processing region may be determined based on at least one of information signaled in a bitstream, picture resolution, the size of a slice or the size of a tile.

If motion compensation prediction is performed for a block included in a merge processing region, a motion information candidate derived based on the motion information of a block in which motion compensation prediction is performed may be added to a motion information table.

But, if a motion information candidate derived from a block included in a merge processing region is added to a motion information table, a case may occur where a motion information candidate derived from the block is used in the encoding/decoding of other block in the merge processing region whose encoding/decoding is actually slower than the block. In other words, although dependence between blocks should be excluded in the encoding/decoding of blocks included in a merge processing region, a case may occur where motion prediction compensation is performed by using the motion information of other block included in the merge processing region. To solve such a problem, although the encoding/decoding of a block included in a merge processing region is completed, the motion information of the block whose encoding/decoding is completed may not be added to a motion information table.

Alternatively, the motion information table may be updated using only a block at a predefined position within a merge processing region. The examples of the predefined position may include at least one of a block positioned on the top left of the merge processing region, a block positioned on the top right of the merge processing region, a block positioned on the bottom left of the merge processing region, a block positioned on the bottom right of the merge processing region, a block positioned in the center of the merge processing region, a block adjacent to the right boundary of the merge processing region, and a block adjacent to the bottom boundary of the merge processing region. As an example, the motion information table may be updated only with motion information of a block adjacent to the bottom right corner of the merge processing region and the motion information table may not be updated with motion information of other blocks.

Alternatively, after decoding of all blocks included in the merge processing region is completed, a motion information candidate derived from the blocks may be added to the motion information table. That is, while the blocks included in the merge processing region are encoded/decoded, the motion information table may not be updated.

In an example, if motion compensation prediction is performed for blocks included in a merge processing region, a motion information candidate derived from the blocks may be added to a motion information table in the predefined order. In this connection, the predefined order may be determined in the scanning order of coding blocks in a merge processing region or a coding tree unit. The scanning order may be at least one of raster scanning, horizontal scanning, vertical scanning or zigzag scanning. Alternatively, the predefined order may be determined based on the motion information of each block or the number of blocks with the same motion information.

Alternatively, a motion information candidate including a unidirectional motion information may be added to a motion information table before a motion information candidate including a bidirectional motion information. On the contrary, a motion information candidate including a bidirectional motion information may be added to a motion information table before a motion information candidate including a unidirectional motion information.

Alternatively, a motion information candidate may be added to a motion information table in the order of high frequency of use or low frequency of use in a merge processing region or a coding tree unit.

When a current block is included in a merge processing region and the number of merge candidates included in a merge candidate list of the current block is less than the maximum number, a motion information candidate included in a motion information table may be added to the merge candidate list. In this connection, a motion information candidate derived from a block included in the same merge processing region as a current block may be set not to be added to the merge candidate list of the current block.

Alternatively, when a current block is included in a merge processing region, it may be set not to use a motion information candidate included in a motion information table. In other words, although the number of merge candidates included in a merge candidate list of the current block is less than the maximum number, a motion information candidate included in a motion information table may not be added to the merge candidate list.

In another example, a motion information table on a merge processing region or a coding tree unit may be configured. This motion information table plays a role of temporarily storing the motion information of blocks included in a merge processing region. To distinguish between a general motion information table and a motion information table for a merge processing region or a coding tree unit, the motion information table for the merge processing region or the coding tree unit is referred to as a temporary motion information table. And, a motion information candidate stored in the temporary motion information table is referred to as a temporary motion information candidate.

FIG. 20 is a diagram showing a temporary motion information table.

A temporary motion information table for a coding tree unit or a merge processing region may be configured. When motion compensation prediction is performed for a current block included in a coding tree unit or a merge processing region, the motion information of the block may not be added to a motion information table HmvpCandList. Instead, a temporary motion information candidate derived from the block may be added to a temporary motion information table HmvpMERCandList. In other words, a temporary motion information candidate added to a temporary motion information table may not be added to a motion information table. Accordingly, a motion information table may not include a motion information candidate derived based on motion information of blocks included in a coding tree unit or a merge processing region including a current block.

Alternatively, only motion information of some of the blocks included in the merge processing region may be added to the temporary motion information table. As an example, only blocks at predefined positions within the merge processing region may be used for updating the motion information table. The predefined positions may include at least one of a block positioned on the top left of the merge processing region, a block positioned on the top right of the merge processing region, a block positioned on the bottom left of the merge processing region, a block positioned on the bottom right of the merge processing region, a block positioned in the center of the merge processing region, a block adjacent to the right boundary of the merge processing region, and a block adjacent to the bottom boundary of the merge processing region. As an example, only motion information of a block adjacent to the bottom right corner of the merge processing region may be added to the temporary motion information table and motion information of other blocks may not be added to the temporary motion information table.

The maximum number of temporary motion information candidates that the temporary motion information table is able to include may be set equal to the maximum number of motion information candidates that the motion information table is able to include. Alternatively, the maximum number of temporary motion information candidates that the temporary motion information table is able to include may be determined according to the size of the coding tree unit or the merge processing region. Alternatively, the maximum number of temporary motion information candidates that the temporary motion information table is able to include may be set smaller than the maximum number of motion information candidates that the motion information table is able to include.

A current block included in a coding tree unit or a merge processing region may be set not to use a temporary motion information table on the corresponding coding tree unit or merge processing region. In other words, when the number of merge candidates included in the merge candidate list of the current block is less than the threshold, a motion information candidate included in a motion information table may be added to the merge candidate list and a temporary motion information candidate included in a temporary motion information table may not be added to the merge candidate list. Accordingly, the motion information of other block including in the same coding tree unit or the same merge processing region as the current block may not be used for the motion compensation prediction of the current block.

If the encoding/decoding of all blocks included in a coding tree unit or a merge processing region is completed, a motion information table and a temporary motion information table may be unified.

FIG. 21 is a diagram showing an example in which a motion information table and a temporary motion information table are unified.

If the encoding/decoding of all blocks included in a coding tree unit or a merge processing region is completed, a temporary motion information candidate included in a temporary motion information table may be updated in a motion information table as in an example shown in FIG. 21.

In this connection, temporary motion information candidates included in a temporary motion information table may be added to a motion information table in the order inserted in the temporary motion information table. (In other words, in the ascending order or the descending order of the index value)

In another example, temporary motion information candidates included in a temporary motion information table may be added to a motion information table in the predefined order. In this connection, the predefined order may be determined in the scanning order of coding blocks in a merge processing region or a coding tree unit. The scanning order may be at least one of raster scanning, horizontal scanning, vertical scanning or zigzag scanning. Alternatively, the predefined order may be determined based on the motion information of each block or the number of blocks with the same motion information.

Alternatively, a temporary motion information candidate including a unidirectional motion information may be added to a motion information table before a temporary motion information candidate including a bidirectional motion information. On the contrary, a temporary motion information candidate including a bidirectional motion information may be added to a motion information table before a temporary motion information candidate including a unidirectional motion information.

Alternatively, a temporary motion information candidate may be added to a motion information table in the order of high frequency of use or low frequency of use in a merge processing region or a coding tree unit.

In case that a temporary motion information candidate included in a temporary motion information table is added to a motion information table, a redundancy check for a temporary motion information candidate may be performed. In an example, when the same motion information candidate as a temporary motion information candidate included in a temporary motion information table is prestored in a motion information table, the temporary motion information candidate may not be added to the motion information table. In this connection, a redundancy check may be performed for a part of motion information candidates included in a motion information table. In an example, a redundancy check may be performed for motion information candidates with an index over or below the threshold. In an example, when a temporary motion information candidate is equal to a motion information candidate with an index over the predefined value, the temporary motion information candidate may not be added to a motion information table.

It may limit the use of a motion information candidate derived from a block included in the same coding tree unit or the same merge processing region as a current block as the merge candidate of the current block. For it, the address information of a block may be additionally stored for a motion information candidate. The address information of a block may include at least one of the position of the block, the address of the block, the index of the block, the position of a merge processing region in which the block is included, the address of a merge processing region in which the block is included, the index of a merge processing region in which the block is included, the position of a coding tree region in which the block is included, the address of a coding tree region in which the block is included or the index of a coding tree region in which the block is included.

Intra-prediction predicts a current block by using a reconstructed sample that has been already encoded/decoded and which is around the current block. In this connection, a reconstructed sample before applying an in-loop filter may be used for intra-prediction of the current block.

An intra-prediction method includes intra-prediction based on a matrix and intra-prediction according to a direction with a neighboring reconstruction sample. Information indicating an intra-prediction method of a current block may be signaled in a bitstream. The information may be a 1-bit flag. Alternatively, an intra-prediction of a current block may be determined on the basis of at least one of a position of the current block, a size of the current block, a shape of the current block, or an intra-prediction method of a neighboring block. In an example, when a current block is present crossing a picture boundary, it may be set such that an intra-prediction method based on a matrix is not applied to the current block.

An intra-prediction method based on a matrix is a method of obtaining a prediction block of a current block on the basis of a matrix product of a matrix stored in the encoder and the decoder, and reconstruction samples around the current block. Information for specifying any one of a plurality of prestored matrices may be signaled in a bitstream. The decoder may determine a matrix for performing intra-prediction on a current block on the basis of the above information and a size of the current block.

General intra-prediction is a method of obtaining a prediction block of a current block on the basis of a non-directional intra-prediction mode or directional intra-prediction mode. Hereinafter, with reference to figures, a process of intra-prediction based on general intra-prediction will be described in detail.

FIG. 22 is a flow diagram of an intra-prediction method according to an embodiment of the present disclosure.

A reference sample line of a current block may be determined S2201. The reference sample line means a group of reference samples included in a k-th line apart from a top and/or a left of the current block. A reference sample may be derived from a reconstructed sample encoded/decoded around the current block.

Index information identifying a reference sample line for a current block among a plurality of reference sample lines may be signaled in a bitstream. In an example, index information, intra_luma_ref_idx, for specifying the reference sample line of the current block may be signaled in the bitstream. The index information may be signaled per coding block.

A plurality of reference sample lines may include at least one of a first line, a second line or a third line at a top and/or left of a current block. A reference sample line composed of a row adjacent to the top of the current block and a column adjacent to the left of the current block among a plurality of reference sample lines may be referred to as an adjacent reference sample line, and other reference sample lines may be referred to as a non-adjacent reference sample line.

Table 1 shows an index assigned to each candidate reference sample line.

TABLE 1

| Index (intra_luma_ref_idx) | Reference sample line |
| --- | --- |
| 0 | Adjacent reference sample line |
| 1 | First non-adjacent reference sample line |
| 2 | Second non-adjacent reference sample line |

Based on at east one of a position, a size, a shape of a current block or a prediction encoding mode of a neighboring block, a reference sample line of the current block may be determined. In one example, when the current block adjoins a boundary of a picture, a tile, a slice or a coding tree unit, an adjacent reference sample line may be determined as the reference sample line of the current block.

A reference sample line may include top reference samples positioned at a top of the current block and left reference samples positioned at a left of the current block. The top reference samples and left reference samples may be derived from reconstructed samples around the current block. The reconstructed samples may be in a state before an in-loop filter is applied.

Next, an intra-prediction mode of a current block may be determined S2202. For the intra-prediction mode of the current block, at least one of a non-directional intra-prediction mode or a directional intra-prediction mode may be determined as the intra-prediction mode of the current block. Non-directional intra-prediction modes includes a planar and a DC and directional intra-prediction modes includes 33 or 65 modes from a left-bottom diagonal direction to a right-top diagonal direction.

FIG. 23 is a diagram showing intra-prediction modes.

FIG. 23(a) shows 35 intra-prediction modes and FIG. 23(b) shows 67 intra-prediction modes.

The larger or smaller number of intra-prediction modes than shown in FIG. 23 may be defined.

Based on an intra-prediction mode of a neighboring block adjacent to a current block, an MPM (Most Probable Mode) may be set. In this connection, a neighboring block may include a left neighboring block adjacent to a left of the current block and a top neighboring block adjacent to a top of the current block.

The number of MPMs included in an MPM list may be preset in an encoder and a decoder. In an example, the number of MPMs may be 3, 4, 5 or 6. Alternatively, information representing the number of MPMs may be signaled in a bitstream. Alternatively, based on at least one of a prediction encoding mode of a neighboring block, a size, a shape or a reference sample line index of a current block, the number of MPMs may be determined. In an example, while N MPMs may be used when an adjacent reference sample line is determined as the reference sample line of the current block, M MPMs may be used when a non-adjacent reference sample line is determined as the reference sample line of the current block. As M is a natural number smaller than N, in an example, N may be 6 and M may be 5, 4 or 3. Accordingly, while the intra-prediction mode of the current block may be determined as any one of 6 candidate intra-prediction modes when the index of the reference sample line of the current block is 0 and an MPM flag is true, the intra-prediction mode of the current block may be determined as any one of 5 candidate intra-prediction modes when the index of the reference sample line of the current block is larger than 0 and an MPM flag is true.

Alternatively, the fixed number (e.g. 6 or 5) of MPM candidates may be used regardless of the index of the reference sample line of the current block.

An MPM list including a plurality of MPMs may be generated and information indicating whether the same MPM as an intra-prediction mode of a current block is included in the MPM list may be signaled in a bitstream. As the information is a 1-bit flag, it may be referred to as an MPM flag. When the MPM flag represents the same MPM as the current block is included in the MPM list, index information identifying one of MPMs may be signaled in a bitstream. In an example, index information, mpm_idx, specifying any one of plural MPMs may be signaled in a bitstream. An MPM specified by the index information may be set as the intra-prediction mode of the current block. When the MPM flag represents the same MPM as the current block is not included in the MPM list, remaining mode information indicating any one of remaining intra-prediction modes except for MPMs may be signaled in a bitstream. Remaining mode information represents an index value corresponding to the intra-prediction mode of the current block when an index is reassigned to remaining intra-prediction modes except for MPMs. A decoder may determine the intra-prediction mode of the current block by arranging MPMs in the ascending order and comparing remaining mode information with MPMs. In an example, when remaining mode information is equal to or smaller than MPM, the intra-prediction mode of the current block may be derived by adding 1 to remaining mode information.

In deriving an intra-prediction mode of a current block, comparing a part of MPMs with remaining mode information may be omitted. In an example, MPMs in a non-directional intra-prediction mode among MPMs may be excluded from a comparison target. When non-directional intra-prediction modes are set as MPMs, remaining mode information clearly indicates a directional intra-prediction mode, so the intra-prediction mode of the current block may be derived by comparing remaining MPMs except for non-directional intra-prediction modes with remaining mode information. Instead of excluding non-directional intra-prediction modes from a comparison target, a result value may be compared with remaining MPMs after adding the number of non-directional intra-prediction modes to remaining mode information.

Instead of setting a default mode as an MPM, information indicating whether an intra-prediction mode of a current block is the default mode may be signaled in a bitstream. The information is a 1-bit flag and the flag may be referred to as a default mode flag. The default mode flag may be signaled only when an MPM flag represents that the same MPM as the current block is included in an MPM list. As described above, the default mode may include at least one of a planar, DC, a vertical direction mode or a horizontal direction mode. In an example, when the planar is set as the default mode, the default mode flag may indicate whether the intra-prediction mode of the current block is the planar. When the default mode flag indicates that the intra-prediction mode of the current block is not the default mode, one of MPMs indicated by index information may be set as the intra-prediction mode of the current block.

When a default mode flag is used, it may be set that an intra-prediction mode same with a default mode is not set as an MPM. In an example, when the default mode flag indicates that whether the intra-prediction mode of the current block is a planar, the intra-prediction mode of the current block may be derived by using 5 MPMs excluding an MPM corresponding to the planar.

When a plurality of intra-prediction modes are set as default modes, index information indicating any one of default modes may be further signaled. The intra-prediction mode of the current block may be set as a default mode indicated by the index information.

When an index of a reference sample line of a current block is not 0, it may be set not to use a default mode. In an example, when a non-adjacent reference sample line is determined as the reference sample line of the current block, it may be set not to use a non-directional intra-prediction mode such as a DC mode or a planar mode. Accordingly, when an index of a reference sample line is not 0, a default mode flag may not be signaled and a value of the default mode flag may be inferred to a predefined value (i.e. false).

When an intra-prediction mode of a current block is determined, prediction samples for the current block may be obtained based on a determined intra-prediction mode S2203.

When the DC mode is selected, prediction samples for the current block may be generated based on an average value of the reference samples. In detail, values of all of samples within the prediction block may be generated based on an average value of the reference samples. An average value may be derived using at least one of top reference samples adjacent to the top of the current block, and left reference samples adjacent to the left of the current block.

The number or a range of the reference samples used when deriving an average value may vary based on the shape of the current block. In an example, when a current block is a non-square block where a width is greater than a height, an average value may be calculated by using top reference samples. To the contrary, when a current block is a non-square block where a width is smaller than a height, an average value may be calculated by using left reference samples. In other words, when a width and a height of the current block are different, reference samples adjacent to the greater length may be used so as to calculate an average value. Alternatively, whether to calculate an average value by using top reference samples or by using left reference samples may be determined on the basis of a ratio between a width and a height of the current block.

When a planar mode is selected, a prediction sample may be obtained by using a horizontal directional prediction sample and a vertical directional prediction sample. In this connection, the horizontal directional prediction sample may be obtained on the basis of a left reference sample and a right reference sample which are positioned at the same horizontal line with the prediction sample, and the vertical directional prediction sample may be obtained on the basis of an top reference sample and a bottom reference sample which are positioned at the same vertical line with the prediction sample. In this connection, the right reference sample may be generated by copying a reference sample adjacent to the top-right corner of the current block, and the bottom reference sample may be generated by copying a reference sample adjacent to the lower-left corner of the current block. The horizontal directional prediction sample may be obtained on the basis of a weighted sum of the left reference sample and the right reference sample, and the vertical directional prediction sample may be obtained on the basis of a weighted sum of the top reference sample and the bottom reference sample. In this connection, a weighting factor assigned to each reference sample may be determined according to a position of the prediction sample. The prediction sample may be obtained on the basis of an average or a weighted sum of the horizontal directional prediction sample and the vertical directional prediction sample. When a weighted sum is used, a weighting factor assigned to the horizontal directional prediction sample and the vertical directional prediction sample may be determined on the basis of a position of the prediction sample.

When a directional prediction mode is selected, a parameter representing a prediction direction (or prediction angle) of the selected directional prediction mode may be determined. Table 2 below represents an intra directional parameter of intraPredAng for each intra-prediction mode.

TABLE 2

| PredModeIntra | 1 | 2 | 3 | 4 | 5 | 6 | 7 |
|---|---|---|---|---|---|---|---|
| IntraPredAng | — | 32 | 26 | 21 | 17 | 13 | 9 |
| PredModeIntra | 8 | 9 | 10 | 11 | 12 | 13 | 14 |
| IntraPredAng | 5 | 2 | 0 | −2 | −5 | −9 | −13 |
| PredModeIntra | 15 | 16 | 17 | 18 | 19 | 20 | 21 |
| IntraPredAng | −17 | −21 | −26 | −32 | −26 | −21 | −17 |
| PredModeIntra | 22 | 23 | 24 | 25 | 26 | 27 | 28 |
| IntraPredAng | −13 | −9 | −5 | −2 | 0 | 2 | 5 |
| PredModeIntra | 29 | 30 | 31 | 32 | 33 | 34 | |
| IntraPredAng | 9 | 13 | 17 | 21 | 26 | 32 | |

Table 2 represents an intra directional parameter of each intra-prediction mode where an index thereof is one of 2 to 34 when 35 intra-prediction modes are defined. When directional intra-prediction modes are defined more than 33, an intra directional parameter of each intra-prediction mode may be set by subdividing Table 2.

Top reference samples and left reference samples for the current block are arranged in a line, and then a prediction sample may be obtained on the basis of a value of an intra directional parameter. In this connection, when a value of the intra directional parameter is a negative value, left reference samples and top reference samples may be arranged in a line.

FIGS. 24 and 25 are views respectively showing examples of one-dimensional arrangement where reference samples are arranged in a line.

FIG. 24 is a view showing vertical directional one-dimensional arrangement where reference samples are arranged in a vertical direction, and FIG. 25 is a view showing horizontal directional one-dimensional arrangement where reference samples are arranged in a horizontal direction. Examples of FIGS. 24 and 25 will be described in assumption that 35 intra-prediction modes are defined.

When an intra-prediction mode index is any one of 11 to 18, horizontal directional one-dimensional arrangement may be applied where top reference samples are rotated in counterclockwise, and when an intra-prediction mode index is any one of 19 to 25, vertical directional one-dimensional arrangement may be applied where left reference samples are rotated in clockwise. When arranging reference samples in a line, an intra-prediction mode angle may be considered.

A reference sample determining parameter may be determined on the basis of an intra directional parameter. The reference sample determining parameter may include a reference sample index for specifying a sample, and a weighting factor parameter for determining a weighting factor applied to the reference sample.

A reference sample index, iIdx, and a weighting factor parameter, ifact, may be respectively obtained through Equations 4 and 5 below.

$$iIdx=(y+1)*P_{ang}/32 \qquad \text{[Equation 4]}$$

$$i_{fact}=[(y+1)*P_{ang}]\&31 \qquad \text{[Equation 5]}$$

In Equations 4 and 5, $P_{ang}$ represents an intra directional parameter. A reference sample specified by a reference sample index of iIdx corresponds to an integer pel.

In order to derive a prediction sample, at least one reference sample may be specified. In detail, according to a slope of a prediction mode, a position of a reference sample used for deriving a prediction sample may be specified. In an example, a reference sample used for deriving a prediction sample may be specified by using a reference sample index of iIdx.

In this connection, when a slope of an intra-prediction mode is not represented by one reference sample, a prediction sample may be generated by performing interpolation on a plurality of reference samples. In an example, when a slope of an intra-prediction mode is a value between a slope between a prediction sample and a first reference sample, and a slope between the prediction sample and a second reference sample, the prediction sample may be obtained by performing interpolation on the first reference sample and the second reference sample. In other words, when an angular line according to an intra-prediction angle does not pass a reference sample positioned at an integer pel, a prediction sample may be obtained by performing interpolation on reference samples positioned adjacent to the left and the right, or the top and the bottom of the position where the angular line passes.

Equation 6 below represents an example of obtaining a prediction sample on the basis of reference samples.

$$P(x,y)=((32-i_{fact})/32)*\text{Ref\_1D}(x+iIdx+1)+(i_{fact}/32)*\text{Ref\_1D}(x+iIdx+2) \qquad \text{[Equation 6]}$$

In Equation 6, P represents a prediction sample, and Ref_1D represents any one of reference samples that are arranged in a line. In this connection, a position of the reference sample may be determined by a position (x, y) of the prediction sample and a reference sample index of iIdx.

When a slope of an intra-prediction mode is possibly represented by one reference sample, a weighting factor parameter of $i_{fact}$ is set to 0. Accordingly, Equation 6 may be simplified as Equation 7 below.

$$P(x,y)=\text{Ref\_1D}(x+iIdx+1c) \qquad \text{[Equation 7]}$$

Intra-prediction for a current block may be performed on the basis of a plurality of intra-prediction modes. In an example, an intra-prediction mode may be derived for each prediction sample, and a prediction sample may be derived on the basis of an intra-prediction mode assigned to each prediction sample.

Alternatively, an intra-prediction mode may be derived for each region, intra-prediction for each region may be performed on the basis of an intra-prediction mode assigned to each region. In this connection, the region may include at least one sample. At least one of a size and a shape of the region may be adaptively determined on the basis of at least one of a size of the current block, a shape of the current block, and an intra-prediction mode for the current block. Alternatively, at least one of a size and a shape of the region may be predefined in the encoder and the decoder independent to a size or shape of the current block.

FIG. 26 is a view showing a degree formed between directional intra-prediction modes and a straight line parallel to an x axis.

As an example shown in FIG. 26, directional prediction modes may be present between the lower-left diagonal direction and the top-right diagonal direction. Describing a degree formed between the x axis and a directional prediction mode, directional prediction modes may be present from 45 degrees (bottom-left diagonal direction) to −135 degrees (top-right diagonal direction).

When a current block is a non-square, a case may be present where a prediction sample is derived by using, among reference samples positioned at the angular line according to an intra-prediction angle, a reference sample that is positioned farther than a reference sample close to a prediction sample according to an intra-prediction mode for the current block.

FIG. 27 is a view shown an aspect of obtaining a prediction sample when a current block is a non-square.

In an example, as an example shown in FIG. 27(*a*), it is assumed that a current block is a non-square where a width is greater than a height, and an intra-prediction mode for the current block is a directional intra-prediction mode having an angle from 0 degree to 45 degrees. In the above case, when deriving a prediction sample A around a right column of the current block, among reference samples positioned at the angular mode according to the above degree, rather than using a top reference sample T close to the prediction sample, a case may be present where a left reference sample L far away from the prediction sample is used.

In another example, as an example shown in FIG. 27(*b*), it is assumed that a current block is a non-square where a height is greater than a width, and an intra-prediction mode for the current block is a directional intra-prediction mode from −90 degrees to −135 degrees. In the above case, when deriving a prediction sample A around a bottom row of the current block, among reference samples positioned at the angular mode according to the above degree, rather than using a left reference sample L close to the prediction sample, a case may be present where a top reference sample T far away from the prediction sample is used.

To solve the above problem, when a current block is a non-square, an intra-prediction mode for the current block may be substituted with an intra-prediction mode in opposite direction. Accordingly, for a non-square block, directional prediction modes having angles greater or smaller than those of directional prediction modes shown in FIG. 23 may be used. The above directional intra-prediction mode may be defined as a wide angle intra-prediction mode. A wide angle intra-prediction mode represents a directional intra-prediction mode that does not belong to a range of 45 degrees to −135 degrees.

FIG. 28 is a view showing wide angle intra-prediction modes.

In an example show in FIG. 28, intra-prediction modes having indices from −1 to −14 and intra-prediction modes having indices from 67 to 80 represent wide angle intra-prediction modes.

In FIG. 28, 14 wide angle intra-prediction modes (from −1 to −14) which are greater in angle than 45 degrees and 4 wide angle intra-prediction modes (from 67 to 80) which are smaller in angle than −135 degrees are shown. However, more or fewer number of wide angle intra-prediction modes may be defined.

When a wide angle intra-prediction mode is used, a length of top reference samples may be set to 2W+1, and a length of left reference samples may be set to 2H+1.

By using a wide angle intra-prediction mode, a sample A shown in FIG. 28(*a*) may be predicted by using a reference sample T, and a sample A shown in FIG. 28(*b*) may be predicted by a reference sample L.

In addition to legacy intra-prediction modes and N wide angle intra-prediction modes, a total of 67+N intra-prediction modes may be used. In an example, Table 3 represents an intra directional parameter for intra-prediction modes when 20 wide angle intra-prediction modes are defined.

TABLE 3

| PredModeIntra | −10 | −9 | −8 | −7 | −6 | −5 | −4 | −3 | −2 |
|---|---|---|---|---|---|---|---|---|---|
| intraPredAngle | 114 | 93 | 79 | 68 | 60 | 54 | 49 | 45 | 39 |
| PredModeIntra | −1 | 2 | 3 | 4 | 5 | 6 | 7 | 8 | 9 |
| intraPredAngle | 35 | 32 | 29 | 26 | 23 | 21 | 19 | 17 | 15 |
| PredModeIntra | 10 | 11 | 12 | 13 | 14 | 15 | 16 | 17 | 18 |
| intraPredAngle | 13 | 11 | 9 | 7 | 5 | 3 | 2 | 1 | 0 |
| PredModeIntra | 19 | 20 | 21 | 22 | 23 | 24 | 25 | 26 | 27 |
| intraPredAngle | −1 | −2 | −3 | −5 | −7 | −9 | −11 | −13 | −15 |
| PredModeIntra | 28 | 29 | 30 | 31 | 32 | 33 | 34 | 35 | 36 |
| intraPredAngle | −17 | −19 | −21 | −23 | −26 | −29 | −32 | −29 | −26 |
| PredModeIntra | 37 | 38 | 39 | 40 | 41 | 42 | 43 | 44 | 45 |
| intraPredAngle | −23 | −21 | −19 | −17 | −15 | −13 | −11 | −9 | −7 |
| PredModeIntra | 46 | 47 | 48 | 49 | 50 | 51 | 52 | 53 | 54 |
| intraPredAngle | −5 | −3 | −2 | −1 | 0 | 1 | 2 | 3 | 5 |
| PredModeIntra | 55 | 56 | 57 | 58 | 59 | 60 | 61 | 62 | 63 |
| intraPredAngle | 7 | 9 | 11 | 13 | 15 | 17 | 19 | 21 | 23 |
| PredModeIntra | 64 | 65 | 66 | 67 | 68 | 69 | 70 | 71 | 72 |
| intraPredAngle | 26 | 29 | 32 | 35 | 39 | 45 | 49 | 54 | 60 |
| PredModeIntra | 73 | 74 | 75 | 76 | | | | | |
| intraPredAngle | 68 | 79 | 93 | 114 | | | | | |

When a current block is a non-square, and an intra-prediction mode for the current block which is obtained in S2502 belongs to a transform range, the intra-prediction mode for the current block may be transformed into a wide angle intra-prediction mode. The transform range may be determined on the basis of at least one of a size, a shape, or a ratio of the current block. In this connection, the ratio may represent a ratio between a width and a height of the current block.

When a current block is a non-square where a width is greater than a height, a transform range may be set from an intra-prediction mode index (for example, 66) of an top-right diagonal direction to (an intra-prediction mode index of the top-right diagonal direction-N). In this connection, N may be determined on the basis of a ratio of the current block. When an intra-prediction mode for the current block belongs to a transform range, the intra-prediction mode may be transformed into a wide angle intra-prediction mode. The transform may be subtracting a predefined value from the intra-prediction mode, and the predefined value may be the total number (for example, 67) of intra-prediction modes excluding a wide angle intra-prediction mode.

In the above example, intra-prediction mode from the number 66 to the number 53 may be respectively transformed into wide angle intra-prediction modes from the number −1 to the number −14.

When a current block is a non-square where a height is greater than a width, a transform range may be set from an intra-prediction mode index (for example, 2) of a bottom-left diagonal direction to (the intra-prediction mode index of the lower-left diagonal direction+M). In this connection, M may be determined on the basis of a ratio of the current block. When an intra-prediction mode for the current block belongs to a transform range, the intra-prediction mode may be transformed into a wide angle intra-prediction mode. The transform may be adding a predefined value to the intra-prediction mode, and the predefined value may be the total number (for example, 65) of directional intra-prediction mode excluding a wide angle intra-prediction mode.

In the above example, intra-prediction mode from the number 2 to the number 15 may be respectively transformed into wide angle intra-prediction modes from the number 67 to the number 80

Hereinafter, intra-prediction modes belonging to a transform range are referred to as wide angle intra prediction replacement modes.

A transform range may be determined on the basis of a ratio of the current block. In an example, Tables 4 and 5 respectively show a transform range of a case where 35 intra-prediction modes excluding a wide angle intra-prediction mode are defined, and a case where 67 intra-prediction modes excluding a wide angle intra-prediction mode are defined.

TABLE 4

| Condition | Replaced Intra Prediction Modes |
| --- | --- |
| W/H = 2 | Modes 2, 3, 4 |
| W/H > 2 | Modes 2, 3, 4, 5, 6 |
| W/H = 1 | None |
| H/W = 1/2 | Modes 32, 33, 34 |
| H/W < 1/2 | Modes 30, 31, 32, 33, 34 |

TABLE 5

| Condition | Replaced Intra Prediction Modes |
| --- | --- |
| W/H = 2 | Modes 2, 3, 4, 5, 6, 7 |
| W/H > 2 | Modes 2, 3, 4, 5, 6, 7, 8, 9, 10, 11 |
| W/H = 1 | None |
| H/W = 1/2 | Modes 61, 62, 63, 64, 65, 66 |
| H/W < 1/2 | Modes 57, 58, 59, 60, 61, 62, 63, 64, 65, 66 |

As examples shown in Tables 4 and 5, the number of wide angle intra prediction replacement modes included in a transform range may vary according to a ratio of the current block.

The ratio of the current block may be further subdivided to set a transform range as shown in Table 6 below.

TABLE 6

| Condition | Replaced Intra Prediction Modes |
| --- | --- |
| W/H = 16 | Modes 12, 13, 14, 15 |
| W/H = 8 | Modes 12, 13 |
| W/H = 4 | Modes 2, 3, 4, 5, 6, 7, 8, 9, 10, 11 |
| H/W = 2 | Modes 2, 3, 4, 5, 6, 7 |
| H/W = 1 | None |
| W/H = 1/2 | Modes 61, 62, 63, 64, 65, 66 |
| W/H = 1/4 | Modes 57, 58, 59, 60, 61, 62, 63, 64, 65, 66 |
| W/H = 1/8 | Modes 55, 56 |
| H/W = 1/16 | Modes 53, 54, 55, 56 |

When the non-adjacent reference sample line is determined as the reference sample line for the current block or when the multi-line intra prediction encoding method for selecting one of the plurality of reference sample lines is used, the prediction method may be configured not to use the wide angle intra prediction mode. That is, although the current block has a non-square shape, and the intra prediction mode for the current block belongs to the transform range, the intra prediction mode for the current block may not be transformed into the wide angle intra prediction mode.

Alternatively, when the intra prediction mode for the current block is determined as the wide angle intra prediction mode, the prediction method may be configured such that the non-adjacent reference sample lines are unavailable as the reference sample line for the current block or may be configured not to use the multi-line intra prediction encoding method for selecting one of the plurality of reference sample lines. When the multi-line intra prediction encoding method is not used, the adjacent reference sample line may be determined as the reference sample line for the current block.

When the wide angle intra prediction mode is not used, each of refW and refH may be set to a sum of nTbW and nTbH. Accordingly, the non-adjacent reference sample line spaced from the current block by i may include (nTbW+nTbH+offsetX[i]) top reference samples and (nTbW+nTbH+offsetY[i]) left reference samples except for the left-top reference sample. That is, the non-adjacent reference sample line spaced from the current block by i may include (2nTbW+2nTbH+offsetX[i]+offsetY[i]+1) reference samples. For example, when a value of whRatio is greater than 1, a value of offsetX may be set to be larger than a value of offsetY. In one example, when the value of offsetX may be set to 1, and the value of offsetY may be set to 0. To the contrary, when the value of whRatio is smaller than 1, the value of offsetY may be set to be larger than the value of offsetX. In one example, the value of offsetX may be set to 0, and the value of offsetY may be set to 1.

Since wide angle intra-prediction modes are used in addition to legacy intra-prediction modes, resource for encoding wide angle intra-prediction modes may be increased, and thus encoding efficiency may be reduced. Accordingly, rather than encoding a wide angle intra-prediction mode as it is, a replaced intra-prediction mode for the wide angle intra-prediction modes are encoded so as to improve encoding efficiency.

In an example, when a current block is encoded by using a wide angle intra-prediction mode of the number 67, the number 2 that is a wide angle replacement intra-prediction mode of the number 67 may be encoded as an intra-prediction mode for the current block. In addition, when a current block is encoded by using a wide angle intra-prediction mode of the number −1, the number 66 that is a wide angle replacement intra-prediction mode of the number −1 may be encoded as an intra-prediction mode for the current block.

The decoder may decode an intra-prediction mode for the current block, and determine whether or not the decoded intra-prediction mode belongs to a transform range. When the decoded intra-prediction mode is a wide angle replacement intra-prediction mode, the intra-prediction mode may be transformed into a wide angle intra-prediction mode.

Alternatively, when a current block is encoded through a wide angle intra-prediction mode, the wide angle intra-prediction mode may be encoded as it is.

Encoding of an intra prediction mode may be performed based on an MPM list described above. Specifically, when a neighboring block is encoded in a wide angle intra prediction mode, an MPM may be set based on a wide angle replacement intra prediction mode corresponding to the wide angle intra prediction mode.

A residual image may be derived by subtracting a prediction image from an original image. In this connection, when the residual image is converted into a frequency domain, even though high frequency components are removed from frequency components, subjective image quality of the image does not drop significantly. Accordingly, when values of high frequency components are transformed into small values, or when values of high frequency components are set to 0, compression efficiency may be increased without causing large visual distortion. Reflecting the above feature, transform may be performed on a current block so as to decompose a residual image to two-dimensional frequency components. The transform may be performed by using transform methods such as DCT (discrete cosine transform), DST (discrete sine transform), etc.

DCT is to decompose (or transform) a residual image into a two-dimensional frequency component by using cosine transform and DST is to compose (or transform) a residual image into a two-dimensional frequency component by using sine transform. As a result of transforming a residual image, frequency components may be represented as a base image. In an example, when DCT transform is performed for a N×N sized block, N2 basic pattern components may be obtained. A size of each of basic pattern components included in a N×N sized block may be obtained through transform. According to a used transform method, a size of a basic pattern component may be referred to as a DCT coefficient or a DST coefficient.

A transform method DCT is mainly used to transform an image that a lot of non-zero low frequency components are distributed. A transform method DST is mainly used for an image that a lot of high frequency components are distributed.

It is also possible to transform a residual image by using a transform method other than DCT or DST.

Hereinafter, transforming a residual image into two-dimensional frequency components is referred to as two-dimensional image transform. In addition, a size of basic pattern components obtained by transform is referred to as a transform coefficient. In an example, a transform coefficient may mean a DCT coefficient or a DST coefficient. When both the after-described first transform and second transform are applied, a transform coefficient may mean a basic pattern component generated by a result of the second transform. In addition, a residual sample to which transform skip is applied is also referred to as a transform coefficient.

A transform method may be determined in a unit of a block. A transform method may be determined based on at least one of a prediction encoding mode of a current block, a size of a current block or a shape of a current block. In an example, when a current block is encoded by an intra-prediction mode and a size of a current block is smaller than N×N, transform may be performed by using a DST transform method. On the other hand, when the condition is not satisfied, transform may be performed by using a DCT transform method.

Two-dimensional image transform may not be performed for some blocks of a residual image. Not performing two-dimensional image transform may be referred to as transform skip. The transform skip represents that the first transform and the second transform are not applied to the current block. When transform skip is applied, quantization may be applied to residual values for which transform is not performed.

Whether transform skip is allowed for a current block may be determined based on at least one of a size or a shape of a current block. In an example, only when a size of a current block is smaller than a threshold value, transform skip may be applied. The threshold value is related to at least one of a width, a height or the number of samples of a current block, and may be defined as 32×32, etc. Alternatively, transform skip may be allowed only for a square block. In an example, transform skip may be allowed for a 32×32, 16×16, 8×8 or 4×4 sized square block. Alternatively, only when a sub-partition intra encoding method is not used, transform skip may be allowed.

Alternatively, when a sub-partition intra encoding method is applied to a current block, it may be determined for each sub-block whether to apply transform skip.

FIG. 29 is a diagram showing an example in which whether transform skip is performed or not is determined per sub-block.

Transform skip may be applied only for part of a plurality of sub-blocks. In an example, as in an example shown in FIG. 29, it may be set to apply transform skip to a sub-block at a top position of a current block and not to apply transform skip for a sub-block at a bottom position.

A transform type of a sub-block that transform skip is not allowed may be determined based on information signaled in a bitstream. In an example, a transform type may be determined based on tu_mts_idx which will be described after.

Alternatively, a transform type of a sub-block may be determined based on a size of a sub-block. In an example, a horizontal directional transform type may be determined based on whether a width of a sub-block is equal to or greater than and/or equal to or less than a threshold value, and a vertical directional transform type may be determined based on whether a height of a sub-block is equal to or greater than and/or equal to or less than a threshold value.

After performing transform on a current block by using DCT or DST, transform may be performed again on the transformed current block. In this connection, transform based on DCT or DST may be defined as first transform, and performing transform again on a block to which first transform is applied may be defined as second transform.

First transform may be performed by using any one of a plurality of transform core candidates. In an example, first transform may be performed by using any one of DCT2, DCT8, or DST7.

Different transform cores may be used for a horizontal direction and a vertical direction. Information representing a combination of a transform core of a horizontal direction and a transform core of a vertical direction may be signaled in a bitstream.

A processing unit of first transform may differ with second transform. In an example, first transform may be performed on an 8×8 block, and second transform may be performed on a 4×4 sized sub-block within the transformed 8×8 block. Alternatively, the second transform may be performed for transform coefficients which belong to 3 4×4 sized sub-blocks. The 3 sub-blocks may include a sub-block positioned at the top-left of a current block, a sub-block neighboring the right of the sub-block and a sub-block neighboring the bottom of the sub-block. Alternatively, the second transform may be performed for a 8×8 sized block.

It is also possible that transform coefficients in a remaining region on which the second transform is not performed may be set to 0.

Alternatively, first transform may be performed on a 4×4 block, and second transform may be performed on a region having an 8×8 size including the transformed 4×4 block.

Information representing whether or not to perform second transform may be signaled in a bitstream. In an example, a flag representing whether the second transform is performed or not, or index information specifying whether the second transform is performed or not and a transform kernel used for the second transform may be signaled. In an example, when the index information is 0, it represents that the second transform is not performed for a current block. On the other hand, when the index information is greater than 0, a transform kernel for the second transform may be determined by the index information.

Alternatively, whether to perform the second transform may be determined based on whether a horizontal directional transform core and a vertical directional transform core are identical with each other. In one example, the second transform may be performed only when the horizontal directional transform core and the vertical directional transform core are identical with each other. Alternatively, the second transform may be performed only when the horizontal directional transform core and the vertical directional transform core are different from each other.

Alternatively, the second transform may be allowed only when a predefined transform core is used for the horizontal directional transform and the vertical directional transform. In one example, when a DCT2 transform core is used for transform in the horizontal direction and transform in the vertical direction, the second transform may be allowed. Alternatively, when a sub-partition intra encoding method is applied to a current block, the second transform may be allowed only when a DCT2 transform core is used for transform in a horizontal direction and transform in a vertical direction.

Alternatively, it may be determined whether to perform the second transform based on the number of non-zero transform coefficients of the current block. In one example, when the number of the non-zero transforms coefficient of the current block is smaller than or equal to a threshold, the prediction method may be configured not to use the second transform. When the number of the non-zero transform coefficients of the current block is greater than the threshold, the prediction method may be configured to use the second transform. As long as the current block is encoded using intra prediction, the prediction method may be configured to use the second transform.

Alternatively, whether the second transform is performed or not may be determined based on a position of the last non-zero transform coefficient of a current block. In an example, when at least one of an x-axis coordinate or a y-axis coordinate of the last non-zero transform coefficient of a current block is greater than a threshold value, or when at least one of an x-axis coordinate or a y-axis coordinate of a sub-block to which the last non-zero transform coefficient of a current block belongs is greater than a threshold value, the second transform may not be performed. In this case, a threshold value may be predefined in an encoding device and a decoding device. Alternatively, a threshold value may be determined based on a size or a shape of a current block.

Alternatively, when only a transform coefficient of a DC component exists in a current block, it may be set not to perform the second transform. In this case, a DC component represents a transform coefficient at a top-left position in a current block.

Alternatively, when matrix-based intra-prediction is applied to a current block, it may be set not to perform the second transform.

Information representing a transform type of a current block may be signaled in a bitstream. The information may be index information, tu_mts_idx, representing one of combinations of a transform type for a horizontal direction and a transform type for a vertical direction.

Based on transform type candidates specified by index information, tu_mts_idx, a transform core for a vertical direction and a transform core for a horizontal direction may be determined. Table 7 represents transform type combinations according to tu_mts_idx.

TABLE 7

| | transform type | |
|---|---|---|
| tu_mts_idx | horizontal | vertical |
| 0 | DCT-II | DCT-II |
| 1 | DST-VII | DST-VII |
| 2 | DCT-VIII | DST-VII |
| 3 | DST-VII | DCT-VIII |
| 4 | DCT-VIII | DCT-VIII |

A transform type may be determined as one of DCT2, DST7 or DCT8. Alternatively, transform skip may be inserted in a transform type candidate.

When Table 7 is used, DCT2 may be applied in a horizontal direction and in a vertical direction when tu_mts_idx is 0. When tu_mts_idx is 2, DCT8 may be applied in a horizontal direction and DCT7 may be applied in a vertical direction.

When a sub-partition intra encoding method is applied, a transform core of a sub-block may be independently determined. In an example, information for specifying a transform type combination candidate may be encoded and signaled per sub-block. Accordingly, a transform core between sub-blocks may be different.

Alternatively, sub-blocks may use the same transform type. In this case, tu_mts_idx specifying a transform type combination candidate may be signaled only for the first sub-block. Alternatively, tu_mts_idx may be signaled in a coding block level and a transform type of sub-blocks may be determined by referring to tu_mts_idx signaled in a coding block level. Alternatively, a transform type may be determined based on at least one of a size, a shape or an intra-prediction mode of one among sub-blocks and a determined transform type may be set to be used for all sub-blocks.

FIG. 30 is a diagram showing an example in which sub-blocks use the same transform type.

When a coding block is partitioned in a horizontal direction, a transform type of a sub-block at a top position of a coding block (Sub-CU0) may be set the same as that of a sub-block at a bottom position (Sub-CU1). In an example, as in an example shown in FIG. 30(a), when a horizontal transform type and a vertical transform type are determined based on tu_mts_idx signaled for a top sub-block, a determined transform type may be also applied to a bottom sub-block.

When a coding block is partitioned in a vertical direction, a transform type of a sub-block at a left position of a coding block (Sub-CU0) may be set the same as that of a sub-block at a right position (Sub-CU1). In an example, as in an example shown in FIG. 30(b), when a horizontal transform type and a vertical transform type are determined based on tu_mts_idx signaled for a left sub-block, a determined transform type may be also applied to a right sub-block.

Whether index information is encoded or not may be determined based on at least one of a size or a shape of a current block, the number of non-zero coefficients, whether the second transform is performed or whether a sub-partition intra encoding method is applied. In an example, when a sub-partition intra encoding method is applied to a current block, or when the number of non-zero coefficients is equal to or smaller than a threshold value, signaling of index information may be omitted. When signaling of index information is omitted, a default transform type may be applied to a current block.

A default transform type may include at least one of DCT2 or DST7. When there are a plurality of default transform types, one of a plurality of default transform types may be selected by considering at least one of a size, a shape or an intra-prediction mode of a current block, whether the second transform is performed or whether a sub-partition intra encoding method is applied. In an example, one of a plurality of transform types may be determined as a horizontal directional transform type based on whether a width of a current block is in a preset range, and one of a plurality of transform types may be determined as a vertical directional transform type based on whether a height of a current block is in a preset range. Alternatively, a default mode may be determined differently according to a size, a shape or an intra-prediction mode of a current block or whether the second transform is performed.

Alternatively, when only a transform coefficient of a DC component exists in a current block, a horizontal directional transform type and a vertical directional transform type may be set as a default transform type. In an example, when only a transform coefficient of a DC component exists in a current block, a horizontal directional transform type and a vertical directional transform type may be set as DCT2.

A threshold value may be determined based on a size or a shape of a current block. In an example, when a size of a current block is equal to or smaller than 32×32, a threshold value may be set to be 2, and when a current block is greater than 32×32 (e.g., when a current block is a 32×64 or 64×32 sized coding block), a threshold value may be set to be 4.

A plurality of look-up tables may be prestored in an encoding device/a decoding device. At least one of an index value assigned to transform type combination candidates, a type of transform type combination candidates or the number of transform type combination candidates may be different for each of the plurality of look-up tables.

Based on at least one of a size, a shape or an intra-prediction mode of a current block, whether the second transform is applied or not, or whether transform skip is applied to a neighboring block, a look-up table for a current block may be selected.

In an example, when a size of a current block is equal to or less than 4×4, or when a current block is encoded by inter-prediction, a first look-up table may be used and when a size of a current block is greater than 4×4, or when a current block is encoded by intra-prediction, a second look-up table may be used.

Alternatively, information indicating one of a plurality of look-up tables may be signaled in a bitstream. A decoding device may select a look-up table for a current block based on the information.

In another example, an index assigned to a transform type combination candidate may be adaptively determined based on at least one of a size, a shape, a prediction encoding mode or an intra-prediction mode of a current block, whether the second transform is applied or not, or whether transform skip is applied to a neighboring block. In an example, an index assigned to transform skip when a size of a current block is 4×4 may be smaller than an index assigned to transform skip when a size of a current block is greater than 4×4. Concretely, when a size of a current block is 4×4, an index 0 may be assigned to transform skip and when a current block is greater than 4×4 and equal to or less than 16×16, an index greater than 0 (e.g., an index 1) may be assigned to transform skip. When a current block is greater than 16×16, the maximum value (e.g., 5) may be assigned to an index of transform skip.

Alternatively, when a current block is encoded by inter-prediction, an index 0 may be assigned to transform skip. When a current block is encoded by intra-prediction, an index greater than 0 (e.g., an index 1) may be assigned to transform skip.

Alternatively, when a current block is a 4×4 sized block encoded by inter-prediction, an index 0 may be assigned to transform skip. On the other hand, when a current block is not encoded by inter-prediction, or when a current block is greater than 4×4, an index greater than 0 (e.g., an index 1) may be assigned to transform skip.

It is also possible to use transform type combination candidates different from transform type combination candidates enumerated in Table 9. In an example, a transform type combination candidate which is consisted of transform skip applied to one of a horizontal directional transform or a vertical directional transform and a transform core such as DCT2, DCT8 or DST7, etc. applied to the other can be used. In this case, whether transform skip will be used as a transform type candidate for a horizontal direction or a vertical direction may be determined based on at least one of a size (e.g., a width and/or a height), a shape, a prediction encoding mode or an intra-prediction mode of a current block.

Information representing whether index information for determining a transform type of a current block is explicitly signaled may be signaled in a bitstream. In an example, sps_explicit_intra_mts_flag, information representing whether an explicit transform type determination is allowed for a block encoded by intra-prediction, and/or sps_explicit_inter_mts_flag, information representing whether an explicit transform type determination is allowed for a block encoded by inter-prediction, may be signaled at a sequence level.

When an explicit transform type determination is allowed, a transform type of a current block may be determined based on index information, tu_mts_idx, signaled in a bitstream. On the other hand, when an explicit transform type determination is not allowed, a transform type may be determined based on at least one of a size or a shape of a current block, whether it is allowed to perform transform in a unit of a sub-block, a position of a sub-block including a non-zero transform coefficient, whether the second transform is performed or not, or whether a sub-partition intra encoding method is applied or not. In an example, a horizontal directional transform type of a current block may be determined based on a width of a current block and a vertical directional transform type of a current block may be determined based on a height of a current block. For example, when a width of a current block is smaller than 4 or greater than 16, a horizontal directional transform type may be determined as DCT2. Otherwise, a horizontal directional transform type may be determined as DST7. When a height of a current block is smaller than 4 or greater than 16, a vertical directional transform type may be determined as DCT2. Otherwise, a vertical directional transform type may be determined as DST7. In this case, a threshold value which is to be compared with a width and a height may be determined based on at least one of a size, a shape or an intra-prediction mode of a current block to determine a horizontal directional transform type and a vertical directional transform type.

Alternatively, when a current block has a square shape whose height and width are the same, a horizontal directional transform type and a vertical directional transform type may be set the same, but when a current block has a non-square shape whose height and width are different from each other, a horizontal directional transform type and a vertical directional transform type may be set differently. In an example, when a width of a current block is greater than a height, a horizontal directional transform type may be determined as DST7 and a vertical directional transform type may be determined as DCT2. When a height of a current block is greater than a width, a vertical directional transform type may be determined as DST7 and a horizontal directional transform type may be determined as DCT2.

The number and/or type of transform type candidates or the number and/or type of transform type combination candidates may be different according to whether an explicit transform type determination is allowed or not. In an example, when an explicit transform type determination is allowed, DCT2, DST7 and DCT8 may be used as transform type candidates. Accordingly, each of a horizontal directional transform type and a vertical directional transform type may be set as DCT2, DST8 or DCT8. When an explicit transform type determination is not allowed, only DCT2 and DST7 may be used as a transform type candidate. Accordingly, each of a horizontal directional transform type and a vertical directional transform type may be determined as DCT2 or DST7.

The decoder may perform inverse-transform (second inverse-transform) to the second transform and may perform inverse-transform (first inverse-transform) to the first transform resultant from the second inverse-transform. As a result of performing the second inverse-transform and the first inverse-transform, residual signals for the current block may be obtained.

When transform and quantization are performed by the encoder, the decoder may obtain the residual block via inverse-quantization and inverse-transform. The decoder may add the prediction block and the residual block to each other to obtain the reconstructed block for the current block.

When the reconstructed block of the current block is obtained, loss of information as occurring in the process of the quantization and encoding may be reduced via the in-loop filtering. The in-loop filter may include at least one of a deblocking filter, a sample adaptive offset filter (SAO), or an adaptive loop filter (ALF). Hereinafter, a reconstructed block before an in-loop filter is applied is referred to as a first reconstructed block and a reconstructed block after an in-loop filter is applied is referred to as a second reconstructed block.

The second reconstructed block may be obtained by applying at least one of a deblocking filter, SAO or ALF to the first reconstructed block. In this connection, SAO or ALF may be applied after the deblocking filter is applied.

A deblocking filter is to alleviate quality degradation (e.g. Blocking Artifact) on a boundary of a block which occurs as quantization is performed per block. To apply the deblocking filter, a blocking strength (BS) between the first reconstructed block and a neighboring reconstructed block may be determined.

FIG. 31 is a flow diagram showing a process of determining a blocking strength.

In an example shown in FIG. 31, P represents a first reconstructed block and Q represents a neighboring reconstructed block. In this connection, the neighboring reconstructed block may neighbor a left or top of the current block.

An example shown in FIG. 31 showed that a blocking strength is determined considering a prediction encoding mode of P and Q, whether a transform coefficient which is not 0 is included, whether inter-prediction is performed by using the same reference picture or whether the difference value of motion vectors is equal to or greater than a threshold value.

Based on a blocking strength, whether a deblocking filter is applied may be determined. In an example, when the blocking strength is 0, filtering may not be performed.

SAO is to alleviate ringing artifact which occurs as quantization is performed in a frequency region. SAO may be performed by adding or subtracting an offset determined by considering a pattern of a first reconstructed image. The determination method of the offset includes Edge Offset (EO) or Band Offset (BO). EO represents a method determining the offset of a current sample according to a pattern of neighboring pixels. BO represents a method applying a common offset to a group of pixels with a similar brightness value in a region. Concretely, pixel brightness may be partitioned into 32 uniform sections and pixels with a similar brightness value may be set as one group. In an example, 4 adjacent bands among 32 bands may be set as one group and the same offset value may be applied to samples belonging to 4 bands.

ALF is a method of generating a second reconstructed image by applying a filter with a predefined size/shape to a first reconstructed image or a reconstructed image that a deblocking filter is applied. The following Equation 8 represents an example in which ALF is applied.

[Equation 8]

$$R'(i, j) = \sum_{k=-\frac{N}{2}}^{\frac{N}{2}} \sum_{l=-\frac{N}{2}}^{\frac{N}{2}} f(k, l) \cdot R(i+k, j+l)$$

Any one of predefined tilter candidates may be selected in a basis of a picture, a coding tree unit, a coding block, a prediction block or a transform block. At least one of a size or shape of each filter candidate may be different.

FIG. 32 represents predefined filter candidates.

As in an example shown in FIG. 32, at least any one of a 5×5, 7×7 or 9×9 sized diamond shape may be selected.

Only a 5×5 sized diamond shape may be used for a chroma component.

A method of partitioning a picture into a plurality of regions and encoding/decoding the plurality of regions in parallel may be considered for the real-time or low delay encoding of a high resolution image such as a panoramic video, a 360-degree video or 4K/8K UHD (Ultra High Definition). Concretely, according to a purpose of processing, a picture may be partitioned into tiles or slices (or tile groups).

A tile represents a base unit for parallel encoding/decoding. Each tile may be processed in parallel. A tile may have a rectangular shape. Alternatively, a non-rectangular tile may be allowed.

Information representing whether a non-rectangular tile is allowed or whether there is a non-rectangular tile may be signaled in a bitstream.

In encoding/decoding a tile, it may be set not to use data of other tile. A parallel processing of tiles may be supported by removing encoding/decoding dependency between tiles. Concretely, a probability table of CABAC (Context Adaptive Binary Arithmetic Coding) context may be initialized per tile and an in-loop filter may be set not to be applied on a boundary of tiles. In addition, data in other tile may not be used as a candidate for deriving a motion vector. For example, data in other tile may be set not to be used as a merge candidate, a motion vector prediction candidate (AMVP candidate) or a motion information candidate. In addition, data in another tile may be set not to be used for context computation of a symbol.

Information on video encoding/decoding may be signaled by a slice header. Information signaled by the slice header may be commonly applied to coding tree units or tiles included in the slice. The slice also can be referred to as a tile group.

FIG. 33 is a diagram showing a picture partitioning method according to an embodiment of the present disclosure.

First, whether a current picture is partitioned into a plurality of processing units may be determined S3310. In this connection, a processing unit may include at least one of a tile or a slice. In an example, a syntax, no_pic_partition_flag, indicating whether a current picture is partitioned into a plurality of tiles or slices, may be signaled in a bitstream. If a value of the syntax, no_pic_partition_flag, is 0, it represents that a current picture is partitioned into at least one tile or at least one slice. On the other hand, if a value of a syntax, no_pic_partition_flag, is 1, it represents that a current picture is not partitioned into a plurality of tiles or slices.

When it is determined that a current picture is not to be partitioned into a plurality of processing units, a partitioning process of the current picture may be ended. In this connection, it may be understood that the current picture is composed of a single tile and a single slice (or a single tile group).

Alternatively, information representing whether a plurality of tiles exist in a picture may be signaled in a bitstream. The information may include at least one of a 1-bit flag representing whether a plurality of tiles exist in a picture or information specifying the number of tiles in a picture.

When it is determined that a current picture is to be partitioned into a plurality of processing units, tile partitioning information may be signaled in a bitstream. A picture may be partitioned into at least one tile based on the signaled tile partitioning information S3320.

When a current picture is partitioned into a plurality of tiles, a slice may be determined by combining a plurality of tiles or partitioning a tile S3330.

Hereinafter, according to the present disclosure, a tile partitioning method and a slice determination method will be described in detail.

FIG. 34 represents an example in which a picture is partitioned into a plurality of tiles.

A tile may include at least one coding tree unit. A boundary of the tile may be set to match a boundary of a coding tree unit. In other words, a partitioning type that one coding tree unit is partitioned into plural may not be allowed.

When a picture is partitioned into a plurality of tiles, a height of adjacent tiles or a width of adjacent tiles may be set to have the same value.

In an example, as in an example shown in FIG. 34, a height of tiles belonging to the same tile row and/or a width of tiles belonging to the same tile column may be set the same. Tiles belonging to the same tile row may be referred to as a horizontal directional tile set and tiles belonging to the same tile column may be referred to as a vertical directional tile set.

Alternatively, information representing whether a width and/or a height of a tile to be encoded/decoded is set the same as a width and/or a height of a previous tile may be signaled.

Information representing a partitioning shape of a picture may be signaled in a bitstream. The information may be encoded and signaled by a picture parameter set, a sequence parameter set or a slice header.

Information representing a partitioning shape of a picture may include at least one of information indicating whether tiles are partitioned in a uniform size, information representing the number of tile columns or information representing the number of tile rows. In this case, the number of tile columns represents the number of vertical directional tile sets and the number of tile rows represents the number of horizontal directional tile sets.

Information indicating whether tiles are partitioned in a uniform size may be a 1-bit flag, uniform_spacing_flag. When it is determined that a picture is partitioned in a uniform size, remaining tiles except for tiles adjacent to a right and/or bottom boundary of the picture may have the same size.

When it is determined that tiles are partitioned in an uniform size, a syntax, tile_cols_width_minus1, representing a width of a tile, and a syntax, tile_rows_height_minus1, representing a height of a tile may be signaled.

A syntax, tile_cols_width_minus1, represents a value subtracting 1 from the number of coding tree unit columns included by a tile in a uniform size. A syntax, tile_rows_height_minus1, represents a value subtracting 1 from the number of coding tree unit rows included by a tile in an uniform size.

The last tile column may have a width value specified by a syntax, tile_cols_width_minus1, or a value smaller than it. In addition, the last tile row may have a height value specified by a syntax, tile_rows_height_minus1, or a value smaller than it. In an example, when an index of the last tile column is m, a value subtracting a sum of widths of the 0-th to (m−1)-th tile columns from a width of a current picture may be set as a width of the last tile column. In an example, when an index of the last tile row is n, a value subtracting heights from the 0-th to (n−1)-th tile rows from a height of a current picture may be set as a height of the last tile row. In other words, a width of a tile positioned on a right boundary of a current picture and/or a height of a tile positioned on a lower boundary of a current picture may be respectively smaller than or the same as a width and/or a height of other tile.

As a picture is partitioned by using at least one of a vertical line or a horizontal line across a picture, each tile belongs to a different column and/or row. To determine a partitioning shape of the picture, information representing the number of tile columns and/or tile rows may be signaled. In an example, information, num_tile_row_minus1, representing the number of tile rows, and information, num_tile_column_minus1, representing the number of tile columns generated by partitioning the picture may be signaled in a bitstream. A syntax, num_tile_row_minus1, represents a value subtracting 1 from the number of tile rows and a syntax, num_tile_column_minus1, represents a value subtracting 1 from the number of tile columns.

In an example shown in FIG. 34, the number of tile columns is 4 and the number of tile rows is 3. Accordingly, num_tile_columns_minus1 may represent 3 and num_tile_rows_minus1 may represent 2.

A syntax, num_tile_column_minus1, representing the number of tile columns, and/or a syntax, num_tile_rows_minus1, representing the number of tile rows may be signaled when a value of a syntax, uniform_tile_spacing_flag, is 0. In other words, when a current picture is determined not to be partitioned into tiles whose height and width are uniform, a syntax, num_tile_column_minus1, representing the number of tile columns, and/or a syntax, num_tile_rows_minus1, representing the number of tile rows may be signaled.

A syntax representing a width of each tile column and a syntax representing a height of each tile row may be signaled in a bitstream. In an example, tile_cols_width_minus1[i] may represent a width of the i-th tile column and tile_rows_height_minus1[j] may represent a height of the j-th tile row.

A syntax, tile_cols_width_minus1[i], represents a value subtracting 1 from the number of coding tree unit columns configuring the i-th tile column. Signaling of a syntax, tile_cols_width_minus1[i], may be omitted for the last tile column. A width of the last tile column may be derived by subtracting a width of previous tile columns from a width of a current picture.

A syntax, tile_rows_height_minus1[j], represents a value subtracting 1 from the number of coding tree unit rows constituting the j-th tile row. Signaling of a syntax, tile_rows_height_minus1[j], may be omitted for the last tile row. A height of the last tile row may be derived by subtracting a height of previous tile rows from a height of a current picture.

Meanwhile, information representing a size of a coding tree unit may be signaled through a sequence parameter set or through a picture parameter set.

One tile may be configured with at least one coding tree unit. Remaining tiles excluding a tile adjacent to the right or the lower boundary of a picture may be set not to be configured by including a region smaller than a coding tree unit. In other words, the boundary of a tile matches that of a coding tree unit.

According to a partitioning shape of a picture, tiles may have the same size in all regions excluding a picture boundary. Alternatively, a height of tiles which are adjacent horizontally may be set to be the same or a width of tiles which are adjacent vertically may be set to be the same.

Information representing whether a current picture is partitioned into a plurality of tiles may be signaled in a bitstream. In an example, a syntax, single_tile_in_pic_flag, may be signaled in a bitstream. When a syntax, single_tile_in_pic_flag, is 1, it represents that a current picture is not partitioned into a plurality of tiles. On the other hand, when single_tile_in_pic_flag is 0, it represents that a current picture is partitioned into a plurality of tiles.

When a current picture is determined to be partitioned into a plurality of tiles, at least one of information for determining the number of tile columns and tile rows, information representing whether tiles are uniformly partitioned or information for determining a size of a tile column and a tile row may be encoded.

TABLE 8

| | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |

Information for determining a tile size may be encoded and signaled. In an example, a syntax element, tile_width_minus1[i], representing a width of the i-th tile column, and a syntax element, tile_height_minus1[i], representing a height of the i-th tile row may be encoded in a bitstream.

When sizes of consecutive tile columns are the same, width information may be signaled only for one of consecutive tile columns and encoding/decoding of width information may be omitted for remaining tile columns.

In an example, when widths of the i-th tile column to the last tile column in a picture are the same each other, a syntax, tile_width_minus1[i], may be signaled only for the i-th tile column, and a width of each of remaining tile columns may be set the same as a width of the i-th tile column.

Information representing whether widths of a plurality of consecutive tile columns are the same may be encoded and signaled. In an example, a syntax, rem_tile_col_equal_flag[i], represents whether widths from a tile column whose index is i to a tile column whose index is N−1 are the same each other. In this case, N may represent the number of tile columns. In other words, a tile column whose index is N−1 may represent the last tile column in a picture.

When a syntax, rem_tile_col_equal_flag[i], is 1, a syntax, tile_width_minus1[i], representing a width may be signaled for a tile column whose index is i, whereas encoding/decoding of a syntax representing a width of a tile column may be omitted for tile columns whose index is greater than i.

When encoding/decoding of a syntax representing a width of a tile column is omitted, the minimum value of a width of the i-th tile column and a width of a remaining region may be set as a width of a subsequent tile column. In an example, when a width of the i-th tile column is set as a variable, PrevTileColWidth, and a width of a remaining region in a picture is set as a variable, RemainingColWidth, a size of a tile column whose index is greater than i may be set as a smaller value of a variable, PrevTileColWidth, and a variable, RemainingColWidth.

In another example, a syntax, rem_tile_col_equal_flag[i], may be set to represent whether widths from a tile column whose index is 0 to a tile column whose index is i are the same each other.

When sizes of consecutive tile rows are the same, height information may be signaled only for one of consecutive tile rows and encoding/decoding of height information may be omitted for remaining tile rows.

In an example, when heights from the i-th tile row to the last tile row in a picture are the same each other, a syntax, tile_height_minus1[i], may be signaled only for the i-th tile row and remaining tile rows may be set the same as a height of the i-th tile row.

Information representing whether heights of a plurality of consecutive tile rows are the same may be encoded and signaled. In an example, a syntax, rem_tile_row_equal_flag [i], represents whether heights from a tile row whose index is i to a tile row whose index is N−1 are the same each other. In this case, N may represent the number of tile rows. In other words, a tile row whose index is N−1 may represent the last tile row in a picture.

When a syntax, rem_tile_row_equal_flag[i], is 1, a syntax, tile_height_minus1[i], representing a height may be signaled for a tile row whose index is i, whereas encoding/decoding of a syntax representing a height of a tile row may be omitted for tile rows whose index is greater than i.

When encoding/decoding of a syntax representing a height of a tile row is omitted, the minimum value of a height of the i-th tile row and a height of a remaining region may be set as a height of a subsequent tile row. In an example, when a height of the i-th tile row is set as a variable, PrevTileRowHeight, and a height of a remaining region in a picture is set as a variable, RemainingRowHeight, a size of a tile row whose index is greater than i may be set as a smaller value of a variable, PrevTileRowHeight, and a variable, RemainingRowHeight.

In another example, a syntax, rem_tile_row_equal_flag [i], may be set to represent whether heights from a tile row whose index is 0 to a tile row whose index is i are the same each other.

Table 9 illustrates a syntax structure including a syntax, rem_tile_col_equal_flag[i], and a syntax, rem_tile_row_equal_flag [i].

TABLE 9

| | Descriptor |
|---|---|
| pic_parameter_set_rbsp( ) { | |
| ... | |
|   if( !single_tile_in_pic_flag ) { | |
|     ... | |
|     num_tile_columns_minus1 | ue(v) |
|     num_tile_rows_minus1 | ue(v) |
|     for( i = 0, remWidthInCtbsY = PicWidthInCtbsY; | |
|       i < num_tile_columns_minus1 && ( i = = 0 | |
|     || !rem_tile_col_equal_flag[ i − 1 ] ); | |
|       remWidthInCtbsY −= tile_column_width_minus1[ i ] + 1, i++ ) { | |
|       if( remWidthInCtbsY % ( num_tile_columns_minus1 +1 − i ) = = 0 ) | |
|         rem_tile_col_equal_flag[ i ] | u(1) |
|       if( !rem_tile_col_equal_flag[ i ] ) | |
|         tile_column_width_minus1[ i ] | ue(v) |
|     } | |

TABLE 9-continued

| | Descriptor |
|---|---|
|     for( i = 0, remHeightInCtbsY = PicHeightInCtbsY; | |
|       i < num_tile_rows_minus1 && ( i = = 0 | |
|     || !rem_tile_row_equal_flag[ i − 1 ] ); | |
|       remHeightInCtbsY −= tile_row_height_minus1[ i ] + 1, i++ ) { | |
|       if( remHeightInCtbsY % ( num_tile_rows_minus1 +1 − i ) = = 0 ) | |
|         rem_tile_row_equal_flag[ i ] | u(1) |
|       if( !rem_tile_row_equal_flag[ i ] ) | |
|         tile_row_height_minus1[ i ] | ue(v) |
|     } | |

Information for specifying the number of tile columns whose width is explicitly signaled in a current picture may be signaled in a bitstream. In an example, a syntax, num_exp_tile_columns_minus1, for determining the number of tile columns whose width is signaled, may be signaled in a bitstream. A syntax, num_exp_tile_columns_minus1, may be a value subtracting 1 from the number of tile columns whose width is signaled.

As many as the number determined based on a syntax, num_exp_tile_columns_minus1, a syntax for specifying a width of a tile column may be encoded and signaled. In an example, a syntax, tile_width_minus1[i], representing a width of the i-th tile column, may be signaled in a bitstream. A syntax, tile_width_minus1[i], may represent a value subtracting 1 from the number of coding tree unit columns included in a tile row.

When an index i of a tile column is smaller than the number of tile columns whose width is explicitly signaled, a width of the corresponding tile column may be determined based on a syntax, tile_width_minus1[i], signaled in a bitstream.

On the other hand, When an index j of a tile column is equal to or greater than the number of tile columns whose width is explicitly signaled, a width of the corresponding tile column may be determined based on a syntax, tile_width_minus1[l], which is signaled last. In this case, l may represent an index of a tile column whose width is signaled last and may be an integer smaller than j. In an example, when a value subtracting a width of previous tile columns from a width of a current picture is equal to or greater than a value adding 1 to a syntax, tile_width_minus1[l], a width of a tile column j may be set as a value adding 1 to a syntax, tile_width_minus1[l]. On the other hand, when a value subtracting widths of previous tile columns from a width of a current picture is smaller than a value adding 1 to a syntax, tile_width_minus1[l], a difference value subtracting widths of previous tile columns from a width of a current picture may be set as a width of a tile column j.

Table 10 shows a process in which a width of a tile column is determined.

TABLE 10

| |
|---|
| remainingWidthInCtbsY = PicWidthInCtbsY |
| for( i = 0; i <= num_exp_tile_columns_minus1; i++ ) { |
|   colWidth[ i ] = tile_column_width_minus1[ i ] + 1 |
|   remainingWidthInCtbsY −= colWidth[ i ] |
| } |
| uniformTileColWidth = tile_column_width_minus1[ num_exp_tile_columns_minus1 ] + 1 |
| while( remainingWidthInCtbsY >= uniformTileColWidth ) { |
|   colWidth[ i++ ] = uniformTileColWidth |
|   remainingWidthInCtbsY −= uniformTileColWidth |
| } |

TABLE 10-continued

```
if( remainingWidthInCtbsY > 0 )
  colWidth[ i++ ] = remainingWidthInCtbsY
NumTileColumns = i
```

In Table 10, a variable, PicWidthInCtbsY, represents the number of coding tree unit columns included by a current picture. In an example, a variable, PicWidthInCtbsY, may be derived as in the following Equation 9.

$$PicWidthInCtbsY=\text{Ceil}(pic\_width\_in\_luma\_samples/CtbSizeY) \quad \text{[Equation 9]}$$

A variable, remainingWidthInCtbsY, represents a value subtracting accumulated widths of tile columns from a variable, PicWidthInCtbsY. In an example, for a tile column whose index is i, remainingWidthInCtbsY may be derived by subtracting a value which is a sum of widths from the 0-th to (i−1)-th tile columns from PicWidthInCtbsY.

As in an example shown in Table 10, a variable, uniformTileColWidth, may be derived by adding 1 to tile_column_width_minus1[num_exp_tile_columns_minus1], a width of a tile column which is explicitly signaled last. In this case, when a variable, remainingWidthInCtbY, representing the number of remaining coding tree unit columns in a current picture is equal to or greater than a variable, uniformTileColWidth, a remaining region may be partitioned in a size of a variable, uniformTileColWidth.

On the other hand, when a variable, remainingWidthInCtbY, representing the number of remaining coding tree unit columns in a current picture is smaller than a variable, uniformTileColWidth, a remaining region may be set as the last tile column as it is.

On the other hand, When an index j of a tile column is equal to or greater than the number of tile columns whose width is explicitly signaled, a width of the corresponding tile column may be set as a smaller value of a variable uniformTileColWidth and remainingWidthInCtbY.

In other words, a width of remaining tile columns excluding tile columns whose width is explicitly signaled may have a value smaller than or equal to a width of the last tile column among tile columns whose width is explicitly signaled.

Information for specifying the number of tile columns whose width is explicitly signaled in a current picture may be signaled in a bitstream. In an example, a syntax, num_exp_tile_columns_minus1, for determining the number of tile columns whose width is signaled, may be signaled in a bitstream. A syntax, num_exp_tile_columns_minus1, may be a value subtracting 1 from the number of tile columns whose width is signaled.

As many as the number determined based on a syntax, num_exp_tile_rows_minus1, a syntax for specifying a height of a tile row may be encoded and signaled. In an example, a syntax, tile_height_minus1[i], representing a height of the i-th tile row may be signaled in a bitstream. A syntax, tile_height_minus1[i] may represent a value subtracting 1 from the number of coding tree unit rows included in a tile row.

When an index i of a tile row is smaller than the number of tile rows whose height is explicitly signaled, a height of the corresponding tile row may be determined based on a syntax, tile_height_minus1[i], signaled in a bitstream.

On the other hand, When an index j of a tile row is equal to or greater than the number of tile rows whose height is explicitly signaled, a height of the corresponding tile row may be determined based on a syntax, tile_height_minus1 [l], which is signaled last. In this case, 1 may represent an index of a tile row whose height is signaled last and may be an integer smaller than j.

In an example, when a value subtracting heights of previous tile rows from a height of a current picture is equal to or greater than a value adding 1 to a syntax, tile_height_minus1[l], a height of a tile row j may be set as a value adding 1 to a syntax, tile_height_minus1[l]. On the other hand, when a value subtracting heights of previous tile rows from a height of a current picture is smaller than a value adding 1 to a syntax, tile_height_minus1[l], a difference value subtracting heights of previous tile rows from a height of a current picture may be set as a height of a tile row j.

Table 11 shows a process in which a height of a tile row is determined.

TABLE 11

```
remainingHeightInCtbsY = PicHeightInCtbsY
for( j = 0; j < num_exp_tile_rows_minus1; j++ ) {
  RowHeight[ j ] = tile_row_height_minus1[ j ] + 1
  remainingHeightInCtbsY −= RowHeight[ j ]
}
uniformTileRowHeight =
tile_row_height_minus1[ num_exp_tile_rows_minus1 ] + 1
while( remainingHeightInCtbsY >= uniformTileRowHeight ) {
  RowHeight[ j++ ] = uniformTileRowHeight
  remainingHeightInCtbsY −= uniformTileRowHeight
}
if( remainingHeightInCtbsY > 0 )
  RowHeight[ j++ ] = remainingHeightInCtbsY
NumTileRows = j
```

In Table 11, a variable, PicHeightInCtbsY, represents the number of coding tree unit rows included by a current picture. In an example, a variable, PicWidthInCtbsY, may be derived as in the following Equation 10.

$$PicHeightInCtbsY=\text{Ceil}(pic\_height\_in\_luma\_samples/CtbSizeY) \quad \text{[Equation 10]}$$

A variable, remainingHeightInCtbsY, represents a value subtracting accumulated heights of tile rows from a variable, PicHeightInCtbsY. In an example, for a tile row whose index is i, remainingHeightInCtbsY may be derived by subtracting a value which is a sum of heights from the 0-th to (i−1)-th tile rows from PicHeightInCtbsY.

As in an example shown in Table 10, a variable, uniformTileRowHeight, may be derived by adding 1 to tile_row_height_minus1[num_exp_tile_rows_minus1], a height of a tile row which is explicitly signaled last. In this case, when a variable, remainingHeightInCtbY, representing the number of remaining coding tree unit rows in a current picture is equal to or greater than a variable, uniformTileRowHeight, a remaining region may be partitioned in a size of a variable, uniformTileRowHeight.

On the other hand, when a variable, remainingHeightInCtbY, representing the number of remaining coding tree unit rows in a current picture is smaller than a variable, uniformTileRowHeight, a remaining region may be set as the last tile row as it is.

On the other hand, When an index j of a tile row is equal to or greater than the number of tile rows whose height is explicitly signaled, a height of the corresponding tile row may be set as a smaller value of a variable uniformTileRowHeight and remainingHeightInCtbY.

In other words, a height of remaining tile rows excluding tile rows whose height is explicitly signaled may have a value smaller than or equal to a width of the last tile row among tile rows whose height is explicitly signaled.

Table 12 illustrates a syntax table which includes a syntax representing the number of tile columns whose width is explicitly signaled and a syntax representing the number of tile rows whose height is explicitly signaled.

TABLE 12

| | Descriptor |
|---|---|
| pic_parameter_set_rbsp( ) { | |
| ... | |
|   single_tile_in_pic_flag | u(1) |
|   if( !single_tile_in_pic_flag ) { | |
|     log2_pps_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     loop_filter_across_tiles_enabled_flag | u(1) |
|     loop_filter_across_slices_enabled_flag | u(1) |

Meanwhile, a syntax, loop_filter_across_tiles_enabled_flag, represents whether it is allowed to apply an in-loop filter on a boundary of tiles in a picture which refers to a picture parameter set. In this case, an in-loop filter may include at least one of a deblocking filter, ALF or SAO. When a value of a flag, loop-filter_across_tiles_enabled_flag, is 1, it represents that an in-loop filter which crosses a boundary of tiles in a picture referring to a picture parameter set may be applied. On the other hand, when a value of a flag, loop_filter_across_tiles_enabled_flag, is 0, it represents that it is not allowed to apply an in-loop filter on a boundary of tiles in a picture which refers to a picture parameter set.

A syntax, loop_filter_across_slices_enabled_flag, represents whether it is allowed to apply an in-loop filter on a boundary of slices in a picture which refers to a picture parameter set. In this case, an in-loop filter may include at least one of a deblocking filter, ALF or SAO. When a value of a flag, loop_filter_across_slices_enabled_flag, is 1, it represents that an in-loop filter which crosses a boundary of slices in a picture referring to a picture parameter set may be applied. On the other hand, when a value of a flag, loop_filter_across_slices_enabled_flag, is 0, it represents that it is not allowed to apply an in-loop filter on a boundary of slices in a picture which refers to a picture parameter set.

A tile may be recursively partitioned. In an example, one tile may be partitioned into a plurality of tiles.

Each of a plurality of tiles generated by partitioning a tile may be referred to as a sub-tile or a brick. A brick may be a unit of parallel processing. In an example, a brick may be independently encoded/decoded each other. In encoding/decoding a block included in a brick, it may be set not to use data of another block. In an example, a sample included in another brick may be set to be unavailable as a reference sample for intra prediction. Alternatively, data in another brick may be set not to be used as a merge candidate, a motion vector prediction candidate (AMVP candidate) or a motion information candidate. Alternatively, data in other brick may not be used for context calculation of a symbol.

FIG. 35 is a diagram for explaining a generation aspect of a brick.

A brick may be generated by partitioning a tile in a horizontal direction. In an example, an example shown in FIG. 35 showed that tiles belonging to the last tile column in a current picture are partitioned into 2 bricks.

When it is assumed that a raster scan is applied to tiles, a raster scan may be applied between bricks. In an example, after scanning all bricks included in a specific tile, a subsequent tile may be scanned. In other words, a brick may have the same status as a tile.

The boundary of a brick may match that of a coding tree unit. In other words, at least one coding tree unit row in a tile may be defined as a brick.

Information representing whether a tile is partitioned into a plurality of bricks may be signaled in a bitstream. Table 13 represents a syntax table including information for determining whether a tile is partitioned.

TABLE 13

| | Descriptor |
|---|---|
| pic_parameter_set_rbsp( ) { | |
|   pps_pic_parameter_set_id | ue(v) |
|   pps_seq_parameter_set_id | ue(v) |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     brick_splitting_present_flag | u(1) |
|     for( i = 0; brick_splitting_present_flag && i < NumTilesInPic; i++ ) { | |
|       brick_split_flag[ i ] | u(1) |
|       if( brick_split_flag[ i ] ) { | |
|         uniform_brick_spacing_flag[ i ] | u(1) |
|         if( uniform_brick_spacing_flag[ i ] ) | |
|           brick_height_minus1[ i ] | ue(v) |
|         else { | |
|           num_brick_rows_minus1[ i ] | ue(v) |
|           for( j = 0; j < num_brick_rows_minus1[ i ]; j++ ) | |
|             brick_row_height_minus1[ i ][ j ] | ue(v) |
|         } | |
|       } | |
|     } | |
|     single_brick_per_slice_flag | u(1) |
|     if( !single_brick_per_slice_flag ) | |
|       rect_slice_flag | u(1) |
|     if( rect_slice_flag && !single_brick_per_slice_flag ) { | |
|       num_slices_in_pic_minus1 | ue(v) |
|       for( i = 0; i <= num_slices_in_pic_minus1; i++ ) { | |
|         if( i > 0 ) | |
|           top_left_brick_idx[ i ] | u(v) |
|         bottom_right_brick_idx_delta[ i ] | u(v) |
|       } | |
|     } | |
|     loop_filter_across_bricks_enabled_flag | u(1) |
|     if( loop_filter_across_bricks_enabled_flag ) | |
|       loop_filter_across_slices_enabled_flag | u(1) |
|   } | |

Information related to brick partitioning may include at least one of information representing whether there is at least one tile partitioned into bricks, information representing whether a tile is partitioned into bricks, information representing the number of bricks in a tile or information representing a size of a brick.

In an example, a syntax, brick_splitting_present_flag, representing whether there is at least one tile partitioned into bricks may be signaled in a bitstream.

When a syntax, brick_splitting_present_flag, is 1, at least one or more tiles may be partitioned into a plurality of bricks. When a syntax, brick_splitting_present_flag, is 1, brick_split_flag representing whether a tile is partitioned into a plurality of bricks may be additionally signaled.

When a syntax, brick_splitting_present_flag, is 0, it represents that there is no tile partitioned into a plurality of bricks in a current picture or pictures referring to PPS. When a syntax, brick_splitting_present_flag, is 0, encoding of brick_split_flag representing whether a tile is partitioned into a plurality of bricks may be omitted.

When it is determined that a tile partitioned into a plurality of bricks is present in a current picture, a syntax, brick_split_flag[i], representing whether the i-th tile is partitioned into a plurality of bricks, may be signaled. In an example, when a value of a syntax, brick_split_flag[i], is 1, it represents that a tile whose tile index is i is partitioned into two or more bricks. When a value of a syntax, brick_split_flag[i], is 0, it represents that a tile whose tile index is i is not partitioned into a plurality of bricks.

When a tile is partitioned into a plurality of bricks, information for determining a partition aspect of a tile may be signaled in a bitstream. In an example, a syntax, uniform_brick_spacing_flag, may be signaled in a bitstream. When a syntax, uniform_brick_spacing_flag, is 1, it represents that a height of bricks in a tile is uniform. When a value of uniform_brick_spacing_flag is 1, a syntax brick_height_minus1, representing a base height of a brick may be signaled. A syntax, brick_height_minus1, represents a value obtained by subtracting 1 from the number of coding tree units which constitutes a brick.

Remaining bricks excluding the last brick in a tile may have a base height determined by a syntax, brick_height_minus1. The last brick in a tile may be set as a region excluding the other bricks.

When a value of a syntax, uniform_brick_spacing_flag, is 0, a syntax, num_brick_rows_minus1[i], representing the number of bricks in the i-th tile and a syntax, brick_row_height_minus1[i][j], representing a height of the j-th brick in the i-th tile may be signaled. A syntax, num_brick_rows_minus1[i], represents a value obtained by subtracting 1 from the number of bricks included in i-th tile.

The signaling of a syntax, brick_row_height_minus1[i][j], may be omitted for the last brick in a tile. A height of the last brick in a tile may be derived by subtracting a sum of heights of previous bricks from a height of a tile.

A syntax, brick_height_minus1[i], representing a height of a brick may have a value smaller than a value subtracting 1 from a height of a tile including a brick. In an example, when a height of a tile is rowHeight, a syntax, brick_height_minus1[i], may have a value between 0 and rowHeight-2. In this case, rowHeight represents the number of coding tree unit rows included by a tile.

Alternatively, a partitioning aspect of a tile may be determined by omitting encoding of a flag representing whether a tile is uniformly partitioned and using at least one of information representing the number of bricks and information representing a height of a brick.

Alternatively, a partitioning aspect of a tile may be determined by using information specifying the number of bricks whose height is explicitly signaled. In an example, a syntax, num_exp_brick_minus1, for determining the number of bricks whose height is signaled may be signaled in a bitstream. A syntax, num_exp_brick_minus1, may have a value subtracting 1 from the number of bricks whose height is explicitly signaled.

As many as the number determined based on a syntax, num_exp_brick_minus1, a syntax for specifying a height of bricks may be encoded and signaled. In an example, brick_height_minus1[i] represents a height of the i-th brick.

When an index i of a brick is smaller than the number of bricks whose height is signaled, a height of the corresponding brick may be determined based on brick_height_minus1[i] signaled in a bitstream. On the other hand, When an index j of a brick is equal to or greater than the number of bricks whose height is signaled, a height of the corresponding brick may be set the same as brick_height_minus1[l], a syntax which is signaled last. In this case, 1 may represent an index of a brick whose height is signaled last and may be an integer smaller than j.

A tile and a brick may be identified by a tile index. A tile index may be assigned to each tile and brick in the raster scanning order. When one tile is partitioned into a plurality of bricks, a tile index may be assigned to each of a plurality of bricks.

In the after-mentioned embodiment, a term, 'a tile', may include tiles generated by partitioning a tile (i.e., a sub-tile or a brick) as well as a tile.

At least one or more tiles may be defined as one processing unit. In an example, a plurality of tiles may be defined as one slice. A slice may be referred to as a tile group.

Alternatively, one tile may be partitioned into a plurality of processing units. In an example, a tile may be partitioned into a plurality of slices. In this connection, one slice may include at least one coding tree unit column. When a tile is partitioned into a plurality of slices, information representing a height of each slice may be signaled in a bitstream.

Image encoding/decoding information may be signaled through a slice header. Information signaled through a slice header may be commonly applied to tiles and/or blocks belong to a slice.

Information representing a slice type may be signaled via a bitstream. The information represents a definition method of a slice in a current picture. In an example, a syntax, rect_slice_flag, representing a slice type may be signaled in a bitstream.

A syntax, rect_slice_flag, represents whether a slice is defined based on a raster scanning order of tiles or whether a slice is defined in a rectangular shape. In an example, when rect_slice_flag is 0, it represents that a slice is defined based on a raster scanning order of tiles. On the other hand, when rect_slice_flag is 1, it represents that a slice is defined in a rectangular shape.

Hereinafter, the two methods for determining a slice will be described in detail.

A definition method based on raster scanning is to specify at least one or more tiles according to a raster scanning order and define at least one or more specified tiles as a slice. When a definition method based on raster scanning is followed, one or more consecutive tile(s) may be defined as a slice. In this case, consecutive tiles may be determined according to a raster scanning order. When a raster scanning slice is applied, a non-rectangular slice may be generated.

FIGS. 36 and 37 are diagrams showing an example in which a slice is defined based on a raster order.

In an example, in an example shown in FIG. 36, when it is assumed that the first slice, slice0, includes 3 tiles, the first slice, slice0, may be defined as including Tile0 to Tile2 according to a raster scanning order. When it is assumed that the second slice, slice1, includes 6 tiles, the second slice, slice1, may be defined as including Tile3 to Tile8 according to a raster scanning order. The last slice, slice2, may include residual tiles, Tile9 to Tile11, according to a raster scanning order.

When a slice is defined based on a raster scanning order, information representing the number of tiles included by each slice may be signaled. Signaling of information representing the number of tiles included by a slice may be omitted for the last slice.

When a slice includes a plurality of tiles, a width or a height of tiles included in a slice may be different. In an example, it was shown that a height of Tile3 among tiles included by the second slice, slice1, is different from other tiles.

A definition method of a slice in a rectangular shape is a partitioning method which allows only a slice in a rectangular shape. When a definition method of a slice in a rectangular shape is applied, tiles positioned at four corners of a slice belong to the same row or the same column.

FIG. 38 is a diagram showing an example in which only a slice in a rectangular shape is allowed.

As in an example shown in FIG. 38, the fourth slice, slice3, includes Tile5, Tile6, Tile9 and Tile10. As in a shown example, when a slice includes a plurality of tiles, a rectangle which has a top-left tile and a bottom-right tile as two vertices thereof may be defined as one slice.

A boundary of a slice may match that of a picture and/or that of a tile. In an example, a left boundary or a top boundary of a slice may be set as a boundary of a picture, or a left boundary or a top boundary of a slice may be set as a boundary of a tile.

Alternatively, when a method of defining a rectangular slice is applied, one tile may be partitioned into a plurality of rectangular slices.

When a method of defining a rectangular slice is applied (e.g., when rect_slice_flag is 1), information representing whether a picture is configured with a single slice may be signaled. In an example, a syntax, one_slice_in_pic_flag, representing whether the number of slices in a picture is 1 may be signaled in a bitstream. When a flag, one_slice_in_pic_flag, is 1, it represents that a picture is configured with a single slice. On the other hand, when a flag, one_slice_in_pic_flag, is 0, it represents that a picture is configured with at least 2 or more slices. When a value of a flag, one_slice_in_pic_flag, is 0, configuration information of a slice may be additionally signaled. In an example, Table 14 illustrates a syntax table including a syntax, one_slice_in_pic_flag.

TABLE 14

| | Descriptor |
|---|---|
| pic_parameter_set_rbsp( ) { | |
|   pps_pic_parameter_set_id | ue(v) |
|   pps_seq_parameter_set_id | ue(v) |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     brick_splitting_present_flag | u(1) |
|     for( i = 0; brick_present_flag && i < NumTilesInPic; i++ ) { | |
|       brick_split_flag[ i ] | u(1) |
|       if( brick_split_flag[ i ] ) { | |
|         uniform_brick_spacing_flag[ i ] | u(1) |
|         if( uniform_brick_spacing_flag[ i ] ) | |
|           brick_height_minus1[ i ] | ue(v) |

TABLE 14-continued

| | Descriptor |
|---|---|
|         else { | |
|           num_brick_rows_minus1[ i ] | ue(v) |
|           for( j = 0; j < num_brick_rows_minus1[ i ]; j++ ) | |
|             brick_row_height_minus1[ i ][ j ] | ue(v) |
|         } | |
|       } | |
|     } | |
|     single_brick_per_slice_flag | u(1) |
|     if( !single_brick_per_slice_flag ) | |
|       rect_slice_flag | u(1) |
|     if( rect_slice_flag | |
|     && !single_brick_per_slice_flag ) { | |
|       one_slice_in_pic_flag | u(1) |
|       if (!one_slice_in_pic_flag) { | |
|         num_slices_in_pic_minus2 | ue(v) |
|         for( i = 0; i <= num_slices_in_pic_minus2+1; i++ ) { | |
|           if( i > 0 ) | |
|             top_left_brick_idx [ i ] | u(v) |
|             bottom_right_brick_idx_delta[ i ] | u(v) |
|         } | |
|       } | |
|     } | |
|     loop_filter_across_bricks_enabled_flag | u(1) |
|     if( loop_filter_across_bricks_enabled_flag ) | |
|       loop_filter_across_slices_enabled_flag | u(1) |
| } | |

As illustrated, when one_slice_in_pic_flag is 1, encoding of information related to configuration of a slice which will be described after (e.g., a syntax, top_left_brick_idx[i], representing an index of a tile included by a slice, and/or a syntax, bottom_right_bric_idx_delta[i], representing an index difference between a tile included by a first slice and a tile included by a second slice, etc.) may be omitted. In other words, one_slice_in_pic_flag may be used to determine whether information related to configuration of a slice is encoded.

The picture may represent a subpicture. A picture may be partitioned into at least one subpicture. Information related to subpicture partitioning may be signaled at a sequence level. In an example, information related to subpicture partitioning which is signaled through a sequence parameter set may be commonly applied to all pictures which refer to the sequence parameter set.

Information related to subpicture partitioning may include information representing whether a picture is partitioned into a plurality of subpictures, information representing the number of subpictures, information representing a size of a subpicture or information representing whether a subpicture is treated as an independent picture.

A syntax, one_slice_in_pic_flag, representing whether it is configured with a single slice may be signaled per subpicture.

Alternatively, a syntax, one_slice_in_pic_flag, representing whether each subpicture is configured with a single slice may be signaled at a sequence level or a picture level. In an example, when a flag, one_slice_in_pic_flag, is 1, it represents that all subpictures in a current picture are configured with a single slice. On the other hand, when a flag, one_slice_in_pic_flag, is 0, it represents that at least one subpicture in a current picture is configured with a plurality of slices.

When it is determined that a picture is configured with a plurality of slices, a syntax representing the number of slices in the picture may be encoded and signaled. In an example, a syntax, num_slices_in_pic_minus2, representing the number of slices in a picture may be signaled in a bitstream. A syntax, num_slices_in_pic_minus2, may represent a value subtracting 2 from the number of slices in a picture. Accordingly, a decoder may determine the total number of slices by adding 2 to a value indicated by a syntax, num_slices_in_pic_minus2.

Instead of a syntax, num_slices_in_pic_minus2, a syntax, num_slices_in_pic_minus1, representing a value subtracting 1 from the number of slices in a picture may be encoded.

When a definition method of a slice in a rectangular shape is applied, information for identifying tiles included by each slice may be signaled to determine tiles included by each slice. The information may be used to specify at least one of the first tile or the last tile of a slice. An order between tiles may be determined according a predetermined scanning order. In an example, when a raster scanning order is applied, the first tile indicates a tile at a top-left position of a slice and the last tile indicates a tile at a bottom-right position of a slice.

Information for identifying at least one of an index of a tile at a top-left position of a slice or an index of a tile at a bottom-right position of the slice may be signaled in a bitstream. In an example, at least one of a syntax, top_left_tile_idx, for identifying an index of a tile at a top-left position of a slice, or a syntax, bottom_right_tile_idx, for identifying an index of a tile at a bottom-right position of a slice may be signaled in a bitstream. Encoding of at least one of a syntax for identifying an index of a tile at a top-left position of a slice or a syntax for identifying an index of a tile at a bottom-right position of a slice may be omitted for the last slice. A remaining region excluding a region occupied by previous slices in a current picture may be set as the last slice.

In an example, in an example shown in FIG. 38, top_left_tile_idx representing an index of a tile at a top-left position of a slice, and bottom_right_tile_idx representing an index of a tile at a bottom-right position of a slice may be signaled for each of slice0, slice1 and slice2. On the other hand, encoding of top_left_tile_idx and bottom_right_tile_idx may be omitted for the last slice, slice3, in a picture. An index of a top-left tile of the last slice, slice3, in a picture, may be set as an index of a tile at a top-left position in a remaining region excluding slice0, slice1 and slice2 in a picture and an index of a bottom-right tile of slice3 may be set as an index of a tile at a bottom-right position in the remaining region (or, a tile at a bottom-right position of a picture).

Alternatively, difference information for specifying an index of a tile included in a slice may be encoded and signaled. In an example, information representing a difference value of an index of a tile at a top-left position of a slice and an index of a tile at a bottom-right position of the slice may be signaled in a bitstream. In an example, a syntax, top_left_tile_idx[i], for identifying an index of a tile at a top-left position of a slice, and a syntax, bottom_right_tile_idx_delta[i], representing a difference between an index of a tile at a top-left position of a slice and an index of a tile at a bottom-right position of a slice, may be signaled for the i-th slice. An index of a bottom-right tile of the i-th slice may be derived by summing top_left_tile_idx[i] and bottom_right_tile_idx_delta[i]. Encoding of at least one of a syntax representing an index of a tile at a top-left position of a slice or a syntax representing a difference of an index of a tile at a top-left position of a slice and an index of a tile at a bottom-right position of a slice may be omitted for the last slice. A remaining region excluding a region occupied by previous slices in a current picture may be set as the last slice.

Alternatively, at least one of horizontal directional tile index difference information or vertical directional tile index difference information may be encoded and signaled. Horizontal directional tile index difference information may represent a difference between an index of the first tile and an index of the rightmost tile included in the same tile row as the first tile. Vertical directional tile index difference information may represent a difference between an index of the first tile and an index of the lowest tile included in the same tile column as the first tile.

According to a position of a slice, a difference information type to be encoded may be determined. In an example, for a slice adjacent to a right boundary or a bottom boundary of a picture, horizontal directional tile index difference information or vertical directional tile index difference information may be encoded and signaled. The amount of bits may be reduced by encoding horizontal directional tile index difference information or vertical directional tile index difference information instead of information representing an index difference between a top-left tile and a top-right tile.

Alternatively, when a picture is partitioned into at least one or more slice rows, information representing an index difference between a top-left tile and a bottom-right tile may be encoded for a slice adjacent to a left boundary of a picture. Slices belonging to the same row may be set to have the same height.

Difference information between an index of a tile included in the first slice and an index of a tile included in the second slice may be encoded and signaled. In this case, the first slice and the second slice may be determined based on a scanning order and each slice may be occupied by a different tile.

In an example, when a tile constituting the first slice and a tile constituting the second slice are different, an index of the second slice may be obtained by adding 1 to an index i of the first slice.

Alternatively, when the first tile is partitioned to include a plurality of slices, difference information between the first slice included in the first tile and the second slice including the second tile which is the next tile of the first tile in a scanning order or between the first slice included in the first tile and the second slice included in the second tile may be encoded. In this case, difference information may be encoded only for the first slice or the last slice among a plurality of slices included in the first tile.

A tile used to derive difference information between the first slice and the second slice may be positioned at a top-left, top-right, bottom-right, bottom-left or center of a slice.

Table 15 illustrates a syntax table including difference information.

TABLE 15

| | Descriptor |
| --- | --- |
| pic_parameter_set_rbsp( ) { | |
|   pps_pic_parameter_set_id | ue(v) |
|   pps_seq_parameter_set_id | ue(v) |
|   single_tile_in_pic_flag | u(1) |
|   if( !single_tile_in_pic_flag ) { | |
|     uniform_tile_spacing_flag | u(1) |

TABLE 15-continued

| | Descriptor |
|---|---|
| if( uniform_tile_spacing_flag ) { | |
|   tile_cols_width_minus1 | ue(v) |
|   tile_rows_height_minus1 | ue(v) |
| } else { | |
|   num_tile_columns_minus1 | ue(v) |
|   num_tile_rows_minus1 | ue(v) |
|   for( i = 0; i < num_tile_columns_minus1; i++ ) | |
|     tile_column_width_minus1[ i ] | ue(v) |
|   for( i = 0; i < num_tile_rows_minus1; i++ ) | |
|     tile_row_height_minus1[ i ] | ue(v) |
| } | |
| brick_splitting_present_flag | u(1) |
| for( i = 0; brick_present_flag && i < NumTilesInPic; i++ ) { | |
|   brick_split_flag[ i ] | u(1) |
|   if( brick_split_flag[ i ] ) { | |
|     uniform_brick_spacing_flag[ i ] | u(1) |
|     if( uniform_brick_spacing_flag[ i ] ) | |
|       brick_height_minus1[ i ] | ue(v) |
|     else { | |
|       num_brick_rows_minus1[ i ] | ue(v) |
|       for( j = 0; j < num_brick_rows_minus1[ i ]; j++ ) | |
|         brick_row_height_minus1[ i ][ j ] | ue(v) |
|     } | |
|   } | |
| } | |
| single_brick_per_slice_flag | u(1) |
| if( !single_brick_per_slice_flag ) | |
|   rect_slice_flag | u(1) |
| if( rect_slice_flag && !single_brick_per_slice_flag ) { | |
|   num_slices_in_pic_minus1 | ue(v) |
|   for( i = 0; i <= num_slices_in_pic_minus1; i++ ) { | |
|     if( i > 0 ) | |
|       top_left_brick_idx_delta[ i ] | u(v) |
|     bottom_right_brick_idx_delta[ i ] | u(v) |
|   } | |
| } | |
| loop_filter_across_bricks_enabled_flag | u(1) |
| if( loop_filter_across_bricks_enabled_flag ) | |
|   loop_filter_across_slices_enabled_flag | u(1) |
| } | |

In an example, a syntax, top_left_brick_idx_delta[i], representing an index difference between a top-left tile of the i-th slice and a top-left tile of a previous slice (i.e., the (i−1)-th slice), may be signaled in a bitstream.

Based on difference information, a position of a top-left tile in the i-th slice may be determined. Concretely, an index of a top-left tile of the i-th slice may be derived by adding an index of a top-left tile of the (i−1)-th slice and a syntax, top_left_brick_idx_delta[i]. Equation 11 represents an example of deriving an index of a top-left tile of the i-th slice.

$$TopLeftBrickIdx[i]=TopLeftBrickIdx[i-1]+top\_left\_brick\_idx\_delta[i] \quad \text{[Equation 11]}$$

In the Equation 11, TopLeftBrickIdx[i−1] represents an index of a top-left tile of the (i−1)-th slice.

Encoding of a syntax, top_left_brick_idx_delta[i], representing difference information with a previous slice may be omitted for the first slice (i.e., a slice that an index i is 0). A syntax, bottom_right_brick_idx_delta[i], representing an index difference between a top-left tile and a top-right tile of a slice may be encoded and signaled for the first slice.

Table 16 is an example showing a process in which a slice to which each tile belongs is specified by using difference information.

TABLE 16

```
NumBricksInSlice[ i ] = 0
TopLeftBrickIdx[0] = 0
TopLeftBrickIdx[i] = top_left_brick_idx_delta[i] +
   TopLeftBrickIdx[i−1]
botRightBkIdx = TopLeftBrickIdx[i] +
   bottom_right_brick_idx_delta[ i ]
for( j = 0; j < NumBricksInPic; j++) {
   if( BrickColBd[ j ] >=
BrickColBd[ TopLeftBrickIdx[i]] ] &&
      BrickColBd[ j ] <=
BrickColBd[ botRightBkIdx ] &&
      BrickRowBd[ j ] >=
BrickRowBd[ TopLeftBrickIdx [ i ] ] &&
      BrickRowBd[ j ] <=
BrickColBd[ botRightBkIdx ] ) {
   NumBricksInSlice[ i ]++
   BricksToSliceMap[ j ] = i
   }
}
```

NumBricksInSlice[i] represents the number of tiles included by a slice i. TopLeftBrickIdx[i] represents an index of a top-left tile of a slice i. botRightBkIdx represents an index of a top-right tile. BrickColBd[j] represents an index of a tile column to which a tile j belongs. BrickRowBd[j] represents an index of a tile row to which a tile j belongs. BricksToSliceMap[j]=i represents that a tile j is added to a slice i.

Instead of a syntax, top_left_brick_idx_delta[i], a syntax, bottom_right_brick_idx_delta[i], representing an index difference between a bottom-right tile of the i-th slice and a bottom-right tile of a previous slice (i.e., the (i−1)-th slice), may be signaled in a bitstream. In this case, an index of a bottom-right tile of the i-th slice may be derived by adding a syntax, bottom_right_brick_idx_delta[i], to an index of a bottom-right tile of a previous slice.

bottom_right_brick_idx_delta [0] for a first slice may be set the same as an index of a bottom-right tile of a first slice. In other words, an index of a bottom-right tile of a first slice may be set the same as a syntax, bottom_right_brick_idx_delta[0].

Information representing whether an index of a tile included in the i-th slice in a picture has a value greater than an index of a tile included in the (i−1)-th slice may be encoded and signaled in a bitstream. In an example, a syntax, bottom_right_increasing_order_flag, may be signaled in a bitstream. When a flag, bottom_right_increasing_order_flag, is 1, it represents that an index of a tile included in the i-th slice in a picture always has a value greater than an index of a tile included in the (i−1)-th slice. On the other hand, when bottom_right_increasing_order_flag is 0, it represents that an index of a tile included in at least one slice in a picture may have a value smaller than an index of a tile included in a previous slice.

A slice may be defined by using information specifying at least one of a width or a height of a slice. In an example, at least one of a syntax, slice_width_in_tiles_minus1[i], representing a width of the i-th slice, or a syntax, slice_height_in_tiles_minus1[i], representing a height of the i-th slice may be signaled in a bitstream.

A syntax, slice_width_in_tiles_minus1[i], represents a value subtracting 1 from the number of tile columns included in the i-th slice. A syntax, slice_height_in_tiles_minus1[i], represents a value subtracting 1 from the number of tile rows included in the i-th slice.

The i-th slice may be constituted with as many tile columns as the number determined based on a syntax, slice_width_in_tiles_minus1[i], and as many tile rows as the number determined based on a syntax, slice_height_in_tiles_minus1[i]. In this case, a top-left tile of the i-th tile column may have an index value determined based on top_left_brick_idx_delta[i].

Alternatively, a syntax, slice_height_in_tiles_minus1[i], representing a height of a slice may be signaled only for a slice adjacent to a left boundary of a picture, and encoding of a syntax, slice_height_in_tiles_minus1[i], may be omitted for other slices. A height of a slice that encoding of a syntax, slice_height_in_tiles_minus1[i], is omitted may be set the same as that of a slice adjoining a left boundary of a current picture among slices included in the same row.

TopLeftBrickIdx[0], an index of a top-left tile of the first slice, may be set to be 0. Accordingly, for a second slice (i.e., a slice that an index i is 1), a syntax, top_left_brick_idx_delta[i], substantially has the same value as an index of a top-left tile. Accordingly, a syntax, top_left_brick_idx[i], instead of a syntax, top_left_brick_idx_delta[i], may be signaled for the second slice. In this case, top_left_brick_idx[i] represents an index of a top-left tile of the i-th slice.

In another example, a syntax, top_left_brick_idx_delta[i], may be set as a difference between the first tile of the i-th slice and the first tile of the (i+1)-th slice. In other words, an index of a top-left tile of the (i+1)-th slice may be derived by summing an index of a top-left tile of the i-th slice and a syntax, top_left_brick_idx_delta[i], signaled for the i-th slice. When a syntax, top_left_brick_idx_delta[i], represents difference information between the i-th slice and the (i+1)-th slice, encoding of a syntax, top_left_brick_idx_delta[i], may be omitted for the last slice.

A slice may be determined by using a syntax table as in the following Table 17.

TABLE 17

| | Descriptor |
|---|---|
| pic_parameter_set_rbsp( ) { | |
| ... | |
|   single_tile_in_pic_flag | u(1) |
|   if( !single_tile_in_pic_flag ) { | |
|     log2_pps_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     loop_filter_across_tiles_enabled_flag | u(1) |
|     loop_filter_across_slices_enabled_flag | u(1) |
|     rect_slice_flag | u(1) |
|     if( rect_slice_flag ) { | |
|       num_slices_in_pic_minus1 | ue(v) |
|       for( i = 0; i < num_slices_in_pic_minus1; i++ ) | |
| { | |
|         slice_width_in_tiles_minus1[ i ] | ue(v) |
|         slice_height_in_tiles_minus1[ i ] | ue(v) |
|         if( slice_width_in_tiles_minus1[ i ] == 0 && | |
|         slice_height_in_tiles_minus1[ i ] == 0 ) { | |
|           num_slices_in_tile_minus1[ i ] | ue(v) |
|           numSlicesInTileMinus1 = | |
| num_slices_in_tile_minus1[ i ] | |
|           for( j = 0; j < numSlicesInTileMinus1; j++ ) | |
|             slice_height_in_ctu_minus1[i++] | ue(v) |
|         } | |

TABLE 17-continued

| | Descriptor |
|---|---|
|         if( tile_idx_delta_present_flag && i < num_slices_in_pic_minus1 ) | |
|           tile_idx_delta[ i ] | se(v) |
|       } | |
|     } | |
|     ... | |
|   } | |
| ... | |
| } | |

When a flag, rect_slice_flag, representing a slice type is encoded and a value of the flag, rect_slice_flag, is 1, a syntax, num_slices_in_pic_minus1, representing the number of slices in a picture may be encoded.

When it is determined that a picture includes a plurality of slices, a syntax, slice_width_in_tiles_minus1[i], representing a width of each slice, and a syntax, slice_height_in_tiles_minus1[i], representing a height of each slice may be encoded and signaled.

In addition, a syntax, tile_idx_delta[i], representing a difference between an index of a tile included in the i-th slice and an index of a tile included in the (i+1)-th slice may be signaled. For the last tile, encoding of a syntax, tile_idx_delta[i], may be omitted.

A syntax derived by subtracting an offset from a tile index difference between two slices may be encoded. An offset may be a natural number such as 1 or 2. In an example, a syntax, tile_idx_delta_minus1[i], may be signaled in a bitstream. A difference between an index of a tile included in the i-th slice and an index of a tile included in the (i+1)-th slice may be derived by adding 1 to a syntax, tile_idx_delta_minus1[i].

Difference information of a tile index may be encoded/decoded when a current picture includes a plurality of slices. In other words, when a current picture is configured with a single slice, signaling of a syntax, tile_idx_delta[i], representing a difference between tile indexes may be omitted. For example, when a flag, one_slice_in_pic_flag, representing whether a current picture is configured with a single slice is 1, signaling of a syntax, tile_idx_delta[i], may be omitted.

Alternatively, an encoder may determine whether to encode a syntax, tile_idx_delta[i], representing a difference between tile indexes or not and encode a flag, tile_idx_delta_present_flag, representing whether the syntax, tile_idx_delta[i], is encoded or not, according to the determination. When a value of a flag, tile_idx_delta_present_flag, is 0, it represents that a syntax, tile_idx_delta[i], is not encoded/decoded. When a value of a flag, tile_idx_delta_present_flag, is 1, a syntax, tile_idx_delta[i], may be encoded/decoded for at least one slice.

One tile may be partitioned into a plurality of slices. In an example, a plurality of slices may be generated by partitioning a tile in a horizontal direction.

When it is determined that a slice does not include a plurality of tiles, whether a tile will be partitioned into a plurality of slices may be determined. In an example, when both a syntax, slice_width_in_tiles_minus1[i], and a syntax, slice_height_in_tiles_minus1[i], are 0, it represents that a slice is constituted with only a single tile, or that a tile is partitioned into a plurality of slices.

When both a syntax, slice_width_in_tiles_minus1[i], and a syntax, slice_height_in_tiles_minus1[i], are 0, information representing whether a tile is partitioned into a plurality of slices may be signaled.

In an example, a syntax, num_slices_in_tile_minus1[i], representing the number of slices included by a tile may be signaled. A syntax, num_slices_in_tile_minus1[i], represents a value subtracting 1 from the number of slices included by the i-th tile.

When a tile including the i-th slice is configured with a plurality of slices, a syntax representing a height of each slice in a tile may be encoded. In an example, a syntax, slice_height_in_ctu_minus1[i] [j], representing a height of the j-th slice in a tile including the i-th slice (i.e., the (i+j)-th slice), may be signaled. A syntax, slice_height_in_ctu_minus1[i] [j], may represent the number of coding tree unit rows included by the j-th slice in a tile including the i-th slice. Table 18 illustrates a syntax structure which includes a syntax, slice_height_in_ctu_minus1[i] [j], representing a height of a slice.

TABLE 18

| | Descriptor |
|---|---|
| pic_parameter_set_rbsp( ) { | |
| ... | |
|   single_tile_in_pic_flag | u(1) |
|   if( !single_tile_in_pic_flag ) { | |
|     log2_pps_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     loop_filter_across_tiles_enabled_flag | u(1) |
|     loop_filter_across_slices_enabled_flag | u(1) |
|     rect_slice_flag | u(1) |
|     if( rect_slice_flag ) { | |
|       num_slices_in_pic_minus1 | ue(v) |
|       for( i = 0; i < num_slices_in_pic_minus1; i++ ) | |
|     { | |
|         slice_width_in_tiles_minus1[ i ] | ue(v) |
|         slice_height_in_tiles_minus1[ i ] | ue(v) |
|         if( slice_width_in_tiles_minus1[ i ] == 0 && | |
|           slice_height_in_tiles_minus1[ i ] == 0 ) { | |
|           if( RowHeight[ TileIdx[i] / NumTileColumns ] >1 ) | |
|             num_slices_in_tile_minus1[ i ] | ue(v) |
|           numSlicesInTileMinus1 = num_slices_in_tile_minus1[ i ] | |
|           for( j = 0; j < numSlicesInTileMinus1; j++ ){ | |
|             if( RowHeight[ TileIdx[i] / NumTileColumns ] > 2 ) | |
|               slice_height_in_ctu_minus1[i][j] | ue(v) |
|           } | |
|         } | |
|         if (slice_width_in_tiles_minus1[ i ] != 0 \|\| | |
|           slice_height_in_tiles_minus1[ i ] != 0 ) { | |
|           tile_idx_delta[ i ] | se(v) |
|         } | |
|       } | |
|       signalled_slice_id_flag | u(1) |
|       if( signalled_slice_id_flag ) { | |
|         signalled_slice_id_length_minus1 | ue(v) |
|         for( i = 0; i <= num_slices_in_pic_minus1; i++ ) | |
|           slice_id[ i ] | u(v) |
|       } | |
|     } | |
|   } | |
| ... | |
| } | |

Based on a height of a tile, whether a syntax representing a height of a slice is encoded/decoded may be determined. In an example, when a tile including the i-th slice is configured with a single coding tree unit row, or when a tile including the i-th slice is configured with two coding tree unit rows, encoding/decoding of a syntax, slice_height_in_ctu_minus1[i] [j], representing a height of a slice may be omitted. A height of a syntax, slice_height_in_ctu_minus1[i] [j], may be adaptively determined according to the number of slices in a tile. In an example, when the number of slices in a tile is 1, a height of a slice may be set the same as a height of a tile. Alternatively, when the number of slices in a tile is 2 and a height of a tile is 2, a height of each slice may be set to be 1. In Table 18, a variable, TileIdx[i], indicates an index of a tile including the i-th slice and a variable, NumTileColumn, represents the number of tile columns. TileIdx[i]/NumTileColumn returns a row that a tile including the i-th slice is included. A variable, RowHeight [TileIdx[i]/NumTileColumn], represents a height of a tile including the i-th slice.

In another example, a syntax, num_exp_slices_in_tile[i], representing information on the number of slice heights which should be explicitly signaled may be signaled in a bitstream. A syntax, num_exp_slices_in_tile[i], may have a value which is the same as or smaller than the number of slices included by a tile.

When a syntax, num_exp_slices_in_tile[i], is 0, it represents that a tile is not partitioned into a plurality of slices. When a syntax, num_exp_slices_in_tile[i], is greater than 0, it represents that a tile may be partitioned into a plurality of slices.

Information representing a height of a slice may be signaled as many as a value indicated by a syntax, num_exp_slices_in_tile[i]. In an example, when a syntax, num_exp_slices_in_tile[i], is greater than 1, a syntax, exp_slice_height_in_ctu_minus1[j], representing a height of the j-th slice in a tile, may be signaled.

When an index j of a slice is smaller than the number of slices whose height is explicitly signaled, a width of a slice j may be determined based on a syntax, exp_slice_height_in_ctu_minus1[j], signaled in a bitstream. On the other hand, when an index k of a slice is equal to or greater than the number of slices whose height is explicitly signaled, a height of a slice k may be determined based on a syntax, exp_slice_height_in_ctu_minus1[l], which is signaled last. In this case, 1 may represent an index of a slice whose height is signaled last and may be an integer smaller than k.

In an example, when a value subtracting a height of previous slices from a height of a tile is equal to or greater than a value adding 1 to a syntax, exp_slice_height_in_ctu_minus1[l], a height of a slice k may be set as a value adding 1 to a syntax, exp_slice_height_in_ctu_minus1[l]. On the other hand, when a value subtracting a height of previous slices from a height of a tile is smaller than a value adding 1 to a syntax, exp_slice_height_in_ctu_minus1[l], a difference value subtracting a height of previous slices from a height of a tile may be set as a height of a slice k.

In other words, a height of remaining slices excluding slices whose height is explicitly signaled may have a value smaller than or the same as a height of the last slice of slices whose height is explicitly signaled.

In the above-described example, it was illustrated that whether to encode a syntax, one_slice_in_pic_flag, representing whether a picture is configured with a single slice is determined only when a method of defining a rectangular slice is applied. Contrary to an example, after encoding a syntax, one_slice_in_pic_flag, then it may be determined whether to encode a syntax, rect_slice_flag. In an example, when a value of one_slice_in_pic_flag is 1, encoding of rect_slice_flag may be omitted.

When the number of tile columns in a current picture is 1, encoding of a syntax, slice_width_in_tiles_minus1, may be omitted. In addition, when the number of tile rows in a current picture is 1, encoding of a syntax, slice_height_in_tiles_minus1, may be omitted.

Alternatively, encoding of at least one of information representing a width of a slice or information representing a height of a slice may be omitted.

In an example, encoding of a syntax, slice_width_in_tiles_minus1, representing a width of a slice may be omitted and a distance with a tile at a predetermined position in an adjacent slice may be set as a width of a slice. Concretely, a top-left tile of the (i+1)-th slice adjacent to the right of the i-th slice may be specified by a syntax, top_left_brick_idx_delta[i]. A width of the i-th slice may be derived by a difference between an x-coordinate of a top-left tile in the i-th slice (e.g., an x-coordinate of a top-left sample) and an x-coordinate of a top-left tile in the (i+1)-th slice (e.g., an x-coordinate of a top-left sample).

Alternatively, encoding of a syntax, slice_height_in_tiles_minus1, representing a height of a slice may be omitted and a distance with a tile at a predetermined position in an adjacent slice may be set as a width of a slice. Concretely, a top-left tile of the j-th slice positioned at the bottom of the i-th slice may be specified by a syntax, top_left_brick_idx_delta[j−1]. A height of the i-th slice may be derived by a difference between a y-coordinate of a top-left tile in the i-th slice (e.g., a y-coordinate of a top-left sample) and a y-coordinate of a top-left tile in the j-th slice (e.g., a y-coordinate of a top-left sample).

Alternatively, in defining a slice in a rectangular shape, information representing whether difference value information is used may be signaled in a bitstream. In an example, tile_idx_delta_present_flag representing whether difference value information is used may be signaled in a bitstream. When a value of a syntax, tile_idx_delta_present_flag, is 1, it represents that a syntax representing a difference value of a tile index is encoded and signaled. In an example, when a value of a syntax, tile_idx_delta_present_flag, is 1, the i-th slice may be defined by a syntax, slice_width_in_tiles_minus1[i], and a syntax, slice_height_in_tiles_minus1[i], representing a size of a slice and difference value information for determining a position of a top-left tile or a position of a top-right tile in a slice (e.g., top_left_brick_idx_delta[i−1] or bottom_right_brick_idx_delta[i]).

When a value of a syntax, tile_idx_delta_present_flag, is 0, the i-th slice may be defined by a syntax, slice_width_in_tiles_minus1[i], and a syntax, slice_height_in_tiles_minus1[i], representing a size of a slice. When a value of a syntax, tile_idx_delta_prsent_flag, is 0, a slice adjoining a left boundary of a current picture and a slice adjacent to the right of the slice may have the same height. Accordingly, information representing a height of a slice may be signaled only for a slice adjoining a left boundary of a current picture and signaling of information representing a height of a slice may be omitted for a slice which does not adjoin a left boundary of a current picture.

A syntax, tile_idx_delta_present_flag, representing whether information representing a difference between tile indexes is encoded may be encoded/decoded when the number of slices included in a current picture is equal to or greater than a threshold value. In this case, a threshold value may be set as an integer such as 0, 1, or 2, etc. In an example, only when the number of slices included in a current picture is equal to or greater than 1 or 2, a syntax, tile_idx_delta_present_flag, may be encoded/decoded. When the number of slices included in a current picture is smaller than a threshold value, encoding/decoding of tile_idx_delta_present_flag may be omitted and a value thereof may be inferred to be 0. Table 19 illustrates a syntax structure that encoding/decoding conditions of a syntax, tile_idx_delta_present_flag, are added.

TABLE 19

|  | Descriptor |
|---|---|
| pic_parameter_set_rbsp( ) { | |
| ... | |
| single_tile_in_pic_flag | u(1) |
| if( !single_tile_in_pic_flag ) { | |
| log2_pps_ctu_size_minus5 | u(2) |
| num_exp_tile_columns_minus1 | ue(v) |
| num_exp_tile_rows_minus1 | ue(v) |
| for( i = 0; i <= num_exp_tile_columns_minus1; i++ ) | |
| tile_column_width_minus1[ i ] | ue(v) |
| for( i = 0; i <= num_exp_tile_rows_minus1; i++ ) | |
| tile_row_height_minus1[ i ] | ue(v) |
| loop_filter_across_tiles_enabled_flag | u(1) |
| loop_filter_across_slices_enabled_flag | u(1) |
| rect_slice_flag | u(1) |
| if( rect_slice_flag ) { | |
| num_slices_in_pic_minus1 | ue(v) |
| if (num_slices_in_pic_minus1>0) | |
| tile_idx_delta_present_flag | u(1) |
| isFirstSliceInTile[0] = 1 ; | |
| for( i = 0; i < num_slices_in_pic_minus1; i++ ) | |
| { | |
| if (tile_idx_delta_present_flag) | |
| tile_idx_delta [ i ] | se(v) |
| if (isFirstSliceInTile[i] \|\| tile_idx_delta[i] != 0){ | |
| slice_width_in_tiles_minus1[ i ] | ue(v) |
| slice_height_in_tiles_minus1[ i ] | ue(v) |
| } | |
| if( (slice_width_in_tiles_minus1[ i ] == 0 && slice_height_in_tiles_minus1[ i ] == 0) && isFirstSliceInTile[i] ) { | |
| num_slices_in_tile_minus1[ i ] | ue(v) |
| numSlicesInTileMinus1 = num_slices_in_tile_minus1[ i ] | |
| for( j = 0; j < numSlicesInTileMinus1; j++ ){ | |
| slice_height_in_ctu_minus1[i+j] | ue(v) |
| if (j>0) | |
| isFirstSliceInTile[i+j] = 0 ; | |
| } | |
| } | |
| } | |
| } | |
| ... | |
| } | |
| } | |
| ... | |
| } | |

It is possible to define a slice based on an index of a coding tree unit instead of an index of a tile.

In the above-described example, it is assumed that a slice is defined by giving an order to tiles according to a raster scanning order. In another example, a slice may be defined by giving an order to tiles according to vertical scanning, horizontal scanning or diagonal scanning.

Applying the embodiments as described about the decoding process or the encoding process to the encoding process or the decoding process respectively may be included in the scope of the present disclosure. Within the scope of the present disclosure, the embodiments in which operations occur in a predetermined order may be modified to embodiments in which the operations occur in a different order from the predetermined order.

Although the above-described embodiment is described based on a series of the operations or the flowchart, the embodiment does not limit a time-series order of the operations of the method thereto. In another example, the operations may be performed simultaneously or in a different order therefrom as necessary. Further, in the above-described embodiment, each of the components (for example, a unit, a module, etc.) constituting the block diagram may be implemented in a form of a hardware device or software. A plurality of components may be combined with each other into a single component which may be implemented using a single hardware device or software. The above-described embodiment may be implemented using program instructions that may be executed via various computer components. The instructions may be recorded in a computer-readable storage medium. The computer-readable storage medium may contain therein program instructions, data files, data structures, or the like alone or in combination with each other. Examples of the computer-readable storage media include magnetic media such as hard disks, floppy disks, and magnetic tapes, optical storage media such as CD-ROMs, DVDs, and magneto-optical media such as floptical disks, and hardware devices such as ROM, RAM, flash memory, and the like specifically configured to store therein and execute the program instructions. The hardware device may be configured to operate as one or more software modules to perform processing according to the present disclosure, and vice versa.

INDUSTRIAL AVAILABILITY

The present disclosure may be applied to an electronic device that encodes/decodes video.

What is claimed is:

1. A method of decoding a video, the method comprising:
partitioning a current picture into a plurality of tile columns based on at least one tile width information decoded from a bitstream;
partitioning the current picture into a plurality of tile rows based on at least one tile height information decoded from the bitstream;
decoding slice type information representing whether a rectangular slice partitioning method is applied or not; and
determining a size of a slice in the current picture,
wherein, in response that the slice type information indicates that the rectangular slice partitioning method is applied, tile index difference information specifying an index difference between a top-left tile of a first slice and a top-left tile of a second slice is decoded from the bitstream, and
wherein an index of the top-left tile of the second slice is derived by adding the index difference specified by the tile index difference information to an index of the top-left tile of the first slice.

2. The method of claim 1, wherein the method further comprises decoding a difference information present flag representing whether the tile index difference information is present in the bitstream or not, and
wherein the difference information present flag is decoded from the bitstream only when a number of slices included in the current picture is equal to or greater than a threshold value.

3. The method of claim 2, wherein when the number of slices included in the current picture is equal to or less than the threshold value, decoding the difference information present flag is omitted and a value of the difference information present flag is inferred to 0.

4. The method of claim 1, wherein determining the size of the slice comprises:
selectively decoding width information representing a width of the first slice; and
selectively decoding height information representing a height of the first slice,
wherein whether the height information is decoded for the first slice or not is determined based on whether the first slice adjoins a left boundary of the current picture.

5. The method of claim 4, wherein when the first slice does not adjoin the left boundary of the current picture, decoding the height information is omitted and the height of the first slice is set the same as a height of another slice which adjoins the left boundary of the current picture.

6. A method of encoding a video, the method comprising:
partitioning a current picture into a plurality of tile columns, at least one tile width information, indicating a width of at least one tile column, being encoded into a bitstream;
partitioning the current picture into a plurality of tile rows, at least one tile height information, indicating a height of at least one tile row, being encoded into the bitstream;
determining whether a rectangular slice partitioning method is applied or not;
determining a size of a slice; and
encoding slice type information, representing whether the rectangular slice partitioning method is applied or not, into the bitstream,
wherein, in response that the rectangular slice partitioning method is applied, tile index difference information specifying an index difference between a top-left tile of a first slice and a top-left tile of a second slice is encoded into the bitstream, and
wherein a value of the tile index difference information is derived by subtracting an index of the top-left tile of the first slice from an index of the top-left tile of the second slice.

7. The method of claim 6, wherein the method further comprises encoding a difference information present flag representing whether the tile index difference information is present in the bitstream or not, and
wherein the difference information present flag is encoded into the bitstream only when a number of slices included in the current picture is equal to or greater than a threshold value.

8. The method of claim 7, wherein when the number of slices included in the current picture is equal to or less than the threshold value, encoding the difference information present flag is omitted.

9. The method of claim 6, wherein determining the size of the slice comprises:
selectively encoding width information representing a width of the first slice; and
selectively encoding height information representing a height of the first slice,
wherein whether to encode the height information for the first slice or not is determined based on whether the first slice adjoins a left boundary of the current picture.

10. The method of claim 9, wherein when the first slice does not adjoin the left boundary of the current picture, encoding the height information is omitted and the height of the first slice is set the same as a height of another slice who adjoins the left boundary of the current picture.

11. A non-transitory computer-readable medium for storing data associated with a video, comprising:
- a data stream stored in the non-transitory computer-readable medium, the data stream comprising:
- at least one tile width information indicating a width of at least one tile column;
- at least one tile height information indicating a height of at least one tile row; and
- slice type information representing whether a rectangular slice partitioning method is applied to a current picture or not,
- wherein, in response that the slice type information indicates that the rectangular slice partitioning method is applied, the data stream further comprises tile index difference information specifying an index difference between a top-left tile of a first slice and a top-left tile of a second slice, and
- wherein an index of the top-left tile of the second slice is derived by adding the index difference specified by the tile index difference information to an index of the top-left tile of the first slice.

* * * * *